(12) United States Patent
Kiyota et al.

(10) Patent No.: US 11,697,920 B2
(45) Date of Patent: Jul. 11, 2023

(54) SURROUNDINGS MONITORING SYSTEM FOR WORK MACHINE

(71) Applicant: SUMITOMO HEAVY INDUSTRIES, LTD., Tokyo (JP)

(72) Inventors: Yoshihisa Kiyota, Kanagawa (JP); Shunsuke Otsuki, Kanagawa (JP); Susumu Aizawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/976,146

(22) Filed: May 10, 2018

(65) Prior Publication Data

US 2018/0258616 A1 Sep. 13, 2018

Related U.S. Application Data

(63) Continuation of application No. PCT/JP2016/085043, filed on Nov. 25, 2016.

(30) Foreign Application Priority Data

Nov. 30, 2015 (JP) ................... 2015-233976
Nov. 30, 2015 (JP) ................... 2015-233978

(Continued)

(51) Int. Cl.
*G06V 20/52* (2022.01)
*E02F 9/26* (2006.01)
(Continued)

(52) U.S. Cl.
CPC ............ *E02F 9/26* (2013.01); *E02F 9/261* (2013.01); *E02F 9/267* (2013.01); *G06T 1/00* (2013.01);
(Continued)

(58) Field of Classification Search
None
See application file for complete search history.

(56) References Cited

U.S. PATENT DOCUMENTS 9,836,938 B2 12/2017 Kiyota
2008/0240504 A1* 10/2008 Grosvenor ........... G06K 9/6256
382/103

(Continued)

FOREIGN PATENT DOCUMENTS

EP 2570556 3/2013
EP 2757782 7/2014

(Continued)

OTHER PUBLICATIONS

Zhang, Fan, Bingyin Zhou, and Lizhong Peng. "Gradient skewness tensors and local illumination detection for images." Journal of Computational and Applied Mathematics 237.1 (2013): 663-671. (Year: 2013).*

(Continued)

*Primary Examiner* — Sean M Conner
(74) *Attorney, Agent, or Firm* — IPUSA, PLLC

(57) ABSTRACT

A surroundings monitoring system for a work machine includes a memory and a processor coupled to the memory. The processor is configured to detect an obstacle present around the work machine and control an output apparatus mounted on the work machine. The processor is configured to display an output image on a display apparatus. The output image includes an image part generated using a captured image of an image capturing apparatus attached to the work machine and an icon of the work machine. The processor is configured to highlight, among image parts around the icon, an image part corresponding to a direction in which or a position at which the detected obstacle is present.

20 Claims, 37 Drawing Sheets

(30) Foreign Application Priority Data

Nov. 30, 2015 (JP) .................................. 2015-233979
Nov. 30, 2015 (JP) .................................. 2015-233980

(51) Int. Cl.

| | |
|---|---|
| H04N 7/18 | (2006.01) |
| G06T 1/00 | (2006.01) |
| G06T 1/20 | (2006.01) |
| G06T 7/00 | (2017.01) |

(52) U.S. Cl.

CPC ............... G06T 1/20 (2013.01); H04N 7/18 (2013.01); H04N 7/181 (2013.01); *G06T 7/0004* (2013.01); *G06V 20/52* (2022.01)

(56) References Cited

U.S. PATENT DOCUMENTS

| | | | |
|---|---|---|---|
| 2011/0228980 A1* | 9/2011 | Ichikawa | H04N 7/181 |
| | | | 382/103 |
| 2012/0114177 A1* | 5/2012 | Adachi | G06K 9/00362 |
| | | | 382/103 |
| 2013/0010117 A1* | 1/2013 | Miyoshi | B60R 1/002 |
| | | | 348/148 |
| 2013/0088593 A1* | 4/2013 | Ishimoto | E02F 9/226 |
| | | | 348/143 |
| 2013/0147958 A1* | 6/2013 | Mitsuta | H04N 7/18 |
| | | | 348/148 |
| 2014/0354813 A1* | 12/2014 | Ishimoto | H04N 7/181 |
| | | | 348/148 |
| 2015/0353010 A1* | 12/2015 | Baek | B60R 1/00 |
| | | | 348/148 |
| 2016/0200252 A1* | 7/2016 | Oota | B60T 17/18 |
| | | | 348/148 |
| 2016/0202351 A1* | 7/2016 | Uotsu | G01S 13/867 |
| | | | 342/27 |
| 2017/0030054 A1* | 2/2017 | Okumura | E02F 9/261 |
| 2017/0298595 A1* | 10/2017 | Machida | E02F 9/261 |
| 2017/0305018 A1 | 10/2017 | Machida et al. | |

FOREIGN PATENT DOCUMENTS

| | | | |
|---|---|---|---|
| JP | 2002-327470 | 11/2002 | |
| JP | 2006-059015 | 3/2006 | |
| JP | 2008-179940 | 8/2008 | |
| JP | 2010-198519 | 9/2010 | |
| JP | 2013-034142 | 2/2013 | |
| JP | 2014-047607 | 3/2014 | |
| JP | 2014-181510 | 9/2014 | |
| JP | 2014-183500 | 9/2014 | |
| JP | 2014-224410 | 12/2014 | |
| JP | 2015-168973 | 9/2015 | |
| JP | 2015-184839 | 10/2015 | |
| WO | WO-2013038874 A1 * | 3/2013 | ............. H04N 7/181 |
| WO | 2015/125979 | 8/2015 | |

OTHER PUBLICATIONS

Etinger, Ariel, et al. "Non-imaging MM-wave FMCW sensor for pedestrian detection." IEEE Sensors Journal 14.4 (2013): 1232-1237. (Year: 2013).*

International Search Report for PCT/JP2016/085043 dated Feb. 21, 2017.

* cited by examiner

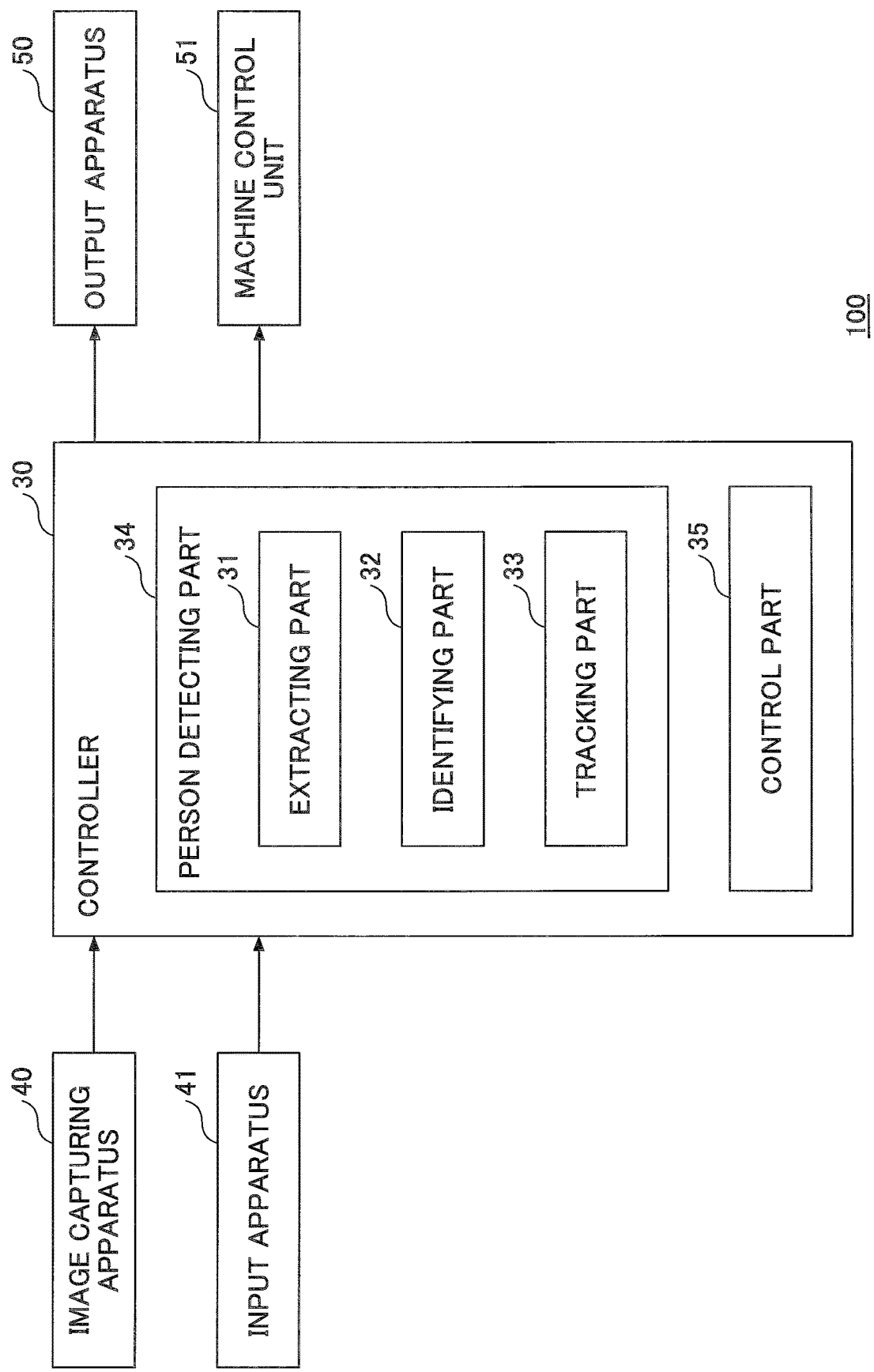

TRgt3

TRgt5

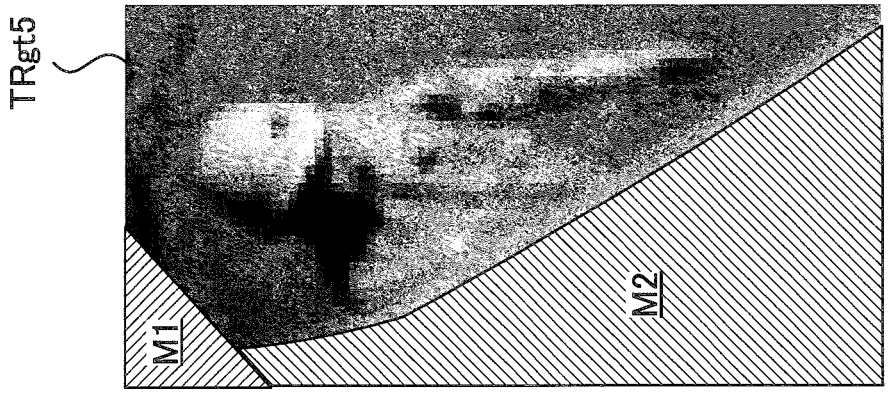
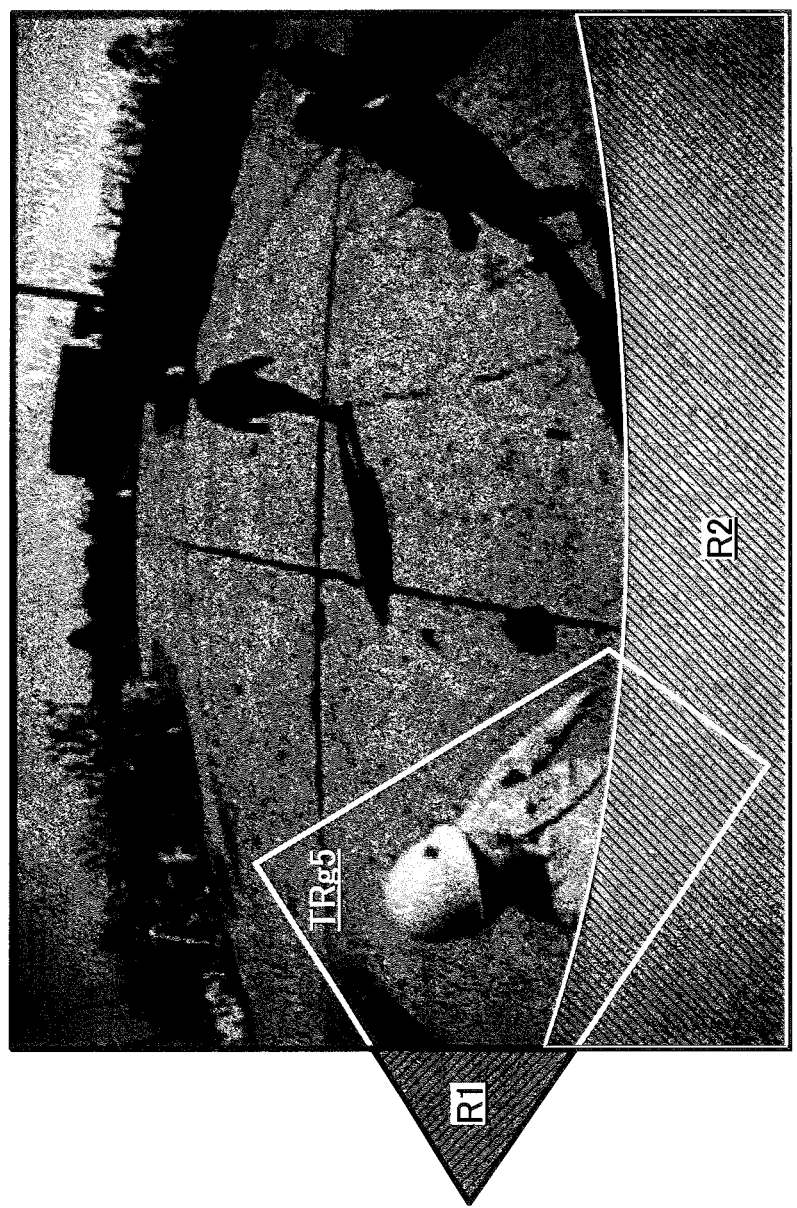

FIG.14C
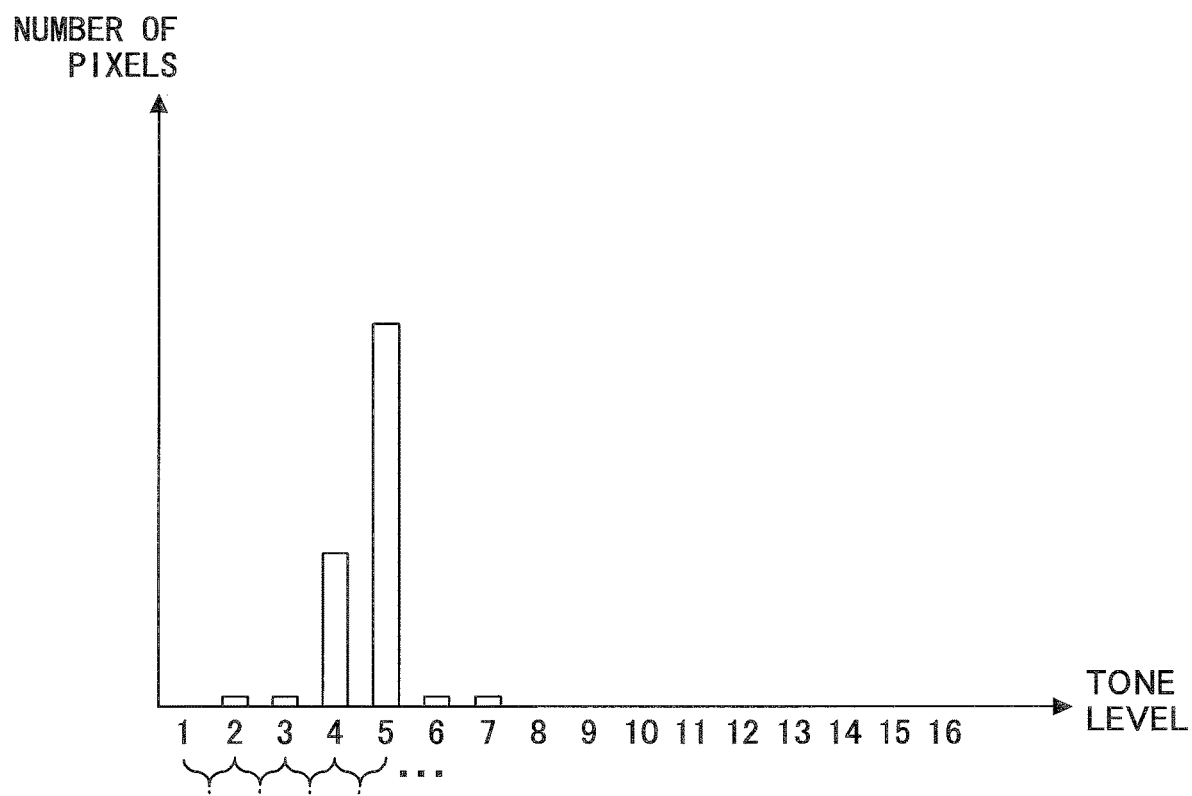
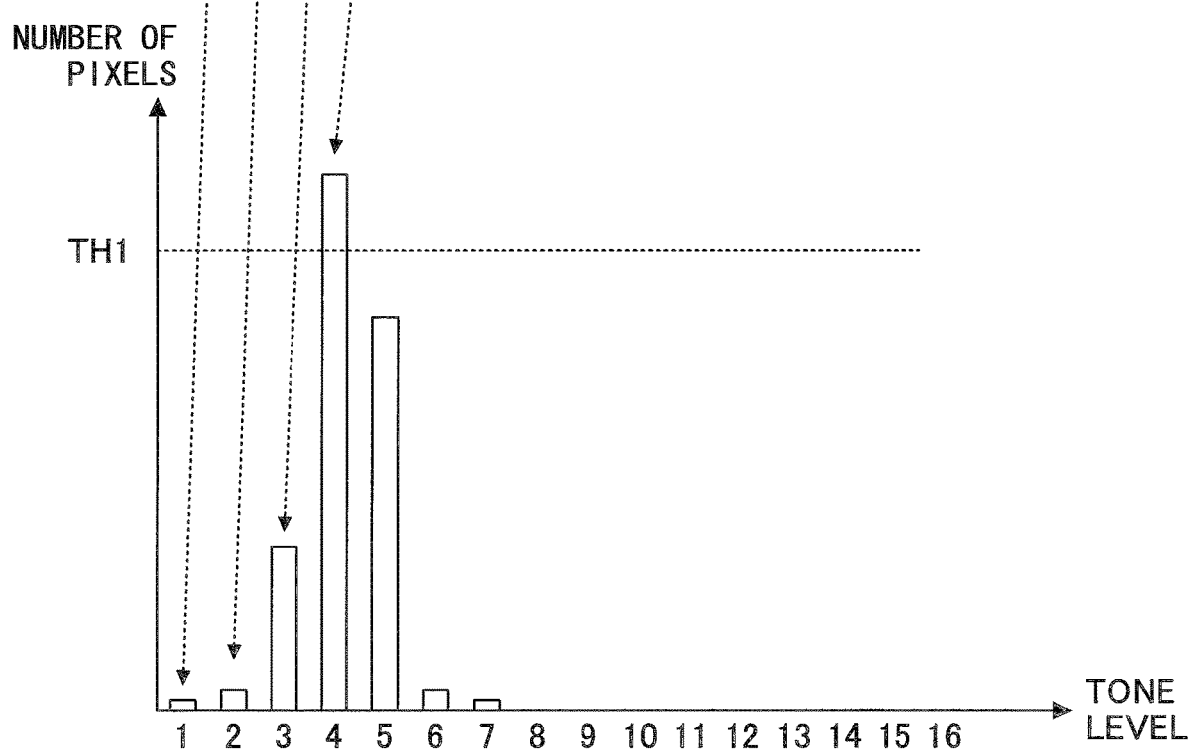

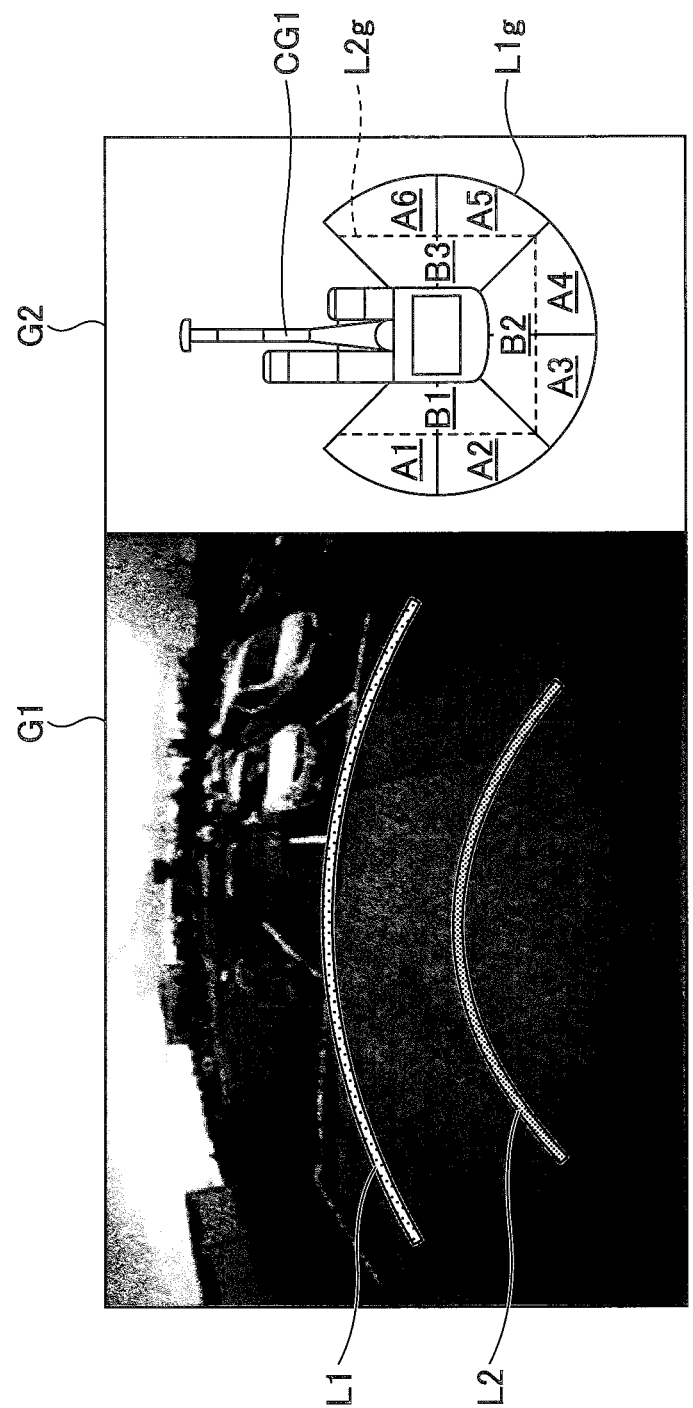

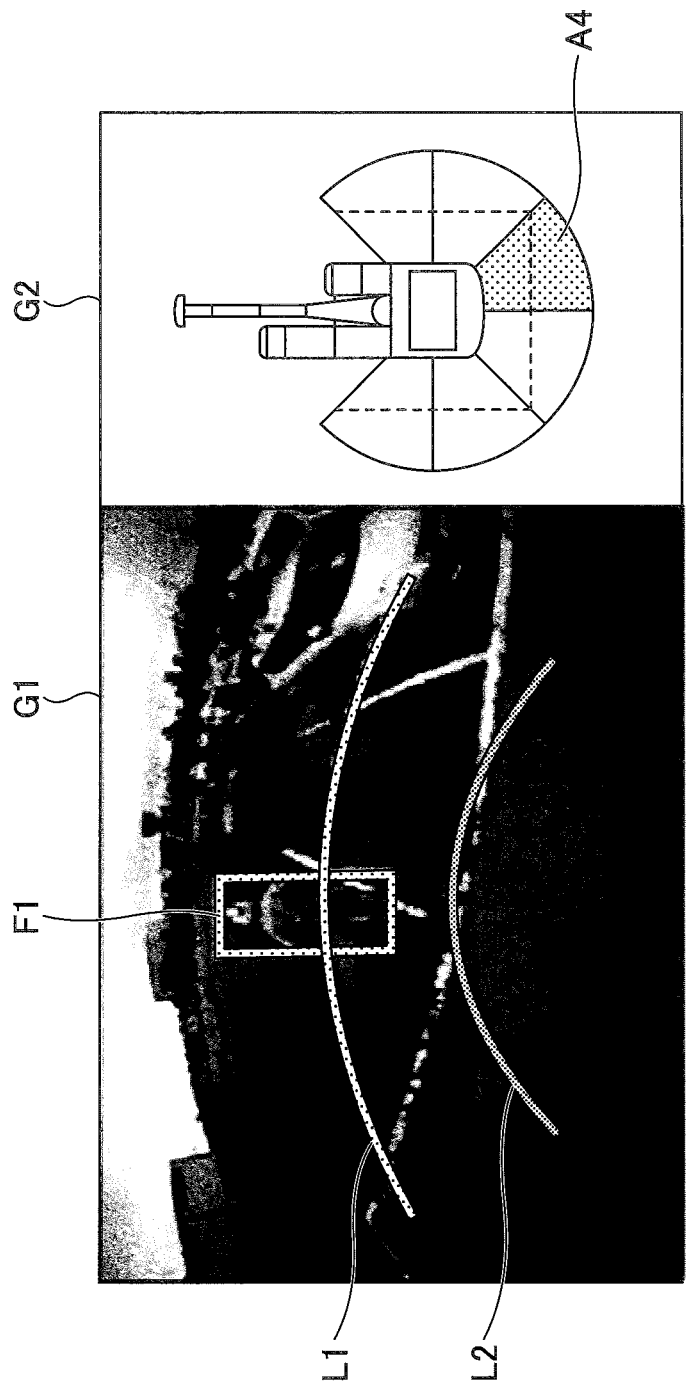

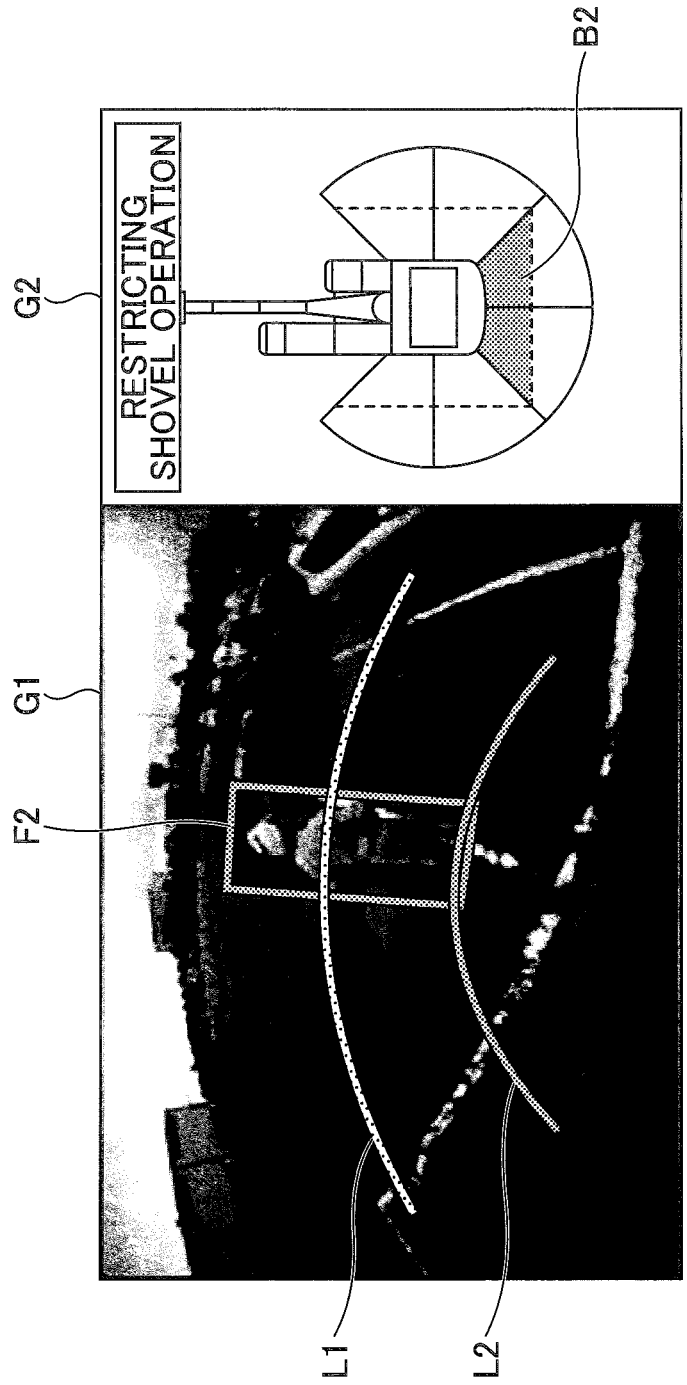

FIG.22

| ON-ALERT STATE | ALARMING STATE | FRAME DISPLAY | REGION DISPLAY |
|---|---|---|---|
| × | × | − | − |
| ○ | × | YELLOW | YELLOW |
| × | ○ | RED | RED |
| ○ | ○ | YELLOW + RED | YELLOW + RED |

SURROUNDINGS MONITORING SYSTEM FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2016/085043, filed on Nov. 25, 2016 and designating the U.S., which claims priority to Japanese Patent Application Nos. 2015-233976, 2015-233978, 2015-233979, and 2015-233980, filed on Nov. 30, 2015. The entire contents of the foregoing applications are incorporated herein by reference.

BACKGROUND

Technical Field

The present invention relates to surroundings monitoring systems for a work machine to monitor the surroundings of a work machine.

Description of Related Art

A shovel including a sensor to detect an object (person) present around the shovel is known. This shovel causes an alarm to be output from a loudspeaker installed in a right wall inside a cab and causes a through image of a camera to capture an image on the right side of the shovel to be displayed on a display, in response to detecting an object (person) on the right side of the shovel. Furthermore, this shovel causes an alarm to be output from a loudspeaker installed in a left wall inside the cab and causes a through image of a camera to capture an image on the left side of the shovel to be displayed on the display, in response to detecting an object (person) on the left side of the shovel.

SUMMARY

According to an aspect of the present invention, a surroundings monitoring system for a work machine includes a memory and a processor coupled to the memory. The processor is configured to detect an obstacle present around the work machine and control an output apparatus mounted on the work machine. The processor is configured to display an output image on a display apparatus. The output image includes an image part generated using a captured image of an image capturing apparatus attached to the work machine and an icon of the work machine. The processor is configured to highlight, among image parts around the icon, an image part corresponding to a direction in which or a position at which the detected obstacle is present.

BRIEF DESCRIPTION OF THE DRAWINGS

FIG. 2 is a functional block diagram illustrating a configuration of the surroundings monitoring system;

FIGS. 8A and 8B are diagrams illustrating the relationship between a target image region and an identification process unsuitable region;

FIG. 14C is a diagram illustrating the luminance histogram of the pixels of one region of FIG. 14B;

FIG. 21A illustrates an output image;

FIG. 21B illustrates an output image;

FIG. 21C illustrates an output image;

FIG. 22 illustrates a correspondence table showing the correspondence between a detected state and a frame and the display color of a region;

DETAILED DESCRIPTION

According to the above-described shovel, however, the object (person) detected by the sensor is not correlated with an object (person) in the image displayed on the display. Therefore, an operator who looks at the display may be impossible to recognize which object (person) in the image the object (person) detected by the sensor is.

In view of the above, it is desirable to provide a surroundings monitoring system for a work machine capable of letting an operator easily recognize in which region of a displayed image a person detected by the work machine is.

According to an aspect of the present invention, a surroundings monitoring system for a work machine is provided that is capable of letting an operator easily recognize in which region of a displayed image a person detected by the work machine is.

Figure 1:
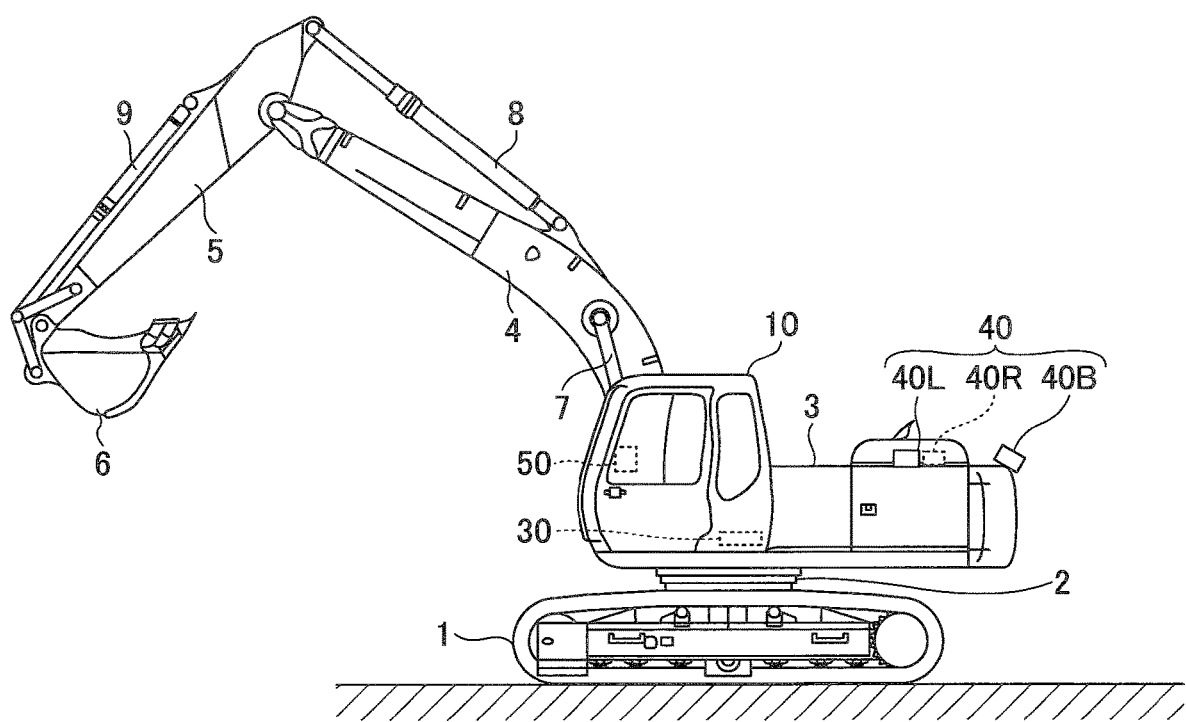
FIG. 1 is a side view of a shovel in which a surroundings monitoring system according to an embodiment of the present invention is mounted.

FIG. 1 is a side view of a shovel as a construction machine on which a surroundings monitoring system 100 according to an embodiment of the present invention is mounted. An upper rotating structure 3 is rotatably mounted on a traveling undercarriage 1 of the shovel through a swing mechanism 2. A boom 4 is attached to the upper rotating structure 3. An aim 5 is attached to an end of the boom 4. A bucket 6 is attached to an end of the aim 5. The boom 4, the aim 5, and the bucket 6 form an excavation attachment, and are hydraulically driven by a boom cylinder 7, an arm cylinder 8, and a bucket cylinder 9, respectively. A cabin 10 is provided and power sources such as an engine are mounted on the upper rotating structure 3. An image capturing apparatus 40 is attached to the top of the upper rotating structure 3. Specifically, a back-side camera 40B, a left-side camera 40L, and a right-side camera 40R are attached to the upper back end, the upper left end, and the upper right end, respectively, of the upper rotating structure 3. Furthermore, a controller 30 and an output apparatus 50 are installed in the cabin 10.

FIG. 2 is a functional block diagram illustrating a configuration of the surroundings monitoring system 100. The surroundings monitoring system 100 mainly includes the controller 30, the image capturing apparatus 40, and the output apparatus 50.

The controller 30 is a control unit to control the driving of the shovel. According to this embodiment, the controller 30 is composed of a processing unit including a CPU and an internal memory, and causes the CPU to execute a drive control program stored in the internal memory to implement various functions.

Furthermore, the controller 30 determines whether a person is present around the shovel based on the outputs of various apparatuses, and controls various apparatuses based on the result of the determination. Specifically, the controller 30 receives the outputs of the image capturing apparatus 40 and an input apparatus 41, and executes software programs corresponding to an extracting part 31, an identifying part 32, a tracking part 33, and a control part 35. Then, based on the results of the execution, the controller 30 outputs a control command to a machine control unit 51 to control the driving of the shovel, or causes the output apparatus 50 to output various kinds of information. The controller 30 may be a control unit dedicated for image processing.

The image capturing apparatus 40 is an apparatus to capture an image of the surroundings of the shovel, and outputs a captured image to the controller 30. According to this embodiment, the image capturing apparatus 40 is a wide-angle camera adopting an imaging device such as a CCD, and is attached to the top of the upper rotating structure 3 so that the optical axis points obliquely downward.

The input apparatus 41 is an apparatus to receive an operator's inputs. According to this embodiment, the input apparatus 41 includes an operation apparatus (operation levers, operation pedals, etc.), a gate lock lever, a button installed at an end of the operation apparatus, buttons attached to an in-vehicle display, a touchscreen, etc.

The output apparatus 50 is an apparatus to output various kinds of information, and includes, for example, an in-vehicle display to display various kinds of image information, an in-vehicle loudspeaker to audibly output various kinds of audio information, an alarm buzzer, an alarm lamp, etc. According to this embodiment, the output apparatus 50 outputs various kinds of information in response to control commands from the controller 30.

The machine control unit 51 is an apparatus to control the operation of the shovel, and includes, for example, a control valve to control a flow of hydraulic oil in a hydraulic system, a gate lock valve, an engine control unit, etc.

The extracting part 31 is a functional element to extract an identification process target image from a captured image captured by the image capturing apparatus 40. Specifically, the extracting part 31 extracts an identification process target image by image processing of a relatively small amount of computation that extracts a simple feature based on a local luminance gradient or edge, a geometric feature by Hough transform or the like, a feature related to the area or aspect ratio of a region divided based on luminance, and so on (hereinafter, "preceding image recognition process"). An identification process target image (hereinafter, "target image") is a partial image (a part of a captured image) to be subjected to subsequent image processing, and includes a prospective person image. A prospective person image is a partial image (a part of a captured image) that is highly likely to be a person image.

The identifying part 32 is a functional element to identify whether a prospective person image included in a target image extracted by the extracting part 31 is a person image. Specifically, the identifying part 32 identifies whether a prospective person image is a person image by image processing of a relatively large amount of computation such as an image recognition process using image feature description typified by HOG (Histograms of Oriented Gradients) features and a classifier generated by machine learning (hereinafter, "succeeding image recognition process"). The identifying part 32 identifies a prospective person image as a person image at a higher rate as the extracting part 31 extracts a target image with higher accuracy. In such cases where a captured image of desired quality cannot be obtained in circumstances unsuitable for image capturing, such as at night-time or in bad weather, the identifying part 32 may identify every prospective person image as a person image, and identify every prospective person image in a target image extracted by the extracting part 31 as a person, in order to prevent a person from escaping detection.

Figure 3B:
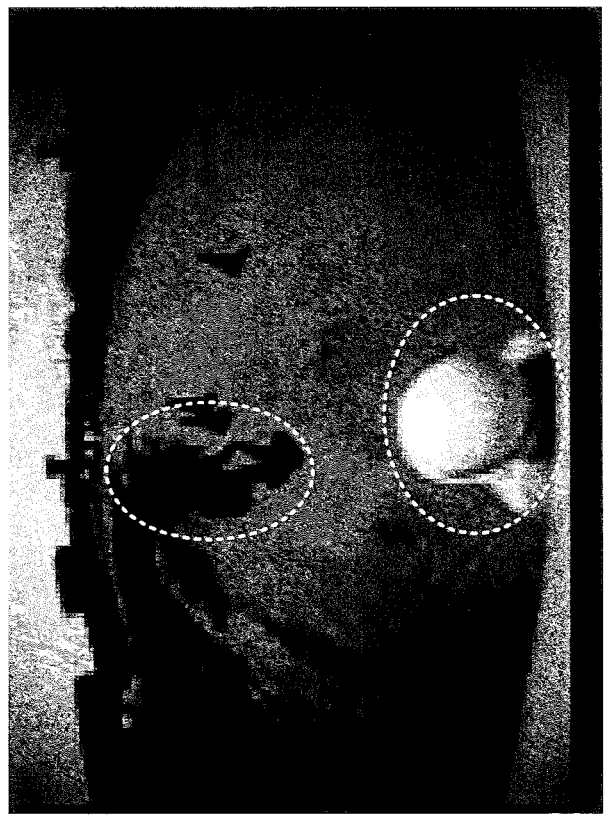
FIGS. 3A and 3B illustrate captured images of a back-side camera.
Figure 3A:
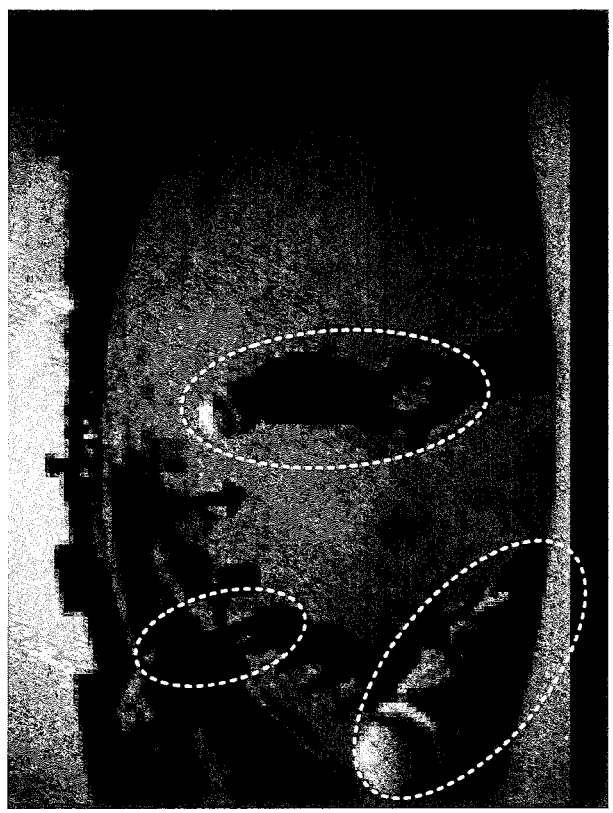

Next, how a person image appears in a captured image of the back side of the shovel captured by the back-side camera 40B is described with reference to FIGS. 3A and 3B. The two captured images of FIGS. 3A and 3B are examples of captured images of the back-side camera 40B. Furthermore, the dotted circles of FIGS. 3A and 3B represent the presence of a person and are not shown in an actual captured image.

The back-side camera 40B is a wide-angle camera, and is attached at a height to look down at a person obliquely from above. Therefore, how a person image appears in a captured image greatly differs depending on a direction in which a person is present in a view from the back-side camera 40B. For example, in a captured image, a person image closer to the left or right end of the captured image is shown with a greater inclination. This is because of image inclination due to the wide-angle lens of a wide-angle camera. Furthermore, a head closer to the back-side camera 40B is shown larger. Furthermore, a leg is in a blind spot of the body of the shovel and disappears from view. These are because of the installation position of the back-side camera 40B. Therefore, it is difficult to identify a person image included in a captured image by image processing without performing any processing on the captured image.

Therefore, the surroundings monitoring system 100 according to the embodiment of the present invention facilitates identification of a person image included in a target image by normalizing the target image. Here, "normalization" means conversion of a target image into an image of a predetermined size and a predetermined shape. According to this embodiment, a target image that may take various shapes in a captured image is converted into a rectangular image of a predetermined size by projective transformation. For example, a projective transformation matrix of eight variables is used as projective transformation.

Figure 4:
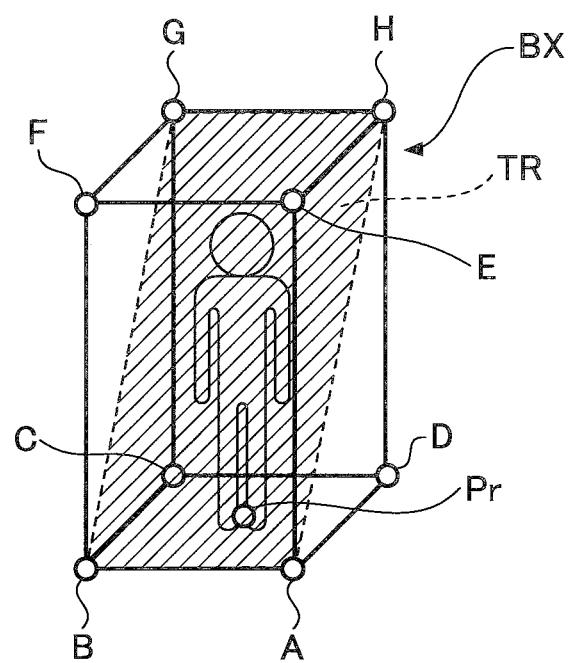
FIG. 4 is a schematic diagram illustrating a geometric relationship used in clipping a target image from a captured image.

Here, a process of normalizing a target image by the surroundings monitoring system 100 (hereinafter, "normalization process") is described with reference to FIGS. 4 through 6C. FIG. 4 is a schematic diagram illustrating a geometric relationship that the extracting part 31 uses to clip a target image from a captured image.

A box BX in FIG. 4 is a virtual solid object in a real space, and is a virtual rectangular parallelepiped defined by eight vertices A through H according to this embodiment. Furthermore, a point Pr is a reference point preset to refer to a target image. According to this embodiment, the reference point Pr is a point preset as an assumed standing position of a person, and is located at the center of a quadrangle ABCD defined by four vertices A through D. Furthermore, the size of the box BX is determined based on the orientation, pace, stature, etc., of a person. According to this embodiment, the quadrangle ABCD and a quadrangle EFGH are squares whose side is, for example, 800 mm long. Furthermore, the height of the rectangular parallelepiped is, for example, 1800 mm. That is, the box BX is a rectangular parallelepiped of 800 mm in width, 800 mm in depth, and 1800 mm in height.

A quadrangle ABGH defined by four vertices A, B, G and H forms a virtual plane region TR corresponding to the region of a target image in a captured image. Furthermore, the quadrangle ABGH as the virtual plane region TR is inclined relative to a virtual ground surface that is a horizontal plane.

According to this embodiment, the box BX as a virtual rectangular parallelepiped is adopted to determine the relationship between the reference point Pr and the virtual plane region TR. Other geometric relationships such as relationships using other virtual solid objects, however, may be adopted, and other mathematical relationships such as functions, conversion tables, etc., may be adopted, as long as the virtual plane region TR facing toward the image capturing apparatus 40 and inclined relative to a virtual ground surface can be determined in relation to any reference point Pr.

Figure 5:
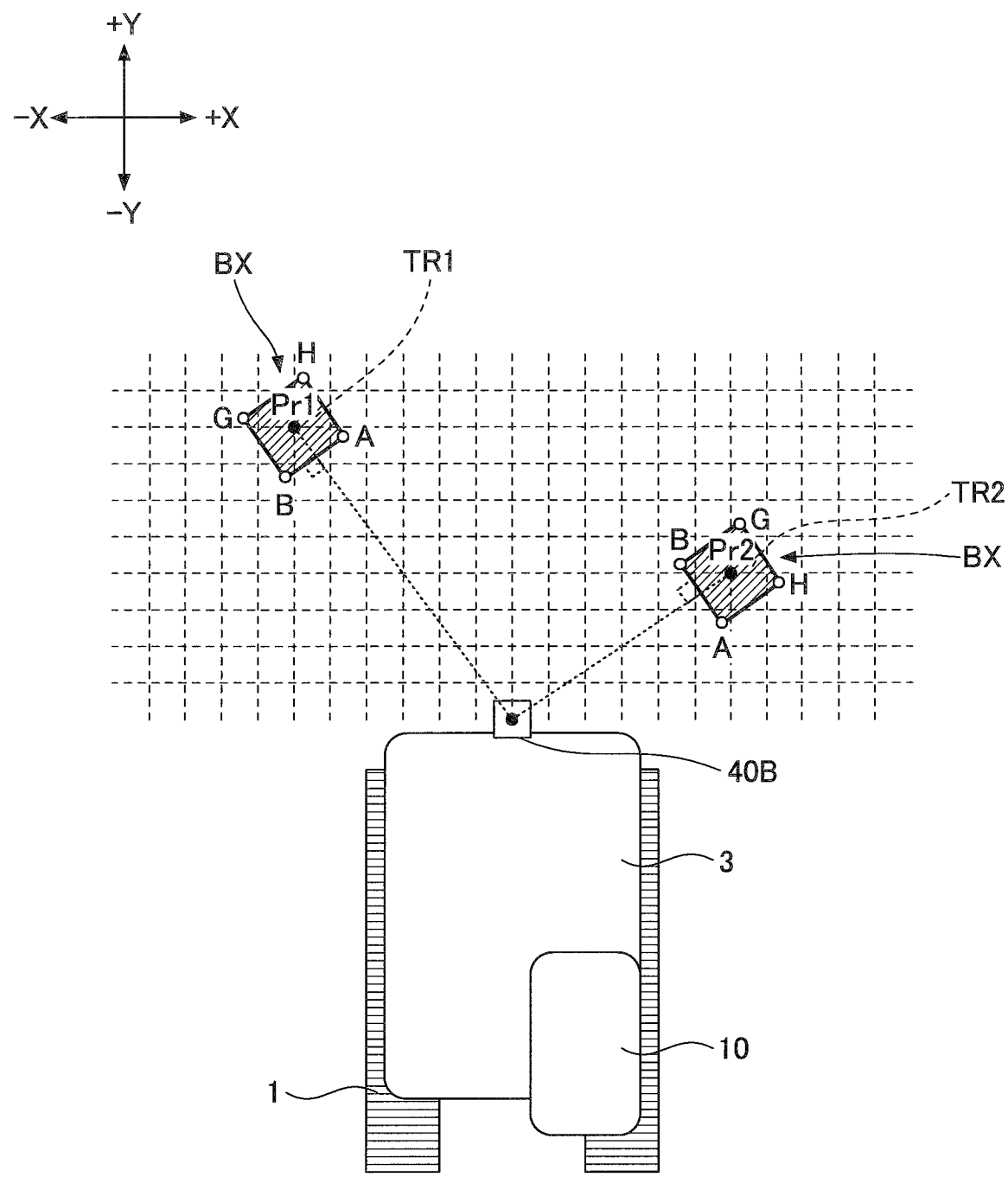
FIG. 5 is a top plan view of a real space at the back of the shovel.

FIG. 5 is a top plan view of a real space at the back of the shovel, illustrating the positional relationship between the back-side camera 40B and virtual plane regions TR1 and TR2 in the case where the virtual plane regions TR1 and TR2 are referred to using reference points Pr1 and Pr2. According to this embodiment, the reference point Pr may be placed at each of the grid points of a virtual grid on a virtual ground surface. The reference point Pr, however, may be irregularly placed on a virtual ground surface, or may be placed at regular intervals on line segments radially extending from the projected point of the back-side camera 40B on a virtual ground surface. For example, the line segments radially extend at intervals of one degree, and the reference point Pr is placed on each line segment at intervals of 100 mm.

As illustrated in FIGS. 4 and 5, a first face of the box BX defined by a quadrangle ABFE (see FIG. 4) is placed to directly face the back-side camera 40B when the virtual plane region TR1 is referred to using the reference point Pr1. That is, a line segment connecting the back-side camera 40B and the reference point Pr1 is orthogonal to the first face of the box BX placed in relation to the reference point Pr1 in a top plan view. Likewise, the first face of the box BX is also placed to directly face the back-side camera 40B when the virtual plane region TR2 is referred to using the reference point Pr2. That is, a line segment connecting the back-side camera 40B and the reference point Pr2 is orthogonal to the first face of the box BX placed in relation to the reference point Pr2 in a top plan view. This relationship holds whichever grid point the reference point Pr is placed on. That is, the box BX is placed to have its first face always face the back-side camera 40B directly.

Figure 6A:
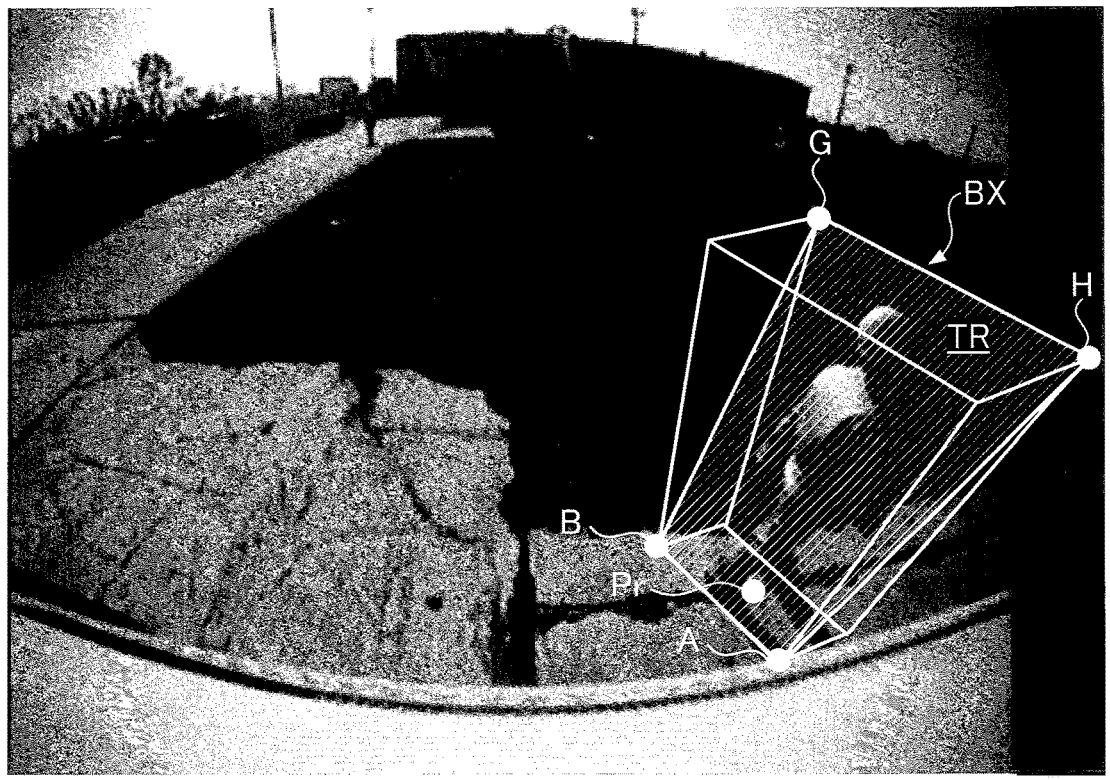
FIG. 6A illustrates a captured image of the back-side camera.
Figure 6B:
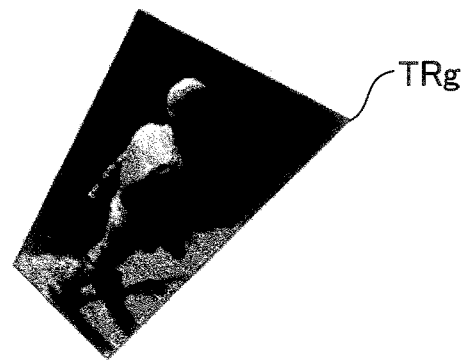
FIG. 6B is a clipped view of the region of a target image in the captured image.
Figure 6C:
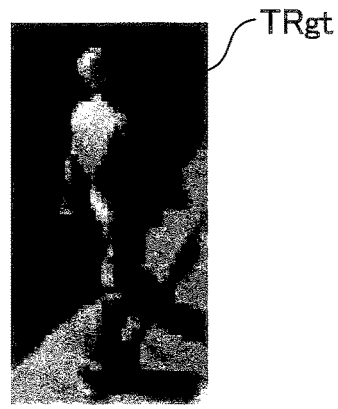
FIG. 6C illustrates a normalized image to which the target image is normalized.

FIGS. 6A through 6C are diagrams illustrating the flow of a process of generating a normalized image from a captured image. Specifically, FIG. 6A is a captured image of the back-side camera 40B, on which the box BX placed in relation to the reference point Pr in a real space is shown. FIG. 6B is a clipped view of the region of a target image (hereinafter, "target image region TRg") in the captured image, corresponding to the virtual plane region TR shown on the captured image of FIG. EA. FIG. 6C illustrates a normalized image TRgt to which the target image having the target image region TRg is normalized.

As illustrated in FIG. 6A, the box BX placed in relation to the reference point Pr in the real space determines the position of the virtual plane region TR in the real space, and determines the target image region TRg on the captured image corresponding to the virtual plane region TR.

Thus, once the position of the reference point Pr in a real space is determined, the position of the virtual plane region TR in the real space is uniquely determined, and the target image region TRg in a captured image as well is uniquely determined. Then, the extracting part 31 can generate the normalized image TRgt of a predetermined size by normalizing a target image having the target image region TRg.

According to this embodiment, the size of the normalized image TRgt is, for example, vertically 64 pixels and horizontally 32 pixels.

Figure 7A:
FIG. 7A illustrates a target image region in a captured image.
Figure 7B:
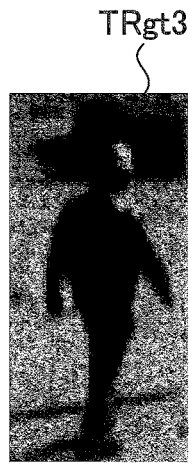
FIG. 7B illustrates a normalized image of a target image.
Figure 7C:
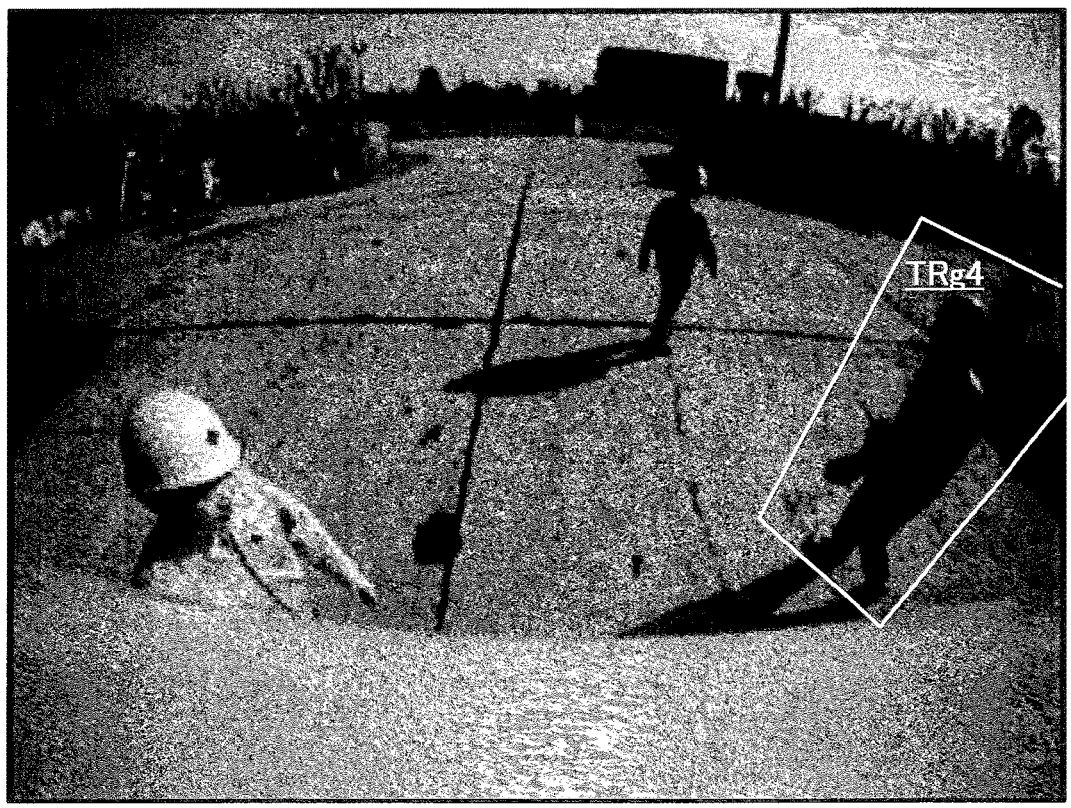
FIG. 7C illustrates another target image region in the captured image.
Figure 7D:
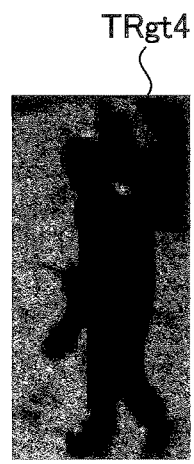
FIG. 7D illustrates a normalized image of another target image.
Figure 7E:
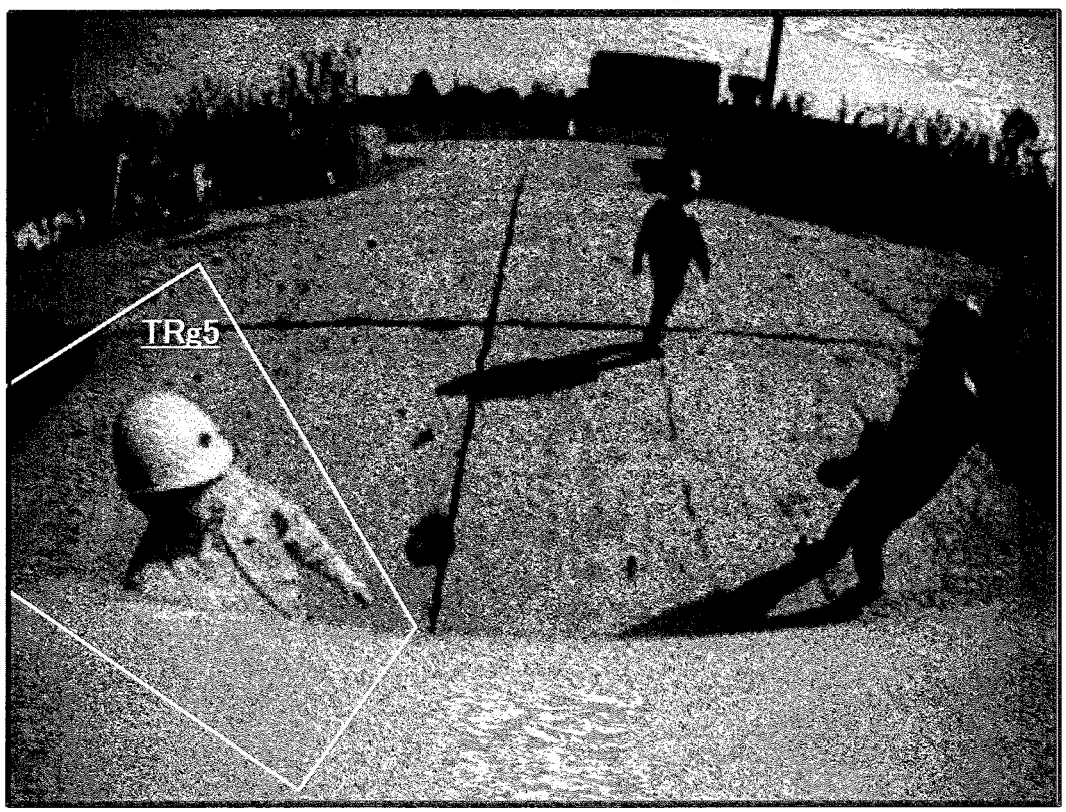
FIG. 7E illustrates yet another target image region in the captured image.
Figure 7F:
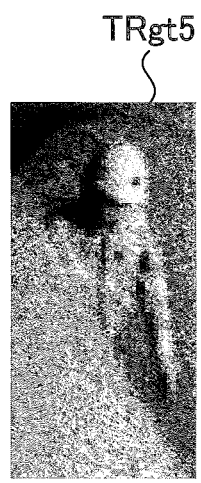
FIG. 7F illustrates a normalized image of yet another target image.

FIGS. 7A through 7F are diagrams illustrating the relationship of a captured image, a target image region, and a normalized image. Specifically, FIG. 7A illustrates a target image region TRg3 in a captured image, and FIG. 7B illustrates a normalized image TRgt3 of a target image having the target image region TRg3. Furthermore, FIG. 7C illustrates a target image region TRg4 in the captured image, and FIG. 7D illustrates a normalized image TRgt4 of a target image having the target image region TRg4. Likewise, FIG. 7E illustrates a target image region TRg5 in the captured image, and FIG. 7F illustrates a normalized image TRgt5 of a target image having the target image region TRg5.

As illustrated in FIGS. 7A through 7F, the target image region TRg5 in the captured image is larger than the target image region TRg4 in the captured image. This is because the distance between a virtual plane region corresponding to the target image region TRg5 and the back-side camera 40B is smaller than the distance between a virtual plane region corresponding to the target image region TRg4 and the back-side camera 40B. Likewise, the target image region TRg4 in the captured image is larger than the target image region TRg3 in the captured image. This is because the distance between the virtual plane region corresponding to the target image region TRg4 and the back-side camera 40B is smaller than the distance between a virtual plane region corresponding to the target image region TRg3 and the back-side camera 40B. That is, a target image region in a captured image is smaller as the distance between a corresponding virtual plane region and the back-side camera 40B is greater. Meanwhile, the normalized images TRgt3, TRgt4, and TRgt5 are all rectangular images of the same size.

Thus, the extracting part 31 can normalize a prospective person image including a person image by normalizing a target image that can take various shapes and sizes in a captured image to a rectangular image of a predetermined size. Specifically, the extracting part 31 places a partial image presumed to be the head of a prospective person image (hereinafter, "head partial image") in a predetermined region of a normalized image. Furthermore, the extracting part 31 places a partial image presumed to be the trunk of the prospective person image (hereinafter, "trunk partial image") in another predetermined region of the normalized image, and places a partial image presumed to be the legs of the prospective person image (hereinafter, "leg partial image") in yet another predetermined region of the normalized image. Furthermore, the extracting part 31 can obtain the normalized image with a reduced inclination of the prospective person image (image inclination) relative to the shape of the normalized image.

Next, a normalization process in the case where a target image region includes an image region adversely affecting identification of a person image to be unsuitable for identification (hereinafter, "identification process unsuitable region") is described with reference to FIGS. 8A and 8B. The identification process unsuitable region is a known region where a person image cannot be present, and includes, for example, a region into which the body of the shovel is captured (hereinafter "body captured region"), a region protruding from a captured image (hereinafter, "protruding region"), etc. FIGS. 8A and 8B are diagrams illustrating the relationship between a target image region and an identification process unsuitable region, and correspond to FIGS. 7E and 7F, respectively. Furthermore, in FIG. 8A, a hatched region of oblique lines sloping to the right corresponds to a protruding region R1, and a hatched region of oblique lines sloping to the left corresponds to a body captured region R2.

According to this embodiment, when the target image region TRg5 includes the protruding region R1 and part of the body captured region R2, the extracting part 31 masks these identification process unsuitable regions and thereafter generates the normalized image TRgt5 of a target image having the target image region TRg5. Alternatively, the extracting part 31 may generate the normalized image TRgt5 and thereafter mask part of the normalized image TRgt5 corresponding to the identification process unsuitable regions.

FIG. 8B shows the normalized image TRgt5. In FIG. 8B, a hatched region of oblique lines sloping to the right represents a masked region M1 corresponding to the protruding region R1, and a hatched region of oblique lines sloping to the left represents a masked region M2 corresponding to the part of the body captured region R2.

Thus, by masking the image of an identification process unsuitable region, the extracting part 31 prevents the image of the identification process unsuitable region from affecting an identification process by the identifying part 32. This masking makes it possible for the identifying part 32 to identify whether it is a person image, using the image of a region other than a masked region in a normalized image without being affected by the image of an identification process unsuitable region. The extracting part 31 may alternatively use a known method other than masking to prevent the image of an identification process unsuitable region from affecting an identification process by the identifying part 32.

Figure 9:
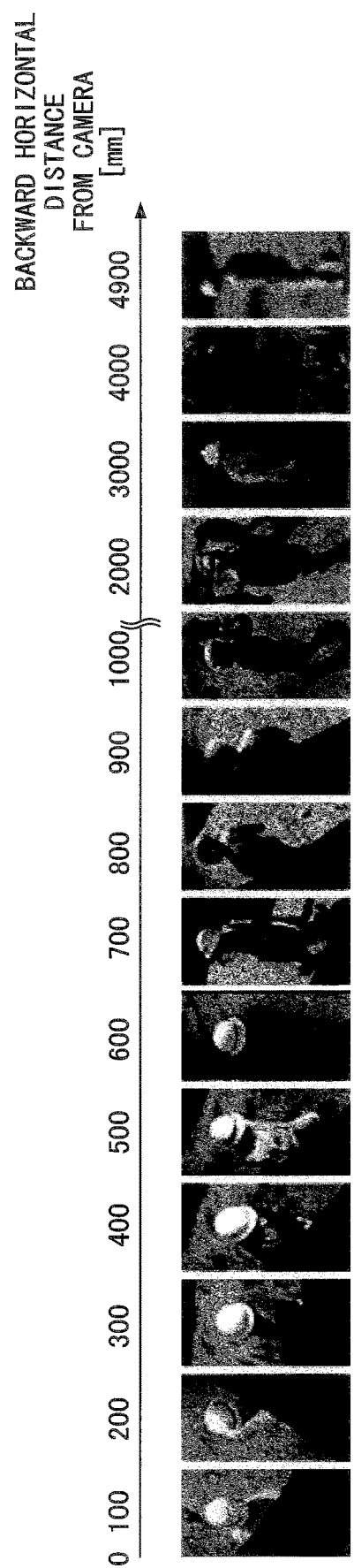
FIG. 9 is a diagram illustrating normalized images.

Next, features of a normalized image generated by the extracting part 31 are described with reference to FIG. 9. FIG. 9 is a diagram illustrating normalized images. Furthermore, in the fourteen normalized images illustrated in FIG. 9, a normalized image closer to the left end of the drawing includes the image of a prospective person at a position closer to the back-side camera 40B, and a normalized image closer to the right end of the drawing includes the image of a prospective person at a position more distant from the back-side camera 40B.

As illustrated in FIG. 9, the extracting part 31 can place a head partial image, a trunk partial image, a leg partial image, etc., in substantially the same proportion in any normalized image regardless of the backward horizontal distance (the horizontal distance along the Y-axis illustrated in FIG. 5) between the virtual plane region TR and the back-side camera 40B in a real space. Therefore, the extracting part 31 can reduce a computational load at the time when the identifying part 32 executes an identification process and improve the reliability of the result of the identification. The above-described backward horizontal distance is an example of the information related to the positional relationship between the virtual plane region TR and the back-side camera 40B in a real space, and the extracting part 31 adds the information to an extracted target image. Furthermore, the above-described information related to the positional relationship includes the angle of a line segment connecting the reference point Pr corresponding to the virtual plane region TR and the back-side camera 40B to the optical axis of the back-side camera 40B in a top plan view, etc.

By the above-described configuration, the surroundings monitoring system 100 generates the normalized image TRgt from the target image region TRg corresponding to the virtual plane region TR facing toward the image capturing apparatus 40 and inclined relative to a virtual ground surface that is a horizontal plane. Therefore, it is possible to realize normalization that takes into account how a person appears in the height direction and the depth direction. As a result, even in the case of using a captured image of the image capturing apparatus 40 attached to a construction machine to capture an image of a person obliquely from above, it is possible to detect a person present around the construction machine with more certainty. In particular, even when a person is close to the image capturing apparatus 40, a normalized image can be generated from a target image occupying a region of sufficient size on a captured image, and therefore, it is possible to ensure detection of the person.

Furthermore, the surroundings monitoring system 100 defines the virtual plane region TR as a rectangular region formed by four vertices A, B, G and H of the box BX, which is a virtual rectangular parallelepiped in a real space. Therefore, it is possible to geometrically correlate the reference point Pr and the virtual plane region TR in the real space, and it is further possible to geometrically correlate the virtual plane region TR in the real space and the target image region TRg in a captured image.

Furthermore, the extracting part 31 masks the image of an identification process unsuitable region included in the target image region TRg. Therefore, the identifying part 32 can identify whether it is a person image, using the image of a region other than masked regions in a normalized image without being affected by the images of identification process unsuitable regions including the body captured region R2.

Furthermore, the extracting part 31 can extract a target image reference point Pr by reference point Pr. Furthermore, each target image region TRg is correlated with one of the reference points Pr that are preset as the assumed standing positions of a person through the corresponding virtual plane region TR. Therefore, the surroundings monitoring system 100 can extract a target image that is highly likely to include a prospective person image by extracting a reference point Pr at which a person is highly likely to be present by any method. In this case, it is possible to prevent an identification process by image processing of a relatively large amount of computation from being performed on a target image that is less likely to include a prospective person image, thus making it possible to increase the speed of a person detecting process.

Figure 10:
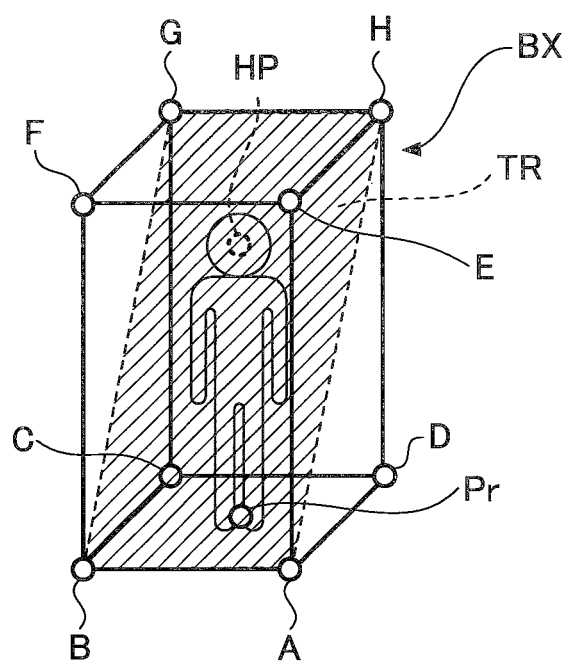
FIG. 10 is a schematic diagram illustrating another geometric relationship used in clipping a target image from a captured image.
Figure 11A:
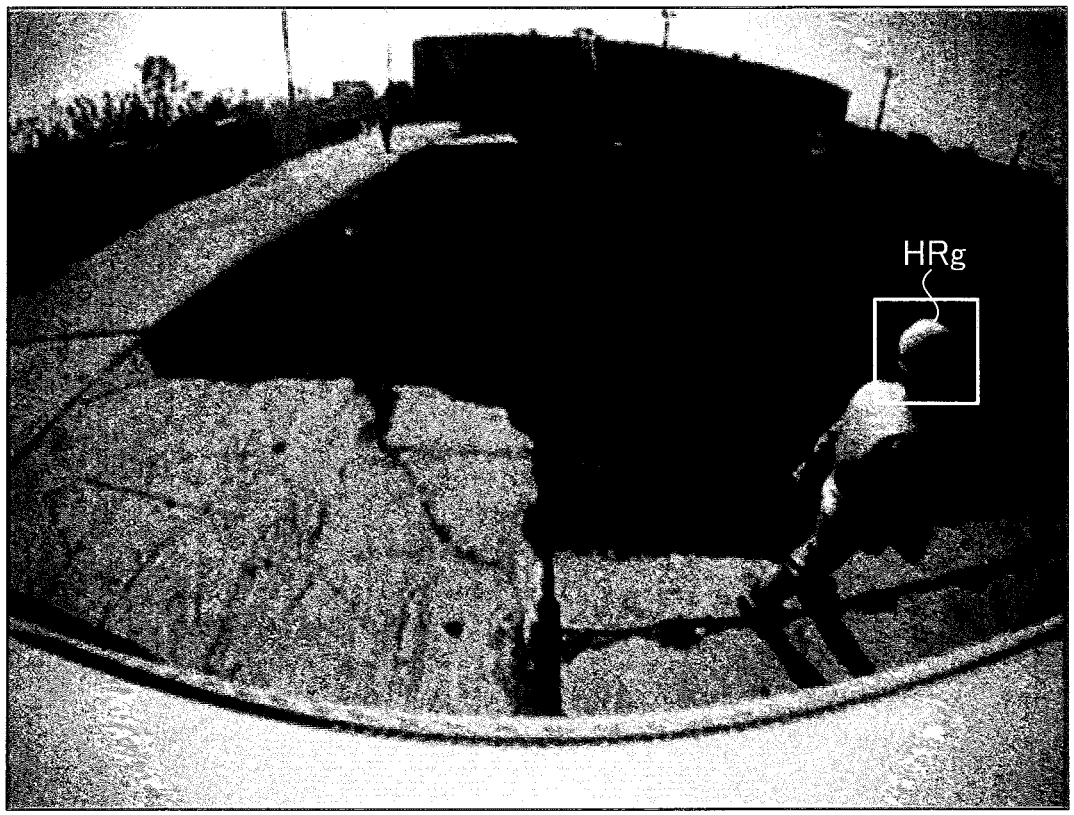
FIGS. 11A and 11B are diagrams illustrating a feature image in a captured image.
Figure 11B:
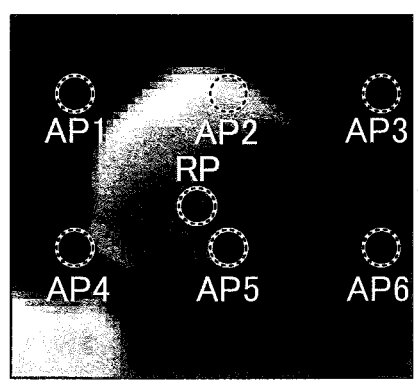

Next, a process of extracting a target image that is highly likely to include a prospective person image by the extracting part 31 is described with reference to FIGS. 10, 11A and 11B. FIG. 10 is a schematic diagram illustrating a geometric relationship that the extracting part 31 uses to clip a target image from a captured image, and corresponds to FIG. 4. FIGS. 11A and 11B are diagrams illustrating a feature image in a captured image. The feature image is an image that represents a characteristic part of a person, and is desirably an image that represents a part that is less likely to change in height from a ground surface in a real space. Therefore, the feature image includes, for example, the image of a helmet, the image of a shoulder, the image of a head, the image of a reflector or marker attached to a person, etc.

In particular, the helmet is characterized in that its shape is substantially spherical so that its projected image projected onto a captured image is constantly close to a circle irrespective of the image capturing direction. In addition, the helmet is characterized in that the surface is rigid and glossy or semi-glossy so that its projected image is likely to create a local high-luminance region and a radial luminance gradient around the region when projected onto a captured image. Therefore, the image of a helmet is particularly preferable as the feature image. The characteristic that its projected image is close to a circle, the characteristic that its projected image is likely to create a radial luminance gradient around a local high-luminance region, etc., may be used for image processing to find out the image of a helmet from a captured image. Furthermore, the image processing to find out the image of a helmet from a captured image includes, for example, a luminance smoothing process, a Gaussian smoothing process, a maximum luminance point search process, a minimum luminance point search process, etc.

According to this embodiment, the extracting part 31 finds out a helmet image (technically, an image that can be presumed to be a helmet) in a captured image by the preceding image recognition process. This is because a person who works around the shovel is believed to wear a helmet. Then, the extracting part 31 derives the most relevant reference point Pr from the position of the found-out helmet image. Then, the extracting part 31 extracts a target image corresponding to the reference point Pr.

Specifically, the extracting part 31, using the geometric relationship illustrated in FIG. 10, derives the highly relevant reference point Pr from the position of the helmet image in the captured image. The geometric relationship of FIG. 10 is different in determining a virtual head position HP in a real space from, but otherwise is equal to, the geometric relationship of FIG. 4.

The virtual head position HP, which represents the head position of a person presumed to be present at the reference point Pr, is placed immediately above the reference point Pr, and according to this embodiment, is placed at a height of 1700 mm above the reference point Pr. Therefore, once the virtual head position HP is determined in a real space, the position of the reference point Pr in the real space is uniquely determined, and the position of the virtual plane region TR in the real space as well is uniquely determined. Furthermore, the target image region TRg in a captured image as well is uniquely determined. Then, the extracting part 31 can generate the normalized image TRgt of a predetermined size by normalizing a target image having the target image region TRg.

Conversely, once the position of the reference point Pr in a real space is determined, the virtual head position HP in the real space is uniquely determined, and a head image position AP on a captured image corresponding to the virtual head position HP in the real space as well is uniquely determined. Therefore, the head image position AP can be preset in correlation with each of the preset reference points Pr. The head image position AP may be derived in real time from the reference point Pr.

Therefore, the extracting part 31 searches for a helmet image in a captured image of the back-side camera 40B by the preceding image recognition process. FIG. 11A shows a state where the extracting part 31 has found out a helmet image HRg. Then, in response to finding out the helmet image HRg, the extracting part 31 determines its representative position RP. The representative position RP is a position derived from the size, shape, etc., of the helmet image HRg. According to this embodiment, the representative position RP is the position of the central pixel of a helmet image region including the helmet image HRg. FIG. 11B is an enlarged view of the helmet image region that is a rectangular image region delimited by a white line in FIG. 11A, and shows that the position of the central pixel of the helmet image region is the representative position RP.

Thereafter, using, for example, a nearest neighbor search algorithm, the extracting part 31 derives the head image position AP nearest to the representative position RP. FIG.

11B shows that six head image positions AP1 through AP6 are preset near the representative position RP, of which the head image position AP5 is the head image position AP nearest to the representative position RP.

Then, the extracting part 31 extracts, from the derived nearest head image position AP, the corresponding target image region TRg, following the virtual head position HP, the reference point Pr, and the virtual plane region TR, using the geometric relationship illustrated in FIG. 10. Thereafter, the extracting part 31 generates the normalized image TRgt by normalizing a target image having the extracted target image region TRg.

Thus, the extracting part 31 extracts a target image by correlating the representative position RP of the helmet image HRg, which is the position of a feature image of a person in a captured image, with one of the preset head image positions AP (the head image position AP5).

Alternatively, instead of using the geometric relationship illustrated in FIG. 10, the extracting part 31 may use a reference table that directly correlates the head image position AP with the reference point Pr, the virtual plane region TR, or the target image region TRg to extract a target image corresponding to the head image position AP.

Furthermore, the extracting part 31 may alternatively use a known algorithm other than the nearest neighbor search algorithm, such as a hill-climbing algorithm or the mean-shift algorithm, to derive the reference point Pr from the representative position RP. For example, in the case of using a hill-climbing algorithm, the extracting part 31 derives multiple head image positions AP near the representative position RP, and associates the representative position RP with the reference points Pr corresponding to the head image positions AP. At this point, the extracting part 31 weights the reference points Pr so that the weight increases as the distance between the representative position RP and the head image position AP decreases. Then, the extracting part 31 climbs up the distribution of the weights of the reference points Pr to extract the target image region TRg from the reference point Pr having the weight closest to the maximum point of the weights.

Figure 12:
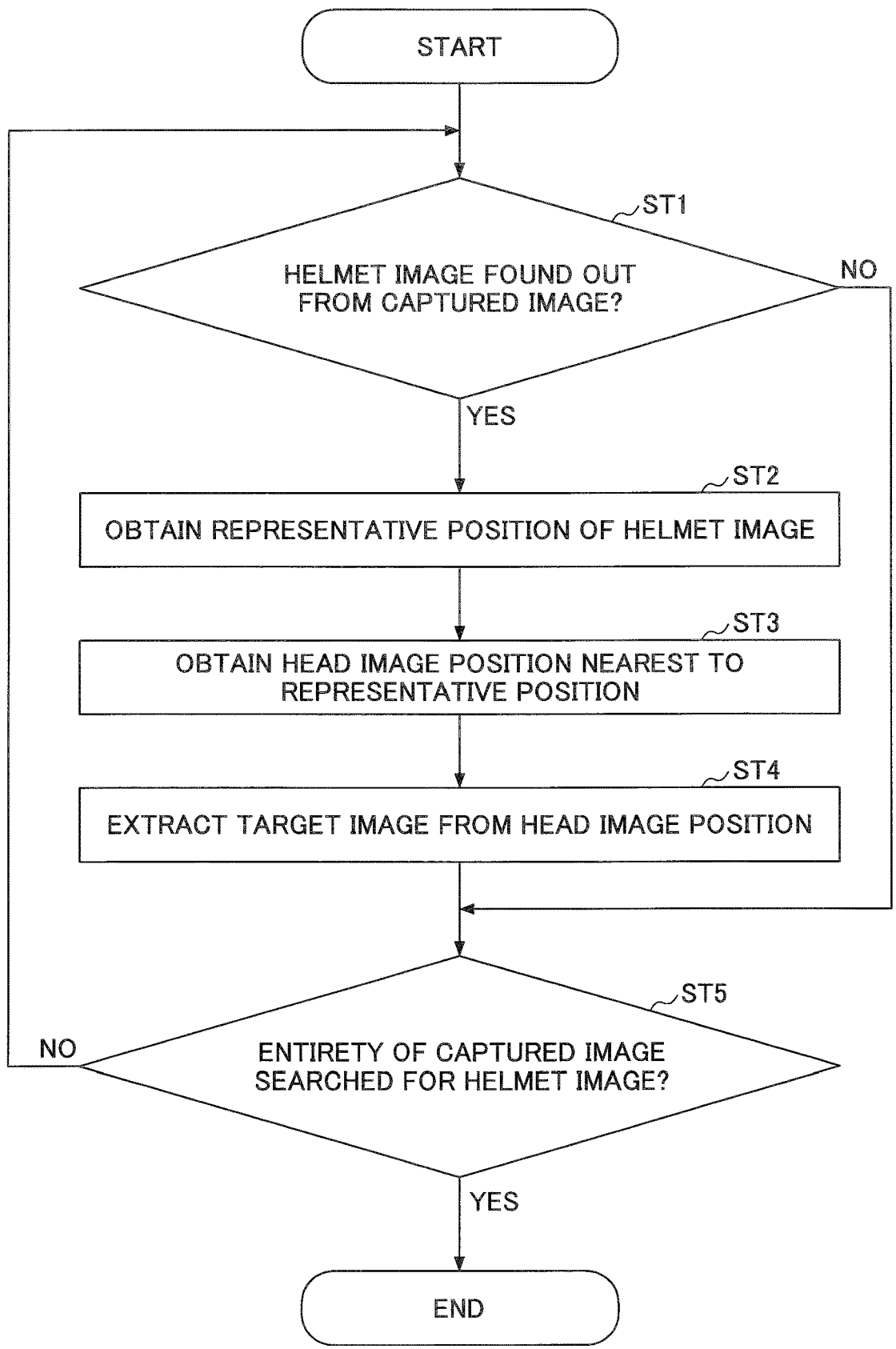
FIG. 12 is a flowchart illustrating the flow of an image extracting process.

Next, a process of extracting a target image by the extracting part 31 of the controller 30 (hereinafter, "image extracting process") is described with reference to FIG. 12. FIG. 12 is a flowchart illustrating the flow of an image extracting process.

First, the extracting part 31 searches a captured image for a helmet image (step ST1). According to this embodiment, the extracting part 31 finds out a helmet image by performing a raster scan on a captured image of the back-side camera 40B by the preceding image recognition process.

In response to finding out the helmet image HRg in the captured image (YES at step ST1), the extracting part 31 obtains the representative position RP of the helmet image HRg (step ST2).

Thereafter, the extracting part 31 obtains the head image position AP nearest to the obtained representative position RP (step ST3).

Thereafter, the extracting part 31 extracts a target image corresponding to the obtained head image position AP (step ST4). According to this embodiment, the extracting part 31 extracts a target image, following the correlation of the head image position AP in the captured image, the virtual head position HP in a real space, the reference point Pr as the assumed standing position of a person in the real space, and the virtual plane region TR in the real space, using the geometric relationship illustrated in FIG. 10.

In response to not finding out the helmet image HRg in the captured image (NO at step ST1), the extracting part 31 proceeds to step ST5 without extracting a target image.

Thereafter, the extracting part 31 determines whether the entirety of the captured image has been searched for a helmet image (step ST5).

In response to determining that the entirety of the captured image has not been searched for a helmet image (NO at step ST5), the extracting part 31 executes the process of steps ST1 through ST4 on another region of the captured image.

In response to determining that the entirety of the captured image has been searched for a helmet image (YES at step ST5), the extracting part 31 terminates the current image extracting process.

Thus, the extracting part 31 first finds out the helmet image HRg, and specifies the target image region TRg from the representative position RP of the found-out helmet image HRg by way of the head image position AP, the virtual head position HP, the reference point (assumed standing position) Pr, and the virtual plane region TR. Then, the extracting part 31 can generate the normalized image TRgt of a predetermined size by extracting and normalizing a target image having the specified target image region TRg.

Alternatively, the extracting part 31 first obtains one of the head image positions AP, and in response to finding out the helmet image HRg in a helmet image region corresponding to the obtained head image position AP, specifies the target image region TRg from the head image position AP at the time by way of the virtual head position HP, the reference point (assumed standing position) Pr, and the virtual plane region TR. Then, the extracting part 31 can generate the normalized image TRgt of a predetermined size by extracting and normalizing a target image having the specified target image region TRg.

By the above-described configuration, the extracting part 31 of the surroundings monitoring system 100 finds out a helmet image as a feature image in a captured image, and extracts a target image by correlating the representative position RP of the helmet image with one of the head image positions AP serving as a predetermined image position. Therefore, it is possible to narrow down partial images to be subjected to the succeeding image recognition process with a simple system configuration.

Alternatively, the extracting part 31 may first find out the helmet image HRg from a captured image, derive one of the head image positions AP corresponding to the representative position RP of the helmet image HRg, and extract a target image corresponding to the one of the head image positions AP. As yet another alternative, the extracting part 31 may first obtain one of the head image positions AP, and extract a target image corresponding to the one of the head image positions AP if a helmet image is present in a helmet image region that is a predetermined region including the position of a feature image corresponding to the one of the head image positions AP.

Furthermore, the extracting part 31 may alternatively use such a predetermined geometric relationship as illustrated in FIG. 10 to extract a target image from the representative position RP of a helmet image in a captured image. In this case, the predetermined geometric relationship represents the geometric relationship of the target image region TRg in the captured image, the virtual plane region TR in a real space corresponding to the target image region TRg, the reference point Pr (the assumed standing position of a person) in the real space corresponding to the virtual plane region TR, the virtual head position HP corresponding to the reference point Pr (a virtual feature position that is the real-space position of a characteristic part of the person corresponding to the assumed standing position of the person), and the head image position AP in the captured image corresponding to the virtual head position HP (a predetermined image position in the captured image corresponding to the virtual feature position).

Alternatively, the extracting part 31 may generate multiple normalized images by normalizing individual predetermined partial images in a captured image, and extract, as a target image, a normalized image including a helmet image among the normalized images. The predetermined partial images are, for example, multiple target image regions TRg predetermined on a captured image. The target image region TRg (see FIG. 6) corresponds to the virtual plane region TR in a real space, and the virtual plane region TR corresponds to the reference point Pr in the real space. The identifying part 32 identifies whether the target image extracted by the extracting part 31 is a person image. In this case, upon generating one normalized image, the extracting part 31 determines whether a helmet image is included in the normalized image. Alternatively, the extracting part 31 may determine, upon generating multiple normalized images, whether a helmet image is included in each of the normalized images at a time. As yet another alternative, the extracting part 31 may determine, upon generating all normalized images, whether a helmet image is included in each of all the normalized images at a time. The extracting part 31 may determine, upon normalizing part of a predetermined partial image, whether a helmet image is included in the partly normalized image.

A human body detecting device including an image sensor and a thermopile array that detects heat and reducing unnecessary computations in an image identification process by superimposing an image capturing area over a heat detecting area and limiting a face extracting area to only an area appearing to be a human body shown by the output of the thermopile array is known.

According to the above-described device, however, because the image sensor and the thermopile array have to be provided together and the image capturing area and the heat detecting area have to be superimposed exactly one over the other, the system configuration is complicated.

In view of the above, it is desired to provide a surroundings monitoring system for a work machine capable of detecting a person around a work machine with a simpler system configuration.

Figure 13:
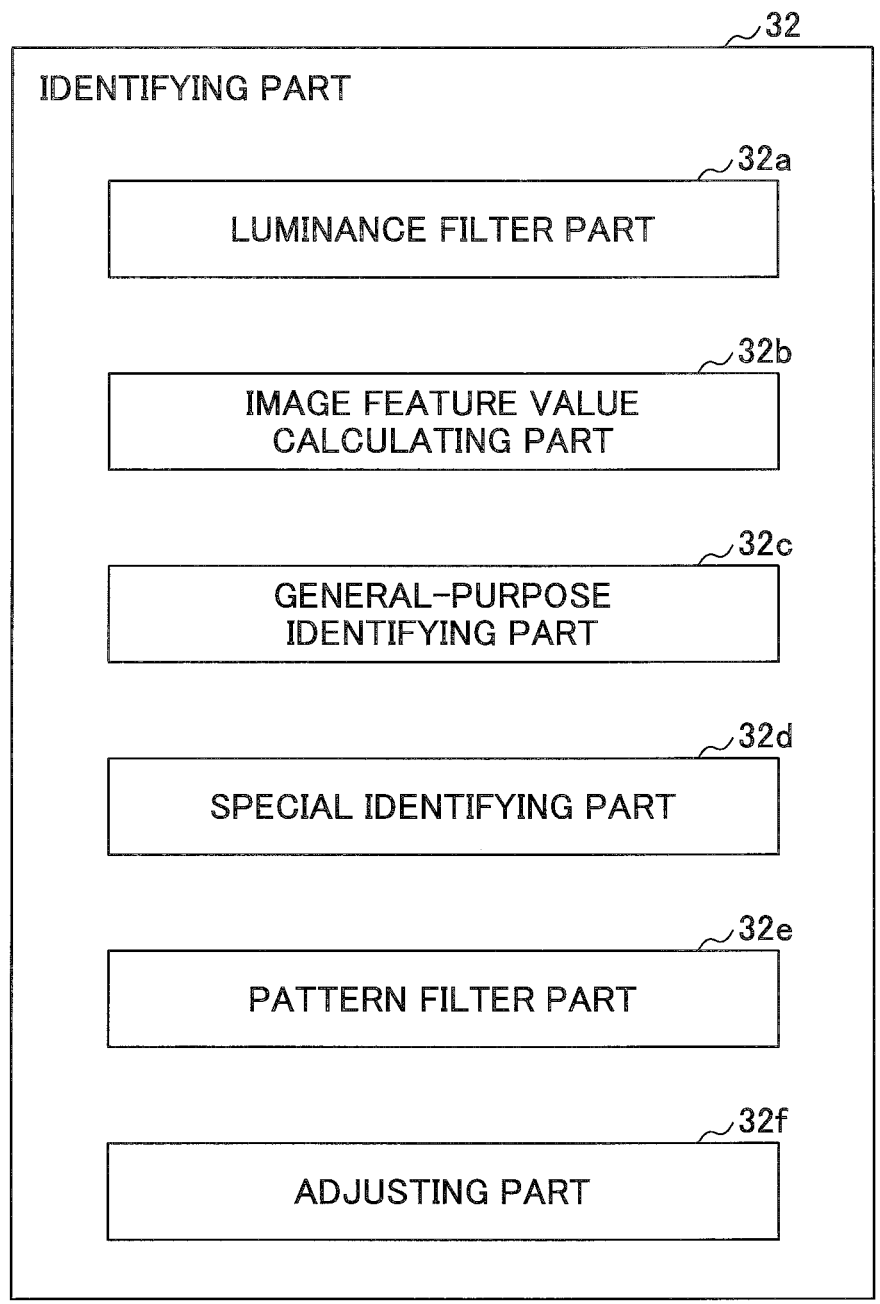
FIG. 13 is a functional block diagram illustrating a configuration of an identifying part.

Next, the details of the identifying part 32 are described with reference to FIG. 13. FIG. 13 is a functional block diagram illustrating a configuration of the identifying part 32.

The identifying part 32 mainly includes a luminance filter part 32*a*, an image feature value calculating part 32*b*, a general-purpose identifying part 32*c*, a special identifying part 32*d*, a pattern filter part 32*e*, and an adjusting part 32*f*.

The luminance filter part 32*a* is a supplementary identifying part to identify whether it is a person image based on the skewness of an image feature in a target image. The supplementary identifying part supplements identification based on an image feature value calculated by the image feature value calculating part 32*b*. The luminance filter part 32*a*, however, may be omitted.

According to this embodiment, identification by the luminance filter part 32*a* is executed before the general-purpose identifying part 32*c* outputs an identification result. Therefore, it is possible to prevent a target image identified as not being a person image by the luminance filter part 32*a* from being subjected to an identification process by the general-purpose identifying part 32*c* and thus to prevent an unnecessary identification process from being executed. Specifically, when the skewness of the luminance of a target image extracted by the extracting part 31 is at or above a predetermined value, the luminance filter part 32*a* identifies the target image as not being a person image, in order to prevent an erroneous report in identification based on an image feature value by the general-purpose identifying part 32*c* and the special identifying part 32*d*. An "erroneous report" means outputting an erroneous identification result, and for example, includes identifying that it is a person image although it is not a person image. When the skewness of the luminance of the target image is below the predetermined value, the luminance filter part 32*a* temporarily identifies the target image as a person image. In particular, when identification based on HOG features is performed, a luminance gradient histogram is normalized. Therefore, when a luminance gradient pattern due to the slight contrast of a road surface image in a target image resembles a luminance gradient pattern based on the presence of a person, the road surface image may be identified as a person image. The luminance filter part 32*a* can prevent such a road surface image from being identified as a person image. For example, the skewness of luminance tends to increase because of a strong shadow due to summer sunshine, a white line on a road surface, a curb, or the like. The luminance filter part 32*a* can prevent an image including such a cause from being identified as a person image.

Figure 14A:
FIG. 14A illustrates a normalized image as a target image extracted by an extracting part.
Figure 14B:
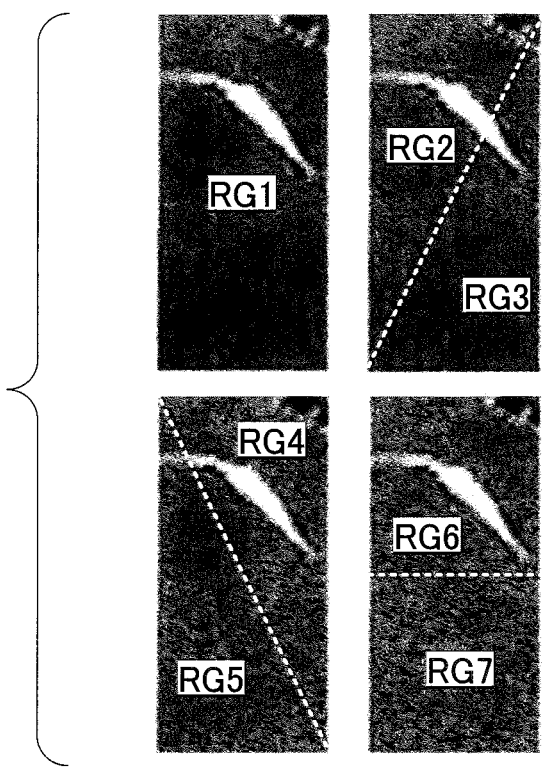
FIG. 14B is a diagram illustrating seven regions set with respect to the target image of FIG. 14A.

FIGS. 14A through 14C are diagrams illustrating an identification process by the luminance filter part 32*a*. FIG. 14A illustrates a normalized image TRgt as a target image extracted by the extracting part 31. FIG. 14B illustrates seven regions RG1 through RG7 set with respect to the target image of FIG. 14A. The region RG1 is a region corresponding to the entirety of the normalized image TRgt. The regions RG2 and RG3 are two regions separated by a diagonal line connecting the top right vertex and the bottom left vertex of the normalized image TRgt. The regions RG4 and RG5 are two regions separated by a diagonal line connecting the top left vertex and the bottom right vertex of the normalized image TRgt. The region RG6 is the upper half region of the normalized image TRgt, and the region RG6 is the lower half region of the normalized image TRgt.

The upper figure of FIG. 14C illustrates the luminance histogram of the pixels of the region RG1 of FIG. 14B. The lower figure of FIG. 14C illustrates an adjusted histogram after performing adjustment to sum up the values of adjacent bins in the histogram of the upper figure of FIG. 14C.

The target image of FIG. 14A includes the image of a white line on a road surface. As illustrated in FIG. 14A, when a target image locally has a relatively strong contrast but globally has a relatively weak contrast, the luminance filter part 32*a* identifies the target image as not being a person image.

Specifically, as illustrated in FIG. 14B, the luminance filter part 32*a* sets the seven regions RG1 through RG7 with respect to the target image. Then, the luminance filter part 32*a* executes the following process with respect to each of the seven regions RG1 through RG7. In the following, a process on the region RG1 is described by way of example, while the same process is applied to the regions RG2 to RG7.

First, the luminance filter part 32*a* calculates the effective pixel ratio of the region RG1. The "effective pixel ratio" means the ratio of the number of effective pixels to the number of all pixels within the region RG1. The "number of effective pixels" means the number of pixels in the region outside the masked regions (the number of non-masked pixels).

When the effective pixel ratio is less than or equal to a predetermined value (for example, 50%), the luminance filter part 32a identifies the target image as a person image because it is presumed that the effective pixel number is so small that appropriate identification cannot be performed. That is, when appropriate identification cannot be performed, the luminance filter part 32a temporarily identifies that it is a person image to prevent a person image from being erroneously identified as a non-person image, and lets a subsequent identification process perform ultimate identification.

When the effective pixel ratio is more than the predetermined value, the luminance filter part 32a generates a luminance histogram by classifying the luminance of the pixels of the region RG1 into 16 tones.

For example, as illustrated in the upper figure of FIG. 14C, the luminance filter part 32a converts and classifies the 256-tone luminance values of the pixels of the region RG1 into 16 tones by a bit-shift operation.

Then, the luminance filter part 32a adjusts the histogram of the upper figure of FIG. 14C by summing up the values of two adjacent bins in the histogram. The lower figure of FIG. 14 illustrates the adjusted histogram. Specifically, the value of the bin of the first tone of the lower figure of FIG. 14C is the sum of the value of the bin of the first tone and the value of the bin of the second tone of the upper figure of FIG. 14C. Likewise, the value of the bin of the second tone of the lower figure of FIG. 14C is the sum of the value of the bin of the second tone and the value of the bin of the third tone of the upper figure of FIG. 14C.

When the value of any bin of the adjusted histogram is more than or equal to a predetermined value TH1, the luminance filter part 32a identifies that the target image is not a person image. On the other hand, when the value of each bin of the adjusted histogram is less than the predetermined value TH1, the luminance filter part 32a temporarily identifies that the target image is a person image. This is because luminance, which tends to concentrate on a particular area because of a generally weak contrast in road surface images or the like, tends to distribute over a wide area because of a relatively strong contrast in person images. In the illustration of the lower figure of FIG. 14C, because the value of the bin of the fourth tone is more than or equal to the predetermined value TH1, the luminance filter part 32a identifies that the target image is not a person image. Furthermore, according to this embodiment, when the sum of the values of two adjacent bins is more than or equal to the predetermined value TH1, the luminance filter part 32a identifies that it is not a person image and stops summing up other two adjacent bins. In the illustration of the lower figure of FIG. 14C, the luminance filter part 32a stops calculating the values of the bins of the fifth and subsequent tones.

Thus, the luminance filter part 32a individually identifies whether the target image is a person image based on each of the regions RG1 through RG7. For example, the luminance filter part 32a identifies that the target image is not a person image when the effective pixel ratio is sufficiently high and there is a strong skewness in the luminance histogram.

Then, based on the seven identification results, the luminance filter part 32a outputs the final result of identification by the luminance filter part 32a. For example, when all of the seven identification results are that "it is not a person image," the luminance filter part 32a identifies that the target image is not a person image.

Furthermore, in response to identifying that the target image is not a person image because of a large skewness of the luminance of the target image, the luminance filter part 32a may so notify the operator through the output apparatus 50.

In the above-described case, the luminance filter part 32a substantively converts and classifies luminance of 256 tones into 16 tones and thereafter further converts and classifies the luminance into 8 tones. That is, the luminance filter part 32a performs two-step conversion. This is because compared with the case of converting luminance of 256 tones directly into 8 tones (the case of single-step conversion), it is possible to accurately inherit an image feature with respect to the luminance of the target image. The luminance filter part 32a, however, may convert and classify luminance of 256 tones directly into 8 tones and then perform identification using the predetermined value TH1. Alternatively, the luminance filter part 32a may perform conversion of three or more steps, or the final tones may be other than 8 tones.

Furthermore, in the above-described case, a pixel number of 77% of the total number of pixels (except for the number of missing pixels) within a region is employed as the predetermined value TH1. Alternatively, another number of pixels may be employed as the predetermined value TH1. The number of missing pixels means, for example, the number of pixels of a masked region.

The image feature value calculating part 32b calculates the image feature value of the target image. According to this embodiment, the image feature value calculating part 32b divides the target image of vertically 64 pixels and horizontally 32 pixels into 128 HOG blocks of vertically 4 pixels and horizontally 4 pixels, and calculates a luminance gradient histogram as an image feature value (HOG feature) with respect to each HOG block.

The general-purpose identifying part 32c is a general-purpose classifier generated by machine learning using many teacher images. According to this embodiment, the general-purpose identifying part 32c is set so that, for example, a true positive rate, which is the ratio of the number of teacher images whose identification result is true positive to the total number of teacher images, is 95% and a true negative rate, which is the ratio of the number of teacher images whose identification result is true negative to the total number of teacher images, is 95%. The "true positive" means that a person image is correctly identified as a person image, and the "true negative" means that a non-person image is correctly identified as a non-person image.

The special identifying part 32d is a classifier generated by machine learning using many teacher images whose identification result by the preceding classifier is false positive. The "false positive" means that a non-person image is erroneously identified as a person image. The "false negative" means that a person image is erroneously identified as a non-person image. According to this embodiment, the special identifying part 32d includes a first special classifier through a fourth special classifier generated by machine learning using teacher images whose identification result by the general-purpose classifier is false positive. The teacher images whose identification result by the general-purpose classifier is false positive are subjected to clustering (classification) to be partitioned into a predetermined number (for example, the same number as the number of special classifiers, and four in this embodiment) by, for example, k-means clustering. A corresponding special classifier is generated by machine learning using the teacher images included in each cluster.

The general-purpose identifying part 32c and the special identifying part 32d constitute a cascade classifier. Specifically, identification by the fourth special classifier is performed on only a target image identified as a person image by identification by the third special classifier. Likewise, identification by the third special classifier is performed on only a target image identified as a person image by identification by the second special classifier, and identification by the second special classifier is performed on only a target image identified as a person image by identification by the first special classifier. Furthermore, identification by the first special classifier is performed on only a target image identified as a person image by identification by the general-purpose identifying part 32c. The special identifying part 32d, however, may alternatively be constituted of one, two, or three special classifiers or may alternatively be constituted of five or more special classifiers.

Figure 15A:
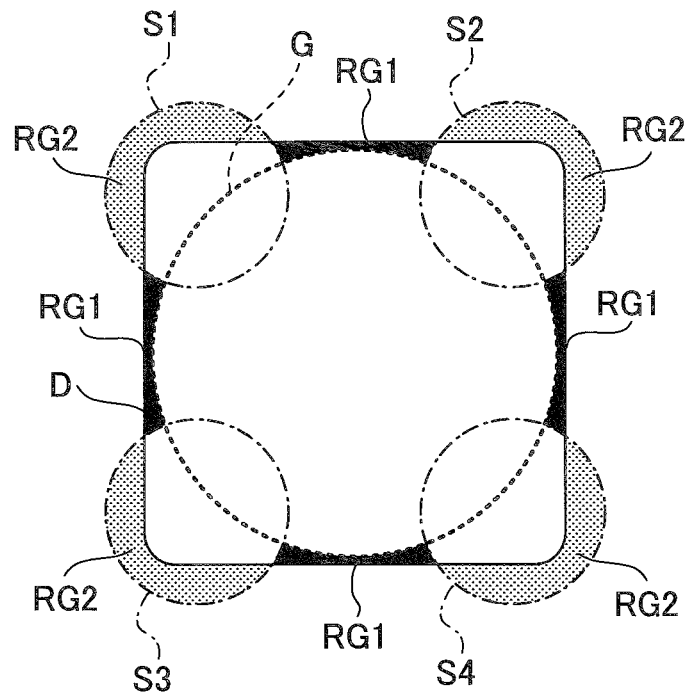
FIG. 15A is a concept diagram illustrating the person identifying capability of the identifying part.
Figure 15B:
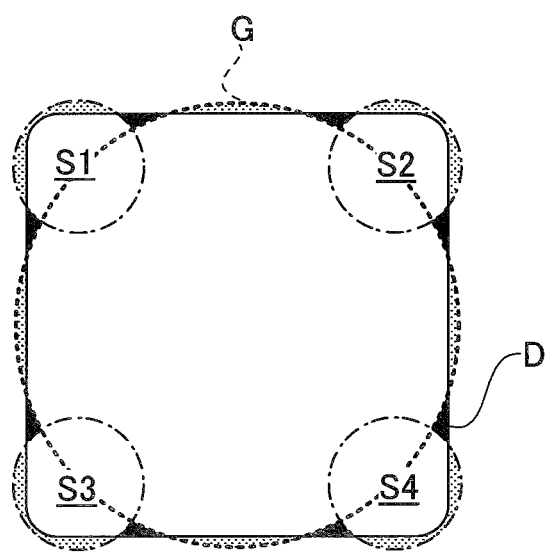
FIG. 15B is another concept diagram illustrating the person identifying capability of the identifying part.
Figure 15C:
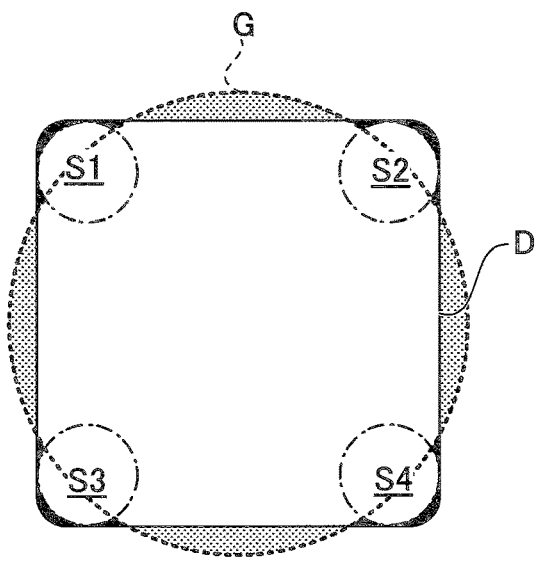
FIG. 15C is yet another concept diagram illustrating the person identifying capability of the identifying part.

FIGS. 15A through 15C are concept diagrams illustrating the person identifying capability of the identifying part 32. Specifically, FIGS. 15A through 15C illustrate three cases of the combinations of a region to which target images identified as a person image by the general-purpose identifying part 32c belong, a region to which target images identified as a non-person image by the general-purpose identifying part 32c belong, a region to which target images identified as a person image by the special identifying part 32d belong, and a region to which target images identified as a non-person image by the special identifying part 32d belong.

In each of FIGS. 15A through 15C, a substantially rectangular region D bounded by a solid line represents a region to which non-person images belong. The outside of the region D represents a region to which person images belong. A region G encircled by a dotted line circle represents a region to which target images identified as a non-person image by the general-purpose identifying part 32c belong. The outside of the region G represents a region to which target images identified as a person image by the general-purpose identifying part 32c belong. Furthermore, a region S1 encircled by a one-dot chain line circle represents a region to which target images identified as a non-person image by the first special classifier belong. The outside of the region S1 represents a region to which target images identified as a person image by the first special classifier belong. Likewise, regions S2, S3 and S4 encircled by a one-dot chain line circle represent regions to which target images identified as a non-person image by the second, the third, and the fourth special classifier belong. The outside of the regions S2, S3 and S4 represents regions to which target images identified as a person image by the second, the third, and the fourth special classifier belong.

From the above-described relationship, in each of FIGS. 15A through 15C, a region RG1 filled with black represents a region to which target images whose result of identification by the identifying part 32 is false positive belong. That is, the region RG1 represents a region to which target images that are non-person images but are identified as a person image by each of the general-purpose identifying part 32c and the special identifying part 32d belong. A region RG2 indicated by a dot pattern represents a region to which target images whose result of identification by the identifying part 32 is false negative belong. That is, the region RG2 represents a region to which target images that are person images but are identified as a non-person image by the special identifying part 32d belong. Accordingly, erroneous reports increase as the region RG1 increases, and missed reports increase as the region RG2 increases.

In the three cases of FIGS. 15A through 15C, the person identifying capability of the identifying part 32 is substantially the same. That is, the cases are substantially equal in the total area of the region RG1 and the total area of the region RG2, and are also substantially equal in the true positive rate, the true negative rate, the false positive rate, and the false negative rate.

The region G of FIG. 15A is smaller than the region G of FIG. 15B, and the region G of FIG. 15B is smaller than the region G of FIG. 15C. Furthermore, the region G of FIG. 15A is completely included in the region D. This indicates that the true negative rate of identification by the general-purpose identifying part 32c is 100% (with no erroneous report). Furthermore, the region G of FIG. 15C protrudes considerably from the region D. This indicates that the false negative rate of identification by the general-purpose identifying part 32c is relatively high (with a relatively large number of missed reports).

The regions S1 through S4 of FIG. 15A are larger than the regions S1 through S4 of FIG. 15B, and the regions S1 through S4 of FIG. 15B are larger than the regions S1 through S4 of FIG. 15C. Furthermore, the regions S1 through S4 of FIG. 15C are completely included in the region D. This indicates that the true negative rate of identification by the special identifying part 32d is 100% (with no erroneous report). Furthermore, the regions S1 through S4 of FIG. 15A protrude considerably from the region D. This indicates that the false negative rate of identification by the special identifying part 32d is relatively high (with a relatively large number of missed reports).

Accordingly, the identifying part 32 having the characteristics represented by FIG. 15B can reduce erroneous reports in identification by the general-purpose identifying part 32c without changing the person identifying capability, compared with the identifying part 32 having the characteristics represented by FIG. 15A. In addition, the identifying part 32 having the characteristics represented by FIG. 15B can reduce erroneous reports in identification by the special identifying part 32d without changing the person identifying capability, compared with the identifying part 32 having the characteristics represented by FIG. 15C.

The pattern filter part 32e is a supplementary identifying part. According to this embodiment, identification by the pattern filter part 32e is executed after the identification result of the general-purpose identifying part 32c is output. Therefore, it is possible to overrule an erroneous identification result of the general-purpose identifying part 32c. Specifically, in response to determining that the skewness of the identification results of multiple weak classifiers constituting a general-purpose classifier as the general-purpose identifying part 32c is inappropriate as a person image, the pattern filter part 32e identifies that the target image is not a person image. In this case, even when the general-purpose identifying part 32c has identified that it is a person image, the pattern filter part 32e identifies that it is not a person image, in order to prevent an erroneous report in identification based on an image feature value by the general-purpose identifying part 32c and the special identifying part 32d. On the other hand, in response to determining that the skewness of the identification results is appropriate as a person image, the pattern filter part 32e identifies that the target image is a person image. That is, the pattern filter part 32e does not overrule the result of identification by the general-purpose identifying part 32c. The pattern filter part 32e, however, may be omitted.

The "weak classifier" is a component of a strong classifier generated by machine learning using many teacher images. Examples of the strong classifier include the general-purpose classifier, the first through fourth special classifiers, etc. The identification result of the strong classifier is based on the weighted majority of the identification results of multiple weak classifiers that are the components of the strong classifier.

The "identification result" is expressed by, for example, a "person factor" that is a value representing the likelihood of being a person. The "person factor" becomes a positive value of a greater absolute value as the likelihood of being a person becomes higher, and becomes a negative value of a greater absolute value as the likelihood of being a person becomes lower. The value zero of the "person factor" may be used as a value representing the identification boundary between a person image and a non-person image (hereinafter, "identification boundary value"). In this case, it is identified as a person image when the "person factor" value is more than or equal to zero, and it is identified as a non-person image when the "person factor" value is less than zero. The identification boundary value, however, may alternatively be a positive value or a negative value. The identification boundary value is used as an adjustment parameter for adjusting the tendency of occurrence of erroneous reports of identification by each of the general-purpose identifying part 32c and the special identifying part 32d.

Like the strong classifier, the weak classifier is generated by machine learning using many teacher images. According to this embodiment, weak classifiers are generated each correlated with one of 128 HOG blocks in a single target image, and output an identification result HOG block by HOG block.

Figure 16A:
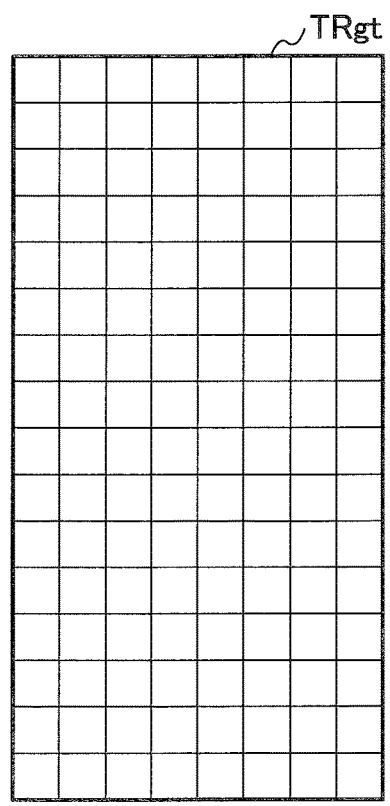
FIG. 16A is a diagram illustrating a normalized image being divided into HOG blocks.
Figure 16B:
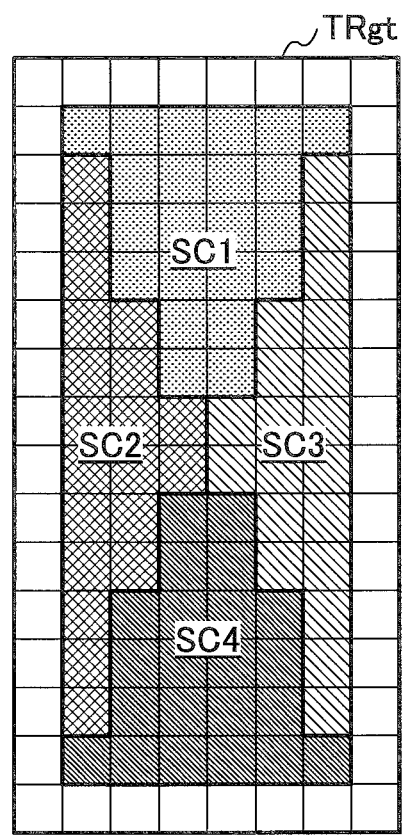
FIG. 16B is a diagram illustrating HOG blocks in the center of the normalized image being divided into four sections.
Figure 16C:
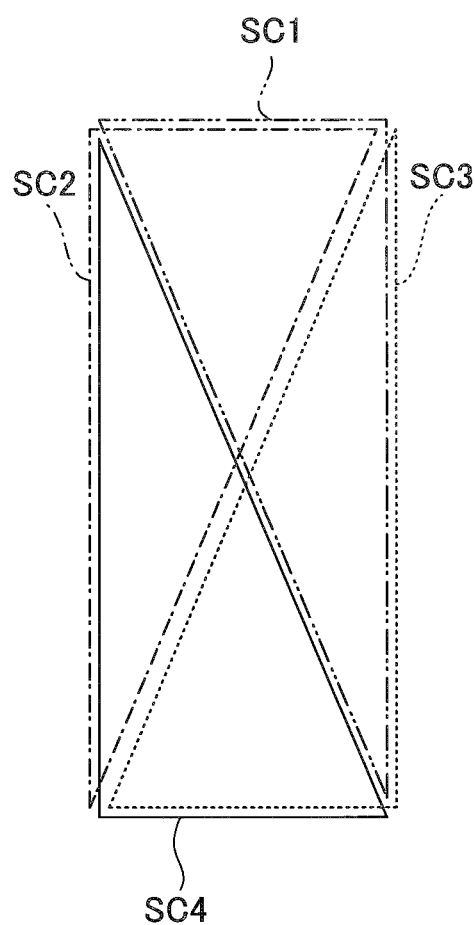
FIG. 16C is a diagram illustrating another configuration of the four sections.

FIGS. 16A through 16C are concept diagrams illustrating the relationship between the normalized image TRgt as a target image and weak classifiers. FIG. 16A illustrates the normalized image TRgt of vertically 64 pixels and horizontally 32 pixels being divided into 128 HOG blocks of vertically 16 blocks and horizontally 8 blocks. FIG. 16B illustrates 84 HOG blocks in the center of the normalized image TRgt being divided into four sections SC1 through SC4. The normalized image TRgt is divided into the four sections SC1 through SC4 by two diagonal lines. FIG. 16C illustrates another configuration of the four sections SC1 through SC4.

Basically, the identification result of each of the general-purpose identifying part 32c and the special identifying part 32d as a strong classifier is based on the weighted majority of the identification results of 128 weak classifiers as illustrated in FIG. 16A. For example, the strong classifier outputs an identification result that it is a person image when the person factor derived by the weighted majority is more than or equal to zero, and outputs an identification result that it is a non-person image when the person factor is less than zero.

Apart from the strong classifiers, the identifying part 32 of this embodiment includes four composite weak classifiers. The composite weak classifiers are first through fourth composite weak classifiers. The identification result of the first composite weak classifier is based on the weighted majority of the identification results of 22 weak classifiers corresponding one-to-one to 22 HOG blocks belonging to the section SC1 illustrated in FIG. 16B. The 22 weak classifiers are also weak classifiers of the general-purpose classifier. The same applies to the identification results of the second through fourth composite weak classifiers.

The pattern filter part 32e determines, based on a combination of the identification results of the composite weak classifiers (identification result pattern), whether the skewness of the identification results of multiple weak classifiers constituting the general-purpose classifier as the general-purpose identifying part 32c is appropriate as a person image. In response to determining that the skewness of the identification results is inappropriate as a person image, the pattern filter part 32e identifies that the target image is not a person image even if the identification result by the general-purpose identifying part 32c is a person image.

According to this embodiment, 16 identification result patterns are generated from the combinations of the identification results of the first through fourth composite weak classifiers. At least one of the 16 identification result patterns is preset as a normal pattern, and the other identification result patterns are preset as an abnormal pattern. The normal pattern includes, for example, the case where all the identification results of the first through fourth composite weak classifiers are a "person image." The abnormal pattern includes, for example, the case where two or more of the identification results of the first through fourth composite weak classifiers are a "non-person image."

When a combination of the identification results of the first through fourth composite weak classifiers belongs to the normal pattern, the pattern filter part 32e determines that the skewness of the identification results of multiple weak classifiers constituting the general-purpose classifier is appropriate as a person image, and identifies that a relevant target image is a person image. That is, the pattern filter part 32e does not overrule the result of identification by the general-purpose identifying part 32c. On the other hand, when a combination of the identification results of the first through fourth composite weak classifiers belongs to the abnormal pattern, the pattern filter part 32e determines that the skewness of the identification results of multiple weak classifiers constituting the general-purpose classifier is inappropriate as a person image, and identifies that a relevant target image is not a person image even if the result of identification by the general-purpose identifying part 32c is a person image.

A weak classifier belonging to one of the four composite weak classifiers may belong to one or more other composite weak classifiers among the four composite weak classifiers. For example, as illustrated in FIG. 16C, part of the section SC1 bounded by a two-dot chain line may coincide with part of the section SC2 bounded by a one-dot chain line, and another part of the section SC1 may coincide with part of the section SC3 bounded by a dashed line. Furthermore, part of the section SC4 bounded by a solid line may coincide with part of the section SC2, and another part of the section SC4 may coincide with part of the section SC3. Furthermore, the sections may be spaced apart from one another. For example, there may be a weak classifier that does not belong to any of the sections between two of the sections.

Alternatively, the number of composite weak classifiers may be any of one, two and three or five or more.

In the above-described case, in response to determining that the skewness of the identification results of multiple weak classifiers constituting the general-purpose classifier is inappropriate as a person image, the pattern filter part 32e identifies that the target image is not a person image even if the result of identification by the general-purpose classifier is a person image. In response to determining that the skewness of the identification results of multiple weak classifiers constituting the special classifier is inappropriate as a person image, the pattern filter part 32e may identify that the target image is not a person image even if the result of identification by the special classifier is a person image.

Furthermore, in the case of identifying that the target image is not a person image because the skewness of the identification results of multiple weak classifiers is inappropriate as a person image, the pattern filter part 32e may so notify the operator through the output apparatus 50.

The adjusting part 32f is a functional element to adjust the characteristics of the identifying part 32. According to this embodiment, the adjusting part 32f changes an adjustment parameter related to at least one of the general-purpose identifying part 32c and the special identifying part 32d in response to an operator's command input through the input apparatus 41. The adjustment parameter is a parameter for adjusting the characteristics of the identifying part 32, and includes information on the characteristics of multiple classifiers constituting the identifying part 32. According to this embodiment, the adjustment parameter is a parameter for adjusting the tendency of occurrence of erroneous reports, and is, for example, the identification boundary value.

For example, the adjusting part 32f changes at least one of the true positive rate and the false positive rate of identification by at least one of the general-purpose identifying part 32c and the special identifying part 32d by changing the identification boundary value. Specifically, the adjusting part 32f selects one characteristic setting from among multiple pre-registered characteristic settings (preset data) of substantially the same person identifying capability in response to an operator's command. The characteristic settings of substantially the same person identifying capability are, for example, the three different characteristic settings of the identifying part 32 illustrated in FIGS. 15A through 15C. For example, the adjusting part 32f switches a current characteristic setting as illustrated in FIG. 15B to a characteristic setting as illustrated in FIG. 15A in response to an operator's input through a touchscreen or the like. Alternatively, the adjusting part 32f may directly change the identification boundary value instead of selecting one characteristic setting from among the pre-registered characteristic settings.

For example, each of the characteristic settings is correlated with one or more usage environments. For example, a junkyard as a usage environment of a shovel is correlated with the characteristic setting illustrated in FIG. 15A, and a road construction site as a usage environment of a shovel is correlated with the characteristic setting illustrated in FIG. 15C. Each characteristic setting is composed of a combination of the value of an adjustment parameter related to the general-purpose identifying part 32c and the value of an adjustment parameter related to the special identifying part 32d (hereinafter, "adjustment parameter set"). Accordingly, selecting one characteristic setting from among multiple characteristic settings means selecting one adjustment parameter set from among multiple adjustment parameter sets. An adjustment parameter set may be selected in any manner. For example, the adjusting part 32f may select one adjustment parameter set from among multiple adjustment parameter sets by causing an operator to select a usage environment category of a shovel, such as a junkyard, a road construction site, a dredging work site or the like, on a screen.

Furthermore, when noticing the occurrence of an erroneous report, the operator may notify the identifying part 32 of the occurrence of the erroneous report and a target image that has caused the erroneous report, using the input apparatus 41. In this case, the adjusting part 32f may automatically select a more appropriate characteristic setting from among the pre-registered characteristic settings based on the contents of the notification. The more appropriate characteristic setting is, for example, a characteristic setting that is less likely to cause the occurrence of an erroneous report with respect to the target image.

Because of this configuration, for example, by switching the characteristic setting of FIG. 15A to the characteristic setting of FIG. 15B, the adjusting part 32f can reduce erroneous reports by the general-purpose identifying part 32c (erroneous reports to scatter over the entire background) while maintaining a person identifying capability. This switching means decreasing the false positive rate of identification by the general-purpose identifying part 32c and increasing the true positive rate of identification by the special identifying part 32d. As a result, it is possible to reduce situations where erroneous reports are caused to occur evenly over the entirety of a captured image that shows a particular usage environment such as a junkyard.

Furthermore, for example, by switching the characteristic setting of FIG. 15C to the characteristic setting of FIG. 15B, the adjusting part 32f can reduce erroneous reports by the special identifying part 32d (erroneous reports that concentrate on a specific part) while maintaining a person identifying capability. This switching means decreasing the false positive rate of identification by the special identifying part 32d and increasing the true positive rate of identification by the general-purpose identifying part 32c. As a result, it is possible to reduce situations where an image of a particular signboard or the like is repeatedly identified as a person image.

Furthermore, the adjusting part 32f can simply and swiftly adjust the tendency of occurrence of erroneous reports by the identifying part 32 without requiring troublesome work such as re-generating a classifier using learning samples that differ from usage environment to usage environment. As a result, it is possible to flexibly address the tendency of occurrence of erroneous reports that differs from usage environment to usage environment.

Furthermore, the adjusting part 32f, which adopts the identification boundary value in the above-described case, may alternatively adopt other values as an adjustment parameter. For example, another adjustment parameter whose value varies in accordance with the characteristics of the extracting part 31, the tracking part 33, etc., may be adopted. Alternatively, a value related to the grayscale conversion of a target image may be adopted as an adjustment parameter.

In addition, the adjusting part 32f may switch the connection method of classifiers in accordance with the usage environment of a shovel. For example, the adjusting part 32f may change the order of identification by the general-purpose classifier and the first through fourth special classifiers that are cascade-connected. Information on the connection method, such as the order of identification, is included in a characteristic setting. Thus, the adjusting part 32f can select one characteristic setting from among the pre-registered characteristic settings to generate and adjust a cascade classifier.

Moreover, in response to determining that the tendency of occurrence of erroneous reports by the identifying part 32 cannot be changed even by switching the adjustment parameter set, the adjusting part 32f may so notify the operator in order to notify the operator of the necessity of machine learning based on new teacher images.

Because of the above-described configuration, the surroundings monitoring system 100 to be mounted on a shovel to be used in various usage environments can adjust the characteristics of a person identifying capability by using an adjustment parameter set suitable for a usage environment. As a result, the surroundings monitoring system 100 can reduce particular erroneous reports that occur in a particular usage environment.

Figure 17:
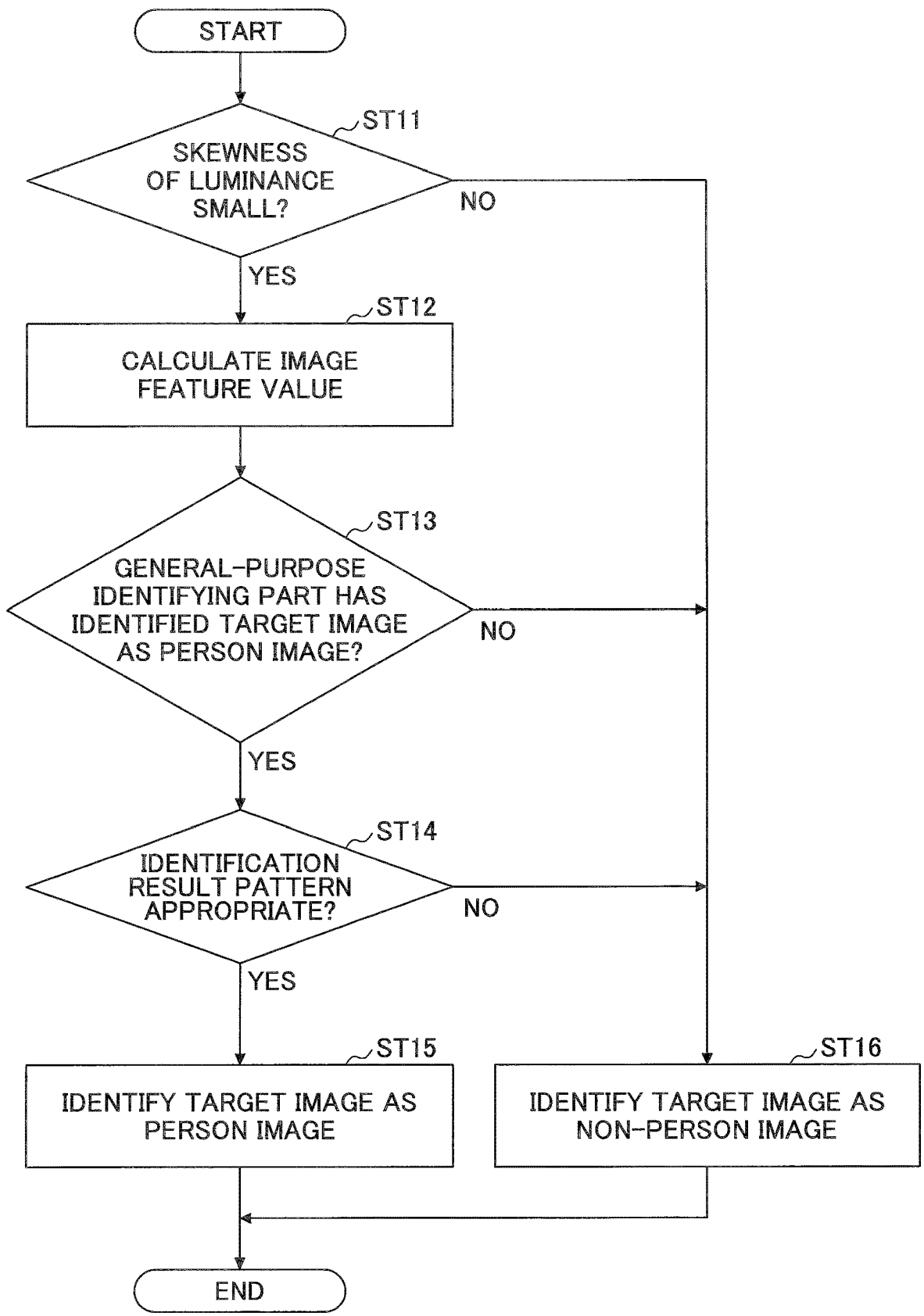
FIG. 17 is a flowchart illustrating the flow of an identification process.

Next, a flow of an identification process by the identifying part 32 is described with reference to FIG. 17. FIG. 17 is a flowchart illustrating the flow of an identification process. The identifying part 32 repeatedly executes this identification process every time a target image is obtained.

First, the luminance filter part 32a of the identifying part 32 determines whether the skewness of the luminance of a target image is small (step ST11). According to this embodiment, the luminance filter part 32a determines that the skewness of the luminance of a target image is small if each of the values of the bins of the histogram of the luminance of the pixels of the target image is less than a predetermined value.

In response to determining that the skewness of the luminance of a target image is small (YES at step ST11), the image feature value calculating part 32b of the identifying part 32 calculates the image feature value of the target image (step ST12). According to this embodiment, the image feature value calculating part 32b divides the target image of vertically 64 pixels and horizontally 32 pixels into 128 HOG blocks of vertically 4 pixels and horizontally 4 pixels, and calculates a luminance gradient histogram as an image feature value (HOG feature) with respect to each HOG block. Then, each of the general-purpose identifying part 32c and the special identifying part 32d of the identifying part 32 identifies whether the target image is a person image or a non-person image based on the HOG features calculated by the image feature value calculating part 32b.

Thereafter, the pattern filter part 32e of the identifying part 32 determines whether the general-purpose identifying part 32c has identified the target image as a person image (step ST13).

In response to determining that the result of identification by the general-purpose identifying part 32c is a person image (YES at step ST13), the pattern filter part 32e determines whether the identification result pattern, which is a combination of the identification results of multiple composite weak classifiers constituting the general-purpose identifying part 32c, is appropriate (step ST14).

In response to determining that the identification result pattern is appropriate (YES at step ST14), the identifying part 32 identifies the target image as a person image (step ST15).

In response to determining that the skewness of the luminance of a target image is large (NO at step ST11), determining that the result of identification by the general-purpose identifying part 32c is a non-person image (NO at step ST13), or determining that the identification result pattern is not appropriate (NO at step ST14), the identifying part 32 identifies the target image as a non-person image (step ST16).

Thus, apart from identification by classifiers, the surroundings monitoring system 100 supplementally identifies whether it is a person image based on the skewness of image features such as the skewness of luminance and the skewness of the identification results of multiple weak classifiers constituting the general-purpose classifier. Therefore, it is possible to prevent a particular background image or the like from being identified as a person image to increase a person identifying capability.

Figure 18:
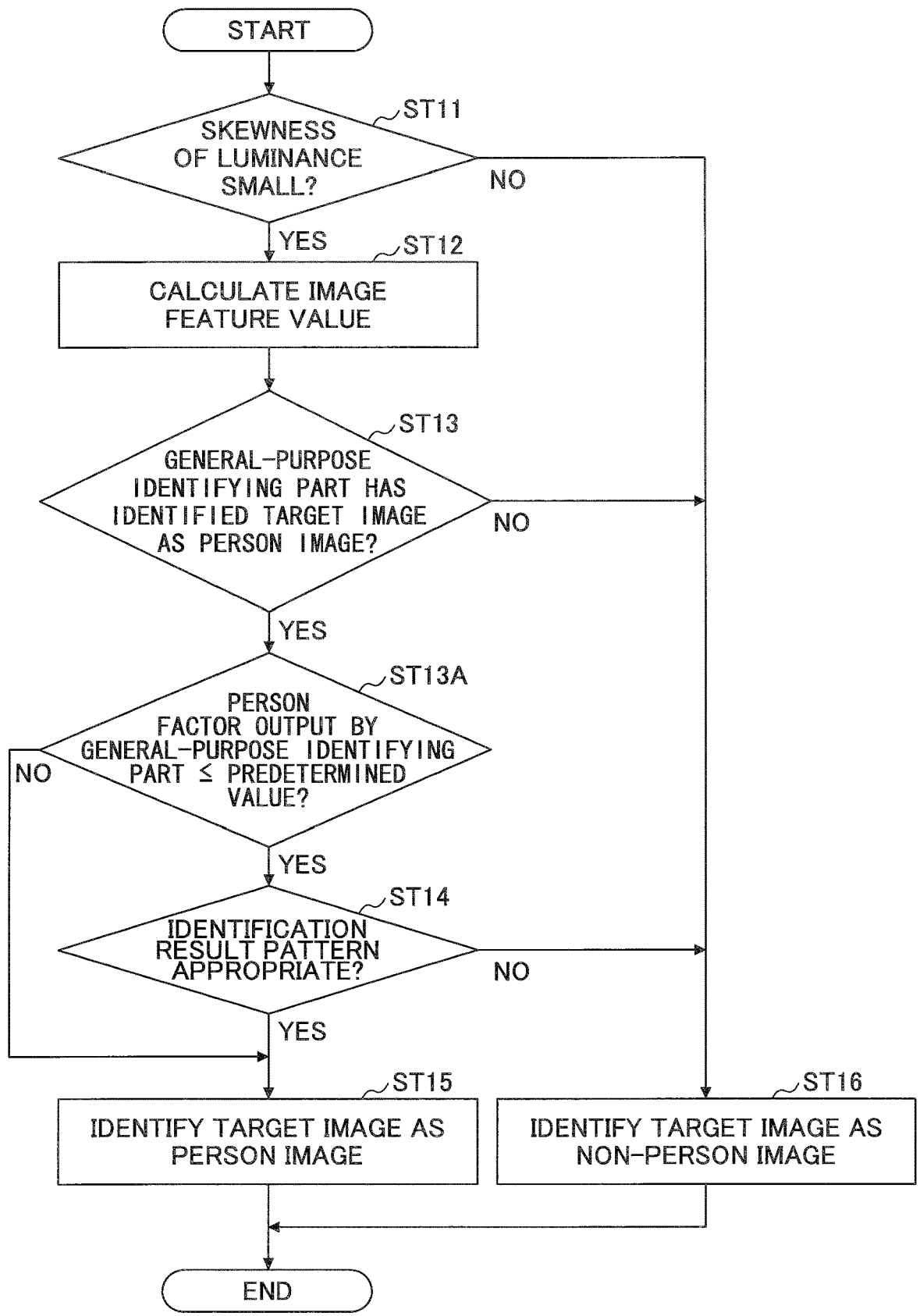
FIG. 18 is a flowchart illustrating the flow of an identification process.

Next, a flow of an identification process by the identifying part 32 is described with reference to FIG. 18. FIG. 18 is a flowchart illustrating the flow of another identification process, and the identifying part 32 repeatedly executes this identification process every time a target image is obtained. The identification process of FIG. 18 is different in including step ST13A from, but otherwise is equal to, the identification process of FIG. 17. Therefore, a description of a common portion is omitted, and differences are described in detail.

In response to determining that the result of identification by the general-purpose identifying part 32c is a person image (YES at step ST13), the identifying part 32 determines whether a person factor that the general-purpose identifying part 32c outputs as an identification result is less than or equal to a predetermined value (step ST13A). This predetermined value is, for example, a value sufficiently greater than the identification boundary value.

In response to determining that the person factor is less than or equal to a predetermined value (YES at step ST13A), the pattern filter part 32e of the identifying part 32 determines whether an identification result pattern that is a combination of the identification results of multiple composite weak classifiers constituting the general-purpose identifying part 32c is appropriate (step ST14). The subsequent process is the same as in the identification process of FIG. 17.

In response to determining that the person factor is more than a predetermined value (NO at step ST13A), the identifying part 32 identifies the target image as a person image without determining whether the identification result pattern is appropriate (step ST15).

Thus, according to the identification process of FIG. 18, the supplementary identification by the pattern filter part 32e is omitted when the general-purpose identifying part 32c determines that the target image is obviously a person image.

As a result, the identification process of FIG. 18 can reduce a processing load while achieving the same effects as the identification process of FIG. 17.

Here, referring again to FIG. 2, a description continues to be given of other functional elements of the controller 30.

The tracking part 33 is a functional element to output a final person detection result by tracking identification results that the identifying part 32 outputs at predetermined time intervals. According to this embodiment, the tracking part 33 determines, when a predetermined number of successive identification results with respect to the same person satisfy a predetermined condition, that a corresponding prospective person image is a person image. That is, the tracking part 33 determines that a person is present at a corresponding three-dimensional position (an actual location). Whether it is the same person is determined based on the actual location. Specifically, the tracking part 33, based on the actual location (reference point PrI) of a person in an image identified as a person image in the first identification process by the identifying part 32, derives the reachable area of the person within a predetermined time. The reachable area is determined based on the maximum swing speed of the shovel, the maximum travel speed of the shovel, the maximum travel speed of a person, etc. Then, if the actual location (reference point PrII) of a person in an image identified as a person image in the second identification process is within the area, the tracking part 33 determines that it is the same person. The same applies to the third and subsequent identification processes. When it is identified as a person image of the same person in, for example, four out of six successive identification results, the tracking part 33 determines that a person is present at a corresponding three-dimensional position. Furthermore, even when it is identified as a person image in the first identification process, the tracking part 33 determines that a person is absent at a corresponding three-dimensional position if a person image of the same person is not identified in the subsequent three successive identification processes.

Thus, the extracting part 31, the identifying part 32, and the tracking part 33 in combination form a person detecting part 34 to detect the presence or absence of a person around the shovel based on a captured image of the image capturing apparatus 40.

This configuration makes it possible for the person detecting part 34 to reduce the occurrence of an erroneous report (determining that a person is present although no person is present), a missed report (determining that a person is absent although a person is present), etc.

Furthermore, the person detecting part 34 can determine whether a person is moving toward or away from the shovel based on changes in the actual location of a person in an image identified as a person image. The person detecting part 34 may output a control command to the control part 35 to cause the control part 35 to issue an alarm when the distance from the shovel to the actual location of the person falls below a predetermined value. In this case, the person detecting part 34 may adjust the predetermined value in accordance with the operation information (for example, the swing speed, swing direction, travel speed, travel direction, etc.) of the shovel.

Furthermore, the person detecting part 34 may determine and recognize a person detected state having at least two stages and a person undetected state. For example, the person detecting part 34 may determine a state where at least one of a distance-related condition and a reliability-related condition is satisfied as a first person detected state (an on-alert state) and determine a state where both are satisfied as a second person detected state (an alarming state). The distance-related condition includes, for example, that the distance from the shovel to the actual location of a person in an image identified as a person image is less than a predetermined value. The reliability-related condition includes, for example, that it is identified as a person image of the same person in four out of six successive identification results. In the first person detected state (on-alert state), a first alarm is output as a preliminary alarm lower in accuracy but faster in response. The first alarm, which is, for example, a low-volume beep sound, is automatically stopped when neither of the two conditions is satisfied. In the second person detected state (alarming state), a second alarm is output as a formal alarm higher in accuracy but slower in response. The second alarm, which is, for example, a large-volume melody sound, is not automatically stopped even when at least one of the conditions is not satisfied, and requires an operator's operation to be stopped.

The control part 35 is a functional element to control various apparatuses. According to this embodiment, the control part 35 controls various apparatuses in response to an operator's inputs through the input apparatus 41. For example, the control part 35 switches a display image displayed on the screen of an in-vehicle display in response to an image switch command input through a touchscreen. The display image includes a through image of the back-side camera 40B, a through image of the right-side camera 40R, a through image of the left-side camera 40L, a view transformed image, etc. A view transformed image is, for example, a bird's-eye image (an image viewed from a virtual viewpoint immediately above the shovel) into which captured images of multiple cameras are synthesized.

Furthermore, the control part 35 controls various apparatuses in accordance with the final person detection result of the tracking part 33 constituting the person detecting part 34. For example, the control part 35 outputs a control command to the machine control unit 51 in accordance with the final person detection result of the tracking part 33 to switch the state of the shovel between a first state and a second state. The first state includes a state where a restriction on the operation of the shovel is canceled, a state where the output of an alarm is stopped, etc. The second state includes a state where the operation of the shovel is restricted or stopped, a state where an alarm is being output, etc. According to this embodiment, in response to determining that a person is present within a predetermined area around the shovel based on the final person detection result of the tracking part 33, the control part 35 outputs a control command to the machine control unit 51 to switch the state of the shovel from the first state to the second state. For example, the operation of the shovel is stopped. In this case, an operation by the operator is invalidated. The invalidation of an operation by the operator is realized by, for example, making the operation apparatus unresponsive. Specifically, the operation of the shovel is stopped by forcibly creating a non-operating state by outputting a control command to the gate lock valve to separate the operation apparatus from a hydraulic system. Alternatively, a control command may be output to the engine control unit to stop the engine. As yet another alternative, the operation of a hydraulic actuator may be restricted by outputting a control command to a control valve controlling the flow rate of hydraulic oil flowing into the hydraulic actuator to change the opening area, opening area changing speed, etc., of the control valve. In this case, the maximum swing speed, the maximum travel speed, etc., are reduced. Alternatively, the control valve may be closed to stop the operation of the hydraulic actuator.

Furthermore, the control part 35 returns the state of the shovel to the first state when a predetermined cancellation condition is satisfied after setting the state of the shovel to the second state. That is, when a predetermined condition is satisfied after the operation of the shovel is restricted or stopped, the restriction or stopping is canceled. The predetermined cancellation condition includes, for example, "determining that a person is absent within a predetermined area around the shovel" (hereinafter, "first cancellation condition"). Furthermore, the predetermined cancellation condition additionally includes, for example, that "it is ensured that the shovel is prevented from starting to operate" (hereinafter, "second cancellation condition"). Furthermore, the predetermined cancellation condition may include that "it is confirmed by the operator that a person is absent around the shovel" (hereinafter, "third cancellation condition"). According to this embodiment, whether or not the operation of the shovel is restricted or stopped and whether each of the first cancellation condition, the second cancellation condition, and the third cancellation condition is satisfied are managed using a flag.

The first cancellation condition includes, for example, that "the control part 35 determines that a person is absent within a predetermined area around the shovel, based on the final person detection result of the tracking part 33 constituting the person detecting part 34."

The second cancellation condition includes, for example, that "all operation apparatuses are in a neutral position for a predetermined time or more," "the gate lock lever is lowered (the operation apparatuses are disabled)," "the operator's hands and feet are off all operation apparatuses," "a predetermined button operation has been performed," etc. The control part 35 detects that "all operation apparatuses are in a neutral position" based on, for example, the presence or absence of commands from the operation apparatuses, the output values of sensors that detect the amount of operation of the operation apparatuses, etc. The condition "for a predetermined time or more" is effective in preventing the second cancellation condition from being satisfied by just being in a neutral position for a moment. The control part 35 detects that "the operator's hands and feet are off operation apparatuses" based on, for example, a captured image of a camera to capture an image of the inside of a cab, the output of a capacitive sensor attached to an operation apparatus (for example, the grip of an operation apparatus), etc. The control part 35 detects that "a predetermined button operation has been performed" when, for example, with a message such as "IS IT ENSURED THAT SHOVEL IS PREVENTED FROM STARTING TO OPERATE?" being displayed on the screen of an in-vehicle display, a confirmation button (for example, a horn button or a software button displayed on the same screen) is depressed. The control part 35 may determine that "it is ensured that the shovel is prevented from starting to operate" when, for example, the operator has performed a cancellation operation such as inputting an operation to a lever, button, panel or the like at a driver's seat.

The third cancellation condition is satisfied when, for example, a confirmation button is depressed with a message such as "IS IT CONFIRMED THAT THERE IS NO PERSON AROUND SHOVEL?" being displayed on the screen of an in-vehicle display. The third cancellation condition may be omitted.

When the third cancellation condition is included in the predetermined cancellation condition, the shovel enters a restriction cancelable state in response to the first cancellation condition and the second cancellation condition being satisfied. The restriction cancelable state means a state where a restriction can be canceled once the operator confirms the absence of a person around the shovel.

There is no restriction on the order the first cancellation condition, the second cancellation condition, and the third cancellation condition are satisfied. For example, even when the third cancellation condition, the second cancellation condition, and the first cancellation condition have been satisfied in this order, the control part 35 cancels a restriction on or the stopping of the operation of the shovel.

Furthermore, the control part 35 may cancel the restriction or stopping upon passage of a predetermined wait time since a predetermined cancellation condition is satisfied, in order to avoid upsetting the operator with a sudden cancellation.

Furthermore, in the case of having restricted or stopped the operation of the shovel, the control part 35 may output a control command to an in-vehicle display serving as the output apparatus 50 to cause a captured image including a person image that has caused it to be displayed. For example, when a person image is included in only a captured image of the left-side camera 40L, a through image of the left-side camera 40L may be displayed alone. Alternatively, when a person image is included in each of a captured image of the left-side camera 40L and a captured image of the back-side camera 40B, the respective through images of the two cameras may be simultaneously displayed side by side or a single composite image (for example, a view transformed image) including the captured images of the two cameras may be displayed. Furthermore, an image showing that it is being restricted or stopped, guidance on the method of cancellation, etc., may also be displayed. Furthermore, a partial image corresponding to a prospective person image identified as a person image may be highlighted and displayed. For example, the outline of the target image region TRg may be displayed in a predetermined color. Furthermore, when a wait time after the satisfaction of a predetermined cancellation condition is set, the operator may be notified that there is a wait time after the satisfaction of a predetermined cancellation condition. For example, with the presence of a wait time being indicated, a countdown of the wait time may be displayed. Furthermore, when an alarm is output during a wait time, the volume of the alarm may be gradually reduced with the passage of the wait time.

Furthermore, in the case of having restricted or stopped the operation of the shovel, the control part 35 may output a control command to an in-vehicle loudspeaker serving as the output apparatus 50 to cause an alarm to be output on the side on which a person who has caused it is present. In this case, the in-vehicle loudspeaker is composed of, for example, a right-side loudspeaker installed in a right wall inside the cab, a left-side loudspeaker installed in a left wall inside the cab, and a back-side loudspeaker installed in a back wall inside the cab. When a person image is included in only a captured image of the left-side camera 40L, the control part 35 causes an alarm to be output from only the left-side loudspeaker. Alternatively, the control part 35 may use a surround sound system including multiple loudspeakers to localize a sound.

Furthermore, when the person detecting part 34 has identified a prospective person image as a person image, the control part 35 may only output an alarm without restricting or stopping the operation of the shovel. In this case as well, the control part 35 may determine a state where at least one of the distance-related condition and the reliability-related condition is satisfied as the first person detected state (on-alert state) and determine a state where both are satisfied as the second person detected state (alarming state) the same as described above. Then, the same as in the case of having restricted or stopped the operation of the shovel, the control part 35 may stop the alarm in the second person detected state (alarming state) when a predetermined cancellation condition is satisfied. This is because unlike the alarm in the first person detected state (on-alert state) that can be automatically stopped, the alarm in the second person detected state (alarming state) requires an operation by the operator to be stopped.

Figure 19:
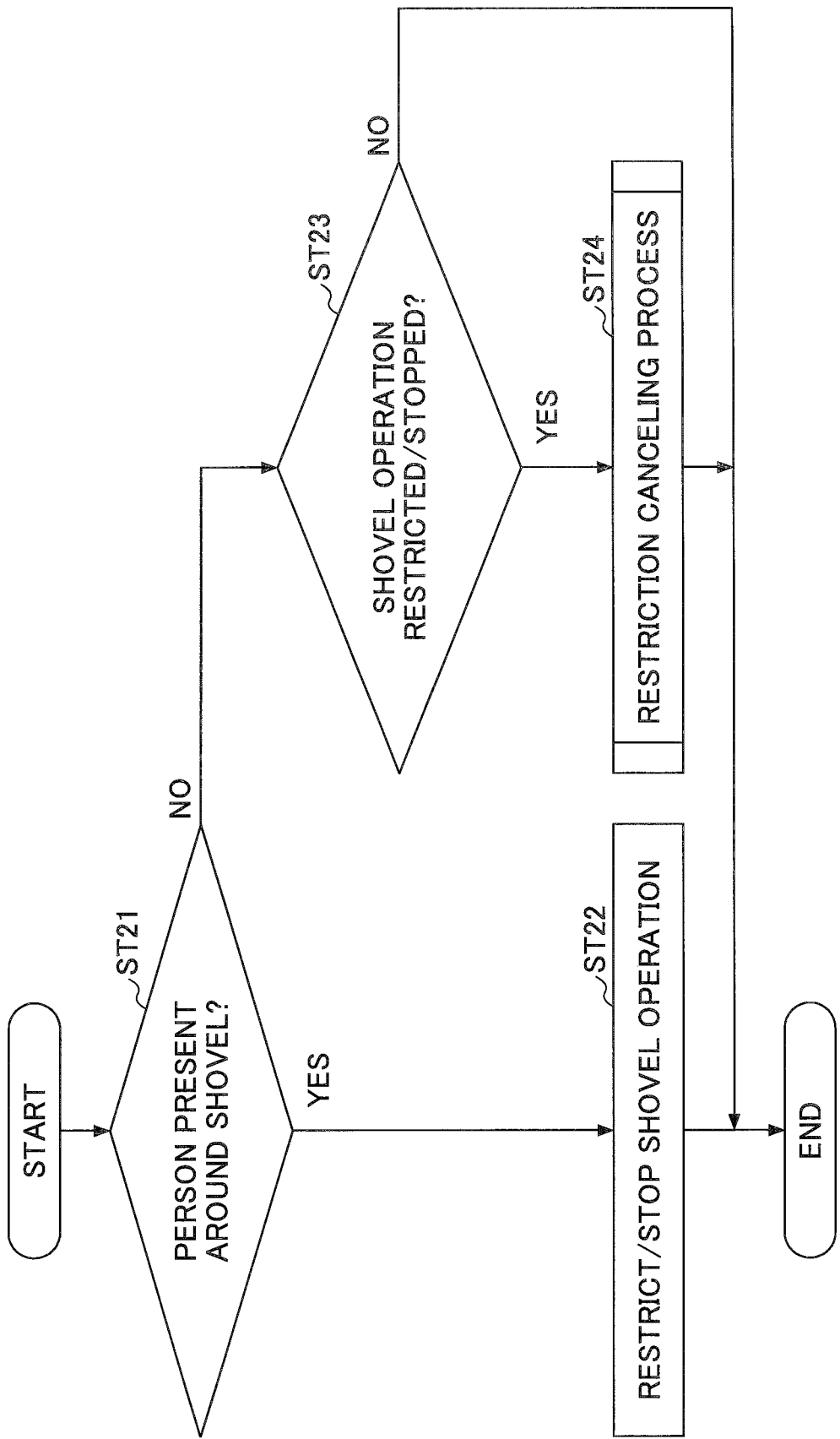
FIG. 19 is a flowchart illustrating the flow of a surroundings monitoring process.

Next, a process of monitoring the surroundings of the shovel by the control part 35 of the controller 30 (hereinafter, "a surroundings monitoring process") is described with reference to FIG. 19. FIG. 19 is a flowchart illustrating the flow of a surroundings monitoring process. The controller 30 repeatedly executes this surroundings monitoring process in a predetermined control cycle.

First, the control part 35 determines whether a person is present around the shovel (step ST21). According to this embodiment, the control part 35 determines whether a person is present around the shovel based on the final person detection result of the tracking part 33.

Thereafter, in response to determining that a person is present around the shovel (YES at step ST21), the control part 35 restricts or stops the operation of the shovel (step ST22). According to this embodiment, for example, the control part 35 determines that a person is present around the shovel and stops the operation of the shovel in response to determining that the current person detected state is the second person detected state (alarming state).

At this point, the control part 35 outputs a control command to an in-vehicle loudspeaker serving as the output apparatus 50 to cause the second alarm to be output. Furthermore, the control part 35 outputs a control command to an in-vehicle display serving as the output apparatus 50 to cause a captured image including a person image that has caused the restriction or stopping to be displayed.

In response to determining that a person is absent around the shovel (NO at step ST21), the control part 35 determines whether the operation of the shovel is already restricted or stopped (step ST23). According to this embodiment, the control part 35 refers to the value of a corresponding flag to determine whether or not the operation of the shovel is already restricted or stopped.

In response to determining that the operation of the shovel is already restricted or stopped (YES at step ST23), the control part 35 executes a process for canceling the restriction or stopping (hereinafter, "a restriction canceling process") (step ST24).

In response to determining that the operation of the shovel is not yet restricted or stopped (NO at step ST23), the control part 35 terminates the current shovel surroundings monitoring process without executing the restriction canceling process.

Figure 20:
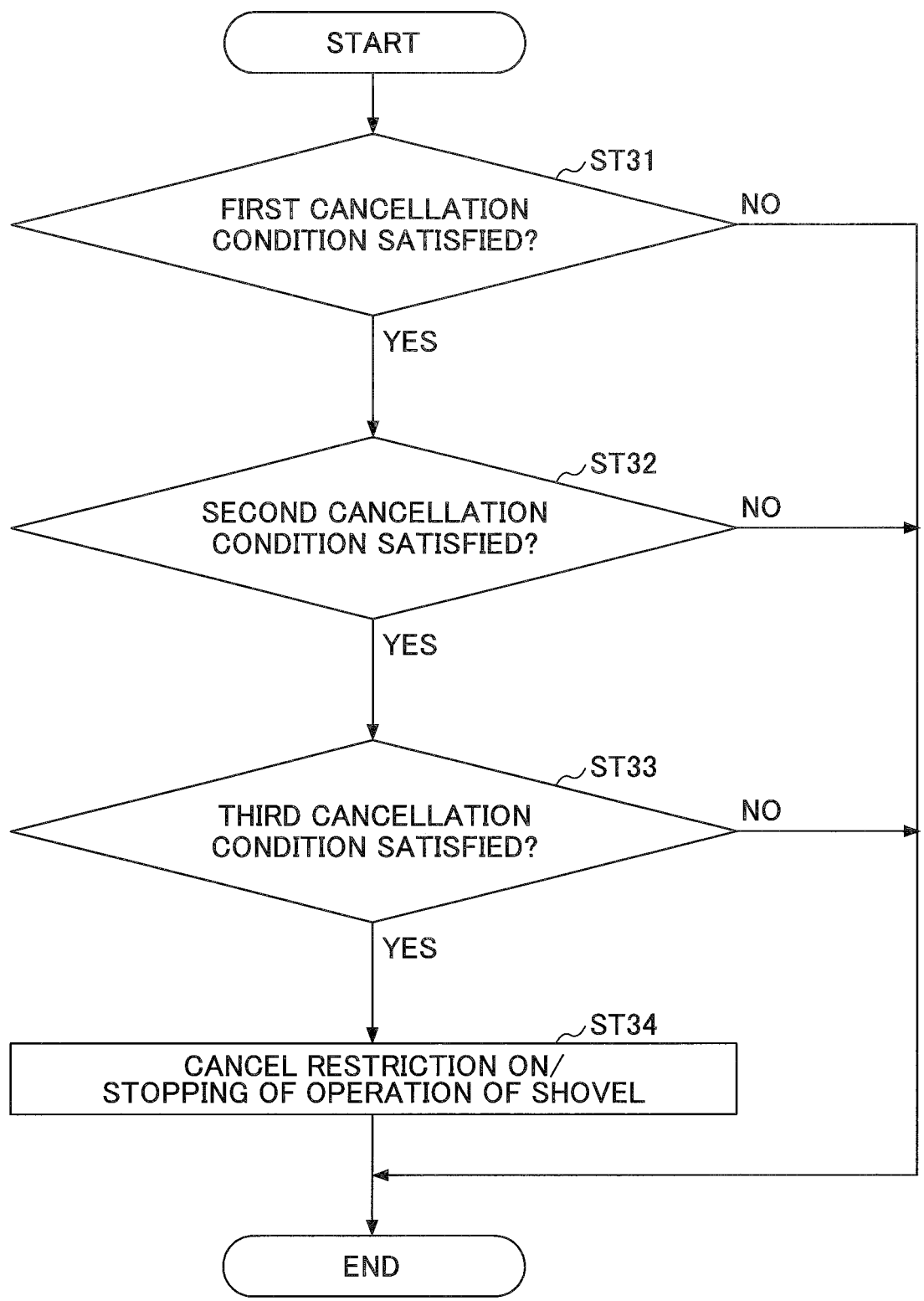
FIG. 20 is a flowchart illustrating the flow of a restriction canceling process.

Next, a process of canceling a restriction on or the stopping of the operation of the shovel by the control part 35 of the controller 30 is described with reference to FIG. 20. FIG. 20 is a flowchart illustrating a flow of the restriction canceling process.

First, the control part 35 determines whether the first cancellation condition is satisfied (step ST31). According to this embodiment, the control part 35 determines whether a person is absent within a predetermined area around the shovel. Specifically, it is determined whether the current person detected state is no longer the second person detected state (alarming state). Alternatively, it may be determined whether it is no longer either of the first person detected state (on-alert state) and the second person detected state (alarming state).

In response to determining that the first cancellation condition is satisfied (YES at step ST31), the control part 35 determines whether the second cancellation condition is satisfied (step ST32). According to this embodiment, the control part 35 determines whether it is ensured that the shovel is prevented from starting to operate. Specifically, it is determined whether the gate lock lever is lowered (whether the operation apparatus is disabled).

In response to determining that the second cancellation condition is satisfied (YES at step ST32), the control part 35 determines whether the third cancellation condition is satisfied (step ST33). According to this embodiment, the control part 35 determines whether it is confirmed by the operator that a person is absent around the shovel. Specifically, it is determined whether a confirmation button is depressed with a message such as "IS IT CONFIRMED THAT THERE IS NO PERSON AROUND SHOVEL?" being displayed on the screen of the in-vehicle display.

In response to determining that the third cancellation condition is satisfied (YES at step ST33), the control part 35 cancels a restriction on or the stopping of the operation of the shovel (step ST34).

At this point, the control part 35 outputs a control command to an in-vehicle loudspeaker serving as the output apparatus 50 to cause the outputting of the second alarm to be stopped. Furthermore, the control part 35 outputs a control command to the in-vehicle display serving as the output apparatus 50 to cause the displaying of a captured image including a person image that has caused the restriction or stopping to be stopped. For example, a through image displayed before the outputting of the second alarm is displayed again. Furthermore, the control part 35 may also cause a message reporting the cancellation of a restriction on or the stopping of the operation of the shovel to be displayed.

In response to determining that the first cancellation condition is not satisfied (NO at step ST31), that the second cancellation condition is not satisfied (NO at step ST32), or that the third cancellation condition is not satisfied (NO at step ST33), the control part 35 terminates the current restriction cancelling process without canceling a restriction on or the stopping of the operation of the shovel.

By the above-described configuration, the controller 30 can restrict or stop the operation of the shovel in response to determining the presence of a person around the shovel.

Furthermore, when determining the absence of a person around the shovel after restricting or stopping the operation of the shovel, the controller 30 can cancel the restriction or stopping only when determining that it is ensured that the shovel is prevented from starting to operate. Alternatively, the controller 30 can cancel the restriction or stopping only when determining that it is ensured that the shovel is prevented from starting to operate and that it is confirmed by the operator that a person is absent around the shovel. Therefore, the controller 30 can prevent the shovel from accidentally starting to operate when the restriction or stopping is canceled.

Next, an output image displayed on an in-vehicle display during the execution of the surroundings monitoring process is described with reference to FIGS. 21A through 21C. FIGS. 21A through 21C are examples of output images generated based on a captured image of the back-side camera 40B. FIG. 21A illustrates an output image in the case where a person is absent within a predetermined area around the shovel. FIG. 21B illustrates an output image in the first person detected state. FIG. 21C illustrates an output image in the second person detected state.

Specifically, the output images of FIGS. 21A through 21C include a camera image part G1 and an indicator part G2. The camera image part G1 is where an image generated based on a captured image of one or more cameras is displayed. The indicator part G2 is where the person detected state/person undetected state of each of multiple regions around the shovel is indicated. In the camera image part G1, a line segment L1 displayed over a camera image indicates that the distance from the shovel is a predetermined first distance (for example, 5 meters). Furthermore, a line segment L2 displayed over the camera image indicates that the distance from the shovel is a predetermined second distance (for example, 2.5 meters). In the indicator part G2, a circumferential line L1g of a partial circle drawn around a shovel icon CG1 indicates that the distance from the shovel is the predetermined first distance (for example, 5 meters), and corresponds to the line segment L1 of the camera image part G1. Furthermore, a circumferential line L2g of a partial rectangle drawn around the shovel icon CG1 indicates that the distance from the shovel is the predetermined second distance (for example, 2.5 meters), and corresponds to the line segment L2 of the camera image part G1.

The partial circle is divided into six regions A1 through A6, and the partial rectangle is divided into three regions B1 through B3.

In the state illustrated in FIG. 21A, the controller 30 detects a person present at the right back of the shovel. The controller 30, however, neither highlights and displays the image of the person nor outputs the first alarm because the actual location of the person is beyond the first distance. The controller 30, however, may highlight and display the image of the person by displaying a white frame as the outline of a corresponding target image region TRg, and output the first alarm. Furthermore, the controller 30 may display a message such as "EXECUTING SURROUNDINGS MONITORING PROCESS" irrespective of whether a person is already detected in order to make it possible for the operator to recognize that the surroundings monitoring process is being executed.

In the first person detected state illustrated in FIG. 21B, the controller 30 detects a person present at or within the first distance and beyond the second distance at the right back of the shovel. Therefore, the controller 30 has highlighted and displayed the image of the person and is outputting the first alarm. Specifically, the controller 30 displays a yellow frame F1 as the outline of a corresponding target image region TRg in the camera image part G1. Furthermore, the controller 30 displays the region A4 corresponding to the actual location of the person in yellow in the indicator part G2. The display of the yellow frame F1, however, may be omitted. Furthermore, a message that reports being in the first person detected state (on-alert state) may be displayed.

In the second person detected state illustrated in FIG. 21C, the controller 30 detects a person present at or within the second distance at the right back of the shovel. Therefore, the controller 30 has highlighted and displayed the image of the person and is outputting the second alarm. Specifically, the controller 30 displays a red frame F2 as the outline of a corresponding target image region TRg in the camera image part G1. Furthermore, the controller 30 displays the region B2 corresponding to the actual location of the person in red in the indicator part G2. Furthermore, the controller 30 has restricted the operation of the shovel, and is displaying a blinking message "RESTRICTING SHOVEL OPERATION" that reports being in the second person detected state (alarming state). The display of a message that reports being in the second person detected state (alarming state), however, may be omitted.

Furthermore, in FIGS. 21A through 21C, the camera image part G1 is displayed on the left side of the screen, and the indicator part G2 is displayed on the right side of the screen. Alternatively, the camera image part G1 may be displayed on the right side of the screen, and the indicator part G2 may be displayed on the left side of the screen. As yet another alternative, the camera image part G1 and the indicator part G2 may be displayed in one and the other, respectively, of the divisions of the vertically divided screen. The display of the indicator part G2 may be omitted.

The spread angle of each of the regions A1 through A6 is 45 degrees, and the spread angle of each of the regions B1 through B3 is 90 degrees. This difference in spread angle is based on the difference in character between the first person detected state (on-alert state) and the second person detected state (alarming state). Specifically, the first person detected state (on-alert state) is a state where a preliminary alarm lower in accuracy but faster in response is output and a relatively wide spatial range relatively distant from the shovel is an area to be monitored. Therefore, if the spread angle of the regions A1 through A6 is increased, an area to be monitored corresponding to each region increases with its display area, thus making it difficult to determine the actual location of a person who has caused the first alarm because the display result is the same wherever a person is present in a wide area to be monitored. The second person detected state (alarming state) is a state where a formal alarm higher in accuracy but slower in response is output and a relatively narrow spatial range relatively close to the shovel is an area to be monitored. Therefore, if the spread angle of the regions B1 through B3 is decreased, an area to be monitored corresponding to each region decreases with its display area, thus making it difficult to determine in which direction a person who has caused the second alarm is present because the display area becomes so small as to be difficult to see. Therefore, desirably, as illustrated in FIGS. 21A through 21C, the spread angle of each of the regions A1 through A6 is smaller than the spread angle of each of the regions B1 through B3.

Furthermore, in FIGS. 21A through 21C, a description is given of the case where a person image is detected in a captured image of the back-side camera 40B while a through image of the back-side camera 40B is displayed. The above description, however, is likewise applied to the case where a person image is detected in a captured image of at least one of the left-side camera 40L and the right-side camera 40R while a through image of the back-side camera 40B is displayed. In this case, the output image displayed in the camera image part G1 may be automatically switched from the through image of the back-side camera 40B to a through image of another camera or a view transformed image into which captured images of multiple cameras are synthesized. For example, when a person image is detected in a captured image of the left-side camera 40L while a through image of the back-side camera 40B is displayed, the controller 30 may switch the output image displayed in the camera image part G1 to a through image of the left-side camera 40L.

Thus, the controller 30 displays an output image that includes the camera image part G1 generated using a captured image of the back-side camera 40B attached to the shovel and the shovel icon CG1 on the in-vehicle display. Then, of the image parts (the regions A1 through A6 and the regions B1 through B3) around the shovel icon CG1, an image part on the side corresponding to a direction in which a person detected by the person detecting part 34 is present (the region A4 in FIG. 21B and the region B2 in FIG. 21C) is highlighted. Therefore, the controller 30 can display an image part on the output image corresponding to the person detected by the person detecting part 34 so that the operator can distinguish the image part from other image parts. Specifically, the controller 30 can perform display so that the operator can determine whether a person is present, whether a person is close or distant, in which direction a person is present when viewed from the shovel, etc.

Next, the relationship between a detected state and a frame and the display color of a region is described with reference to FIG. 22. FIG. 22 illustrates a correspondence table showing the correspondence between a detected state and a frame and the display color of a region.

The first line of the correspondence table shows that when the detected state is neither the first person detected state (on-alert state) nor the second person detected state (alarming state), the outline of a target image region is not displayed, and none of the regions of the indicator part G2 is colored.

The second line shows that when the detected state is the on-alert state, a yellow frame is displayed as the outline of a target image region corresponding to a person image that has caused the on-alert state, and one of the regions A1 through A6 is displayed in yellow.

The third line shows that when the detected state is the alarming state, a red frame is displayed as the outline of a target image region corresponding to a person image that has caused the alarming state, and one of the regions B1 through B3 is displayed in red.

The fourth line shows that when the detected state is the on-alert state and also the alarming state, a yellow frame is displayed as the outline of a target image region corresponding to a person image that has caused the on-alert state, and a red frame is displayed as the outline of a target image region corresponding to a person image that has caused the alarming state. Furthermore, one of the regions A1 through A6 corresponding to the person image that has caused the on-alert state is displayed in yellow, and one of the regions B1 through B3 corresponding to the person image that has caused the alarming state is displayed in red.

By the above-described configuration, in response to determining that a person is present around the shovel, the controller 30 outputs an alarm, and highlights and displays the image part of the person. Therefore, the operation can check the person that has caused the alarm on the screen. Furthermore, when an erroneous report occurs, the operator can identify what has caused the erroneous report on the screen.

Furthermore, the controller 30 displays a frame image as a person detection marker in the camera image part G1 and changes the color of a corresponding region in the indicator part G2 only after entry into the first person detected state (on-alert state). Therefore, it is possible to prevent even a frame image corresponding to a prospective person image identified as a person image but still low in reliability from being displayed to complicate a displayed image. While a frame image is displayed as a person detection marker in the above-described embodiment, other highlighted images such as a reverse video image may also be employed as a person detection marker.

Furthermore, the image of a person who has caused the first person detected state (on-alert state) and the image of a person who has caused the second person detected state (alarming state) are distinguishably highlighted and displayed. Furthermore, the color of a frame image in the camera image part G1 is caused to correspond to the color of a region in the indicator part G2. Therefore, the operator can check the person who has caused the second alarm on the screen. Furthermore, according to the above-described embodiment, the controller 30 causes the color of a frame image in the camera image part G1 and the color of a region in the indicator part G2 to differ depending on the detected state. The controller 30 may cause attributes other than color, such as a blinking/lighting condition, transmittance, etc., to differ depending on the detected state.

Figure 23:
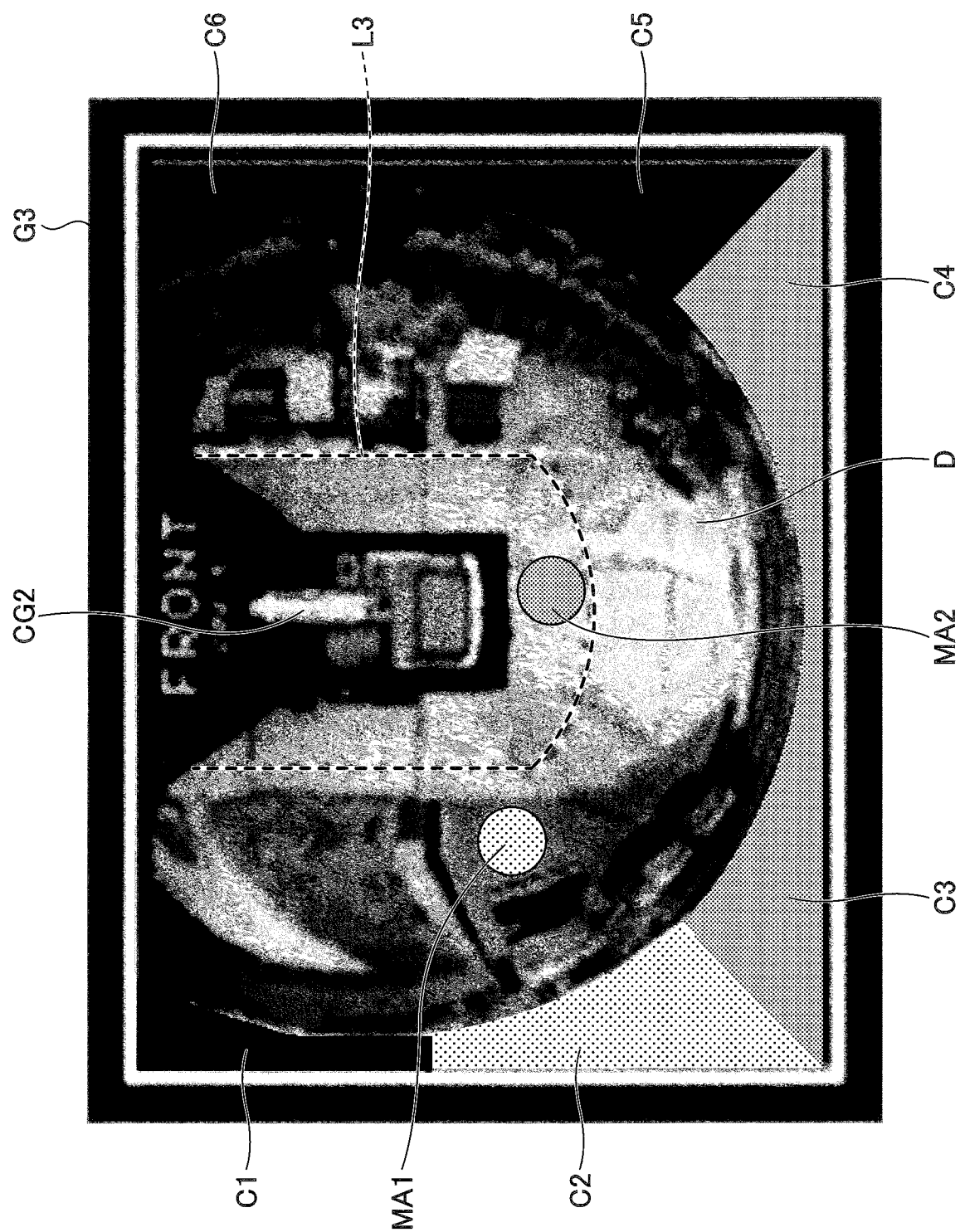
FIG. 23 illustrates a view transformed image as an output image.

Next, another output image displayed on an in-vehicle display during execution of the surroundings monitoring process is described with reference to FIG. 23. FIG. 23 illustrates a view transformed image as an output image, generated based on respective captured images of the back-side camera 40B, the left-side camera 40L, and the right-side camera 40R. According to this embodiment, a view transformed image is an image that the operator uses to monitor the surroundings of the shovel (hereinafter, "surroundings monitoring image"). The surroundings monitoring image is, for example, a composite image of a road surface image looking at the surroundings of the shovel immediately from above and a horizontal image looking at the surroundings of the shovel in a horizontal direction, placed around the road surface image. FIG. 23 illustrates an output image in the case where both the first person detected state and the second person detected state exist. The output image of FIG. 23 includes a view transformed image part G3 that corresponds to the camera image part G1 of FIGS. 21A through 21O. A part corresponding to the indicator part G2 of FIGS. 21A through 21C is integrated into the view transformed image part G3. Specifically, the shovel icon CG1 of FIGS. 21A through 21C corresponds to a shovel icon CG2 of FIG. 23, and the regions A1 through A6 of FIGS. 21A through 21C correspond to regions C1 through C6 of FIG. 23. Furthermore, the region B1 of FIGS. 21A through 21C corresponds to the combination of the regions C1 and C2 of FIG. 23, the region B2 of FIGS. 21A through 21C corresponds to the combination of the regions C3 and C4 of FIG. 23, and the region B3 of FIGS. 21A through 21C corresponds to the combination of the regions C5 and C6 of FIG. 23. A line segment L3 displayed over the view transformed image indicates that the distance from the shovel is a predetermined third distance (for example, 2.5 meters).

In the detected state illustrated in FIG. 23, the controller 30 detects a person present at or within the first distance (for example, 5 meters) and beyond the third distance on the left side of the shovel (a person who has caused the first person detected state). Furthermore, the controller 30 detects a person at or within the third distance at the back of the shovel (a person who has caused the second person detected state). Therefore, the controller 30 highlights and displays the images of these persons, outputs the second alarm, and restricts the operation of the shovel. Specifically, the controller 30 displays a yellow circle MA1 serving as a person detection marker at the position of a reference point Pr corresponding to the person who has caused the first person detected state, and displays the region C2 corresponding to the position in yellow. Furthermore, the controller 30 displays a red circle MA2 serving as a person detection marker at the position of a reference point Pr corresponding to the person who has caused the second person detected state, and displays the combination of the regions C3 and C4 corresponding to the position in red. In addition, the controller 30 may restrict the operation of the shovel and then display a blinking message "RESTRICTING SHOVEL OPERATION" that reports being in the second person detected state (alarming state). The display of the yellow circle MA1 may be omitted to make the screen easy to see.

Thus, the controller 30 displays an output image that includes the view transformed image part G3, generated using respective captured images of the back-side camera 40B, the left-side camera 40L, and the right-side camera 40R attached to the shovel, and the shovel icon CG2 on the in-vehicle display. Of the image parts (the regions C1 through C6) around the shovel icon CG2, image parts on the side corresponding to directions in which the persons detected by the person detecting part 34 are present (the regions C2 and C4 in FIG. 23) are highlighted. Therefore, the controller 30 can display image parts on the output image corresponding to the persons detected by the person detecting part 34 so that the operator can distinguish the image parts from other image parts. Specifically, the controller 30 can perform display so that the operator can determine whether a person is present, whether a person is close or distant, in which direction a person is present when viewed from the shovel, etc.

Figure 24:
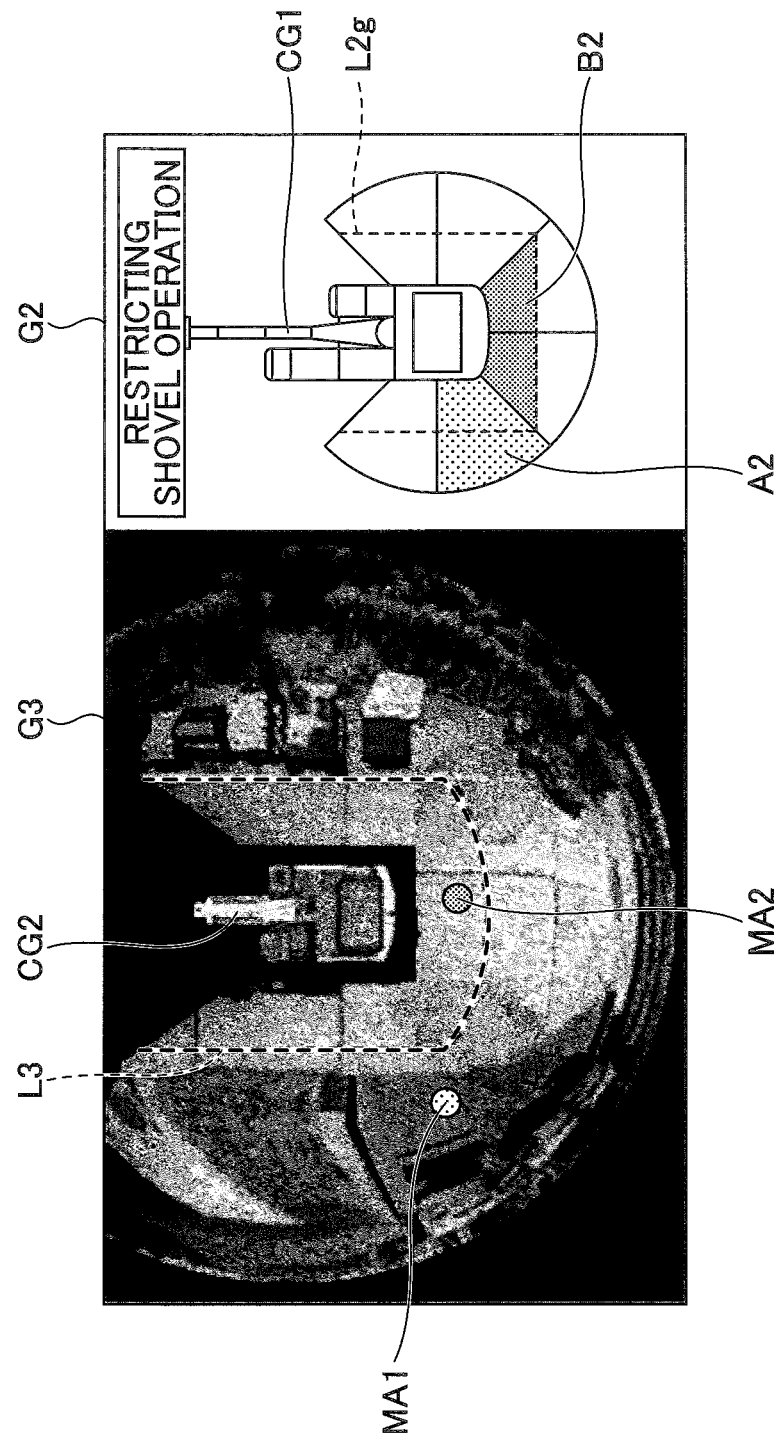
FIG. 24 illustrates an output image including a view transformed image.

Next, yet another output image displayed on an in-vehicle display during execution of the surroundings monitoring process is described with reference to FIG. 24. FIG. 24 illustrates an output image including a view transformed image generated based on respective captured images of the back-side camera 40B, the left-side camera 40L, and the right-side camera 40R. Like in the case of FIG. 23, FIG. 24 illustrates an output image in the case where both the first person detected state and the second person detected state exist. The output image of FIG. 24 includes the indicator part G2 and the view transformed image part G3. The circumferential line L2g of a partial rectangle drawn around the shovel icon CG1 indicates that the distance from the shovel is the predetermined third distance (for example, 2.5 meters), and corresponds to the line segment L3 of the view transformed image part G3.

In the detected state illustrated in FIG. 24, the controller 30 detects a person present at or within the first distance (for example, 5 meters) and beyond the third distance on the left side of the shovel (a person who has caused the first person detected state). Furthermore, the controller 30 detects a person at or within the third distance at the back of the shovel (a person who has caused the second person detected state). Therefore, the controller 30 highlights and displays the images of these persons, outputs the second alarm, and restricts the operation of the shovel. Specifically, the controller 30 displays the yellow circle MA1 serving as a person detection marker at the position of a reference point Pr corresponding to the person who has caused the first person detected state, and displays the region A2 of the indicator part G2 corresponding to the position in yellow. Furthermore, the controller 30 displays the red circle MA2 serving as a person detection marker at the position of a reference point Pr corresponding to the person who has caused the second person detected state, and displays the region B2 of the indicator part G2 corresponding to the position in red. In addition, the controller 30 restricts the operation of the shovel, and then displays a blinking message "RESTRICTING SHOVEL OPERATION" that reports being in the second person detected state (alarming state). The display of the yellow circle MA1 may be omitted to make the screen easy to see.

By the above-described configuration, the controller 30 can achieve the same effects as in the case of displaying the output images of FIGS. 21A through 21C.

Thus, in response to determining the presence of a person around the shovel, the controller 30 restricts or stops the operation of the shovel and displays an image of the person. Then, in response to determining the absence of a person around the shovel after restricting or stopping the operation of the shovel, the controller 30 determines that the restriction or stopping can be canceled, only when determining that it is ensured that the shovel is prevented from starting to operate. Then, the controller 30 actually cancels the restriction or stopping upon passage of a predetermined wait time. Therefore, it is possible to more appropriately cancel a restriction on the operation of the shovel applied in response to detection of a person.

Furthermore, in the case of having restricted or stopped the operation of the shovel, the controller 30 can output an alarm toward the operator from the side on which a person who has caused it is present. Therefore, it is possible to cause the operator to recognize a direction in which the person is present before the operator looks at the screen of an in-vehicle display. By looking at the screen of the in-vehicle display after aurally recognizing the direction in which the person is present by a direction from which the alarm is heard, the operator can visually confirm that the person is present in the direction as recognized. Thus, the controller 30 notifies the operator of a direction in which a person is present through the coordination of an alarm and display, and therefore can have the operator recognize the surrounding conditions of the shovel in a short time.

This is because even when recognizing the detection of a person by an alarm, the operator has to first look at the entire screen to find out in which direction the person is present if a direction in which the person is present is unknown, and because when a direction in which a person is present is known before looking at the screen, the operator can visually recognize the presence of the person by just looking at part of the screen (part corresponding to the direction in which the person is present).

Next, still other output images displayed on an in-vehicle display during execution of the surroundings monitoring process are described with reference to FIGS. 25A through 25E. Each of FIGS. 25A through 25E is an output image including a surroundings monitoring image as a view transformed image generated based on multiple captured images. The line segment L3 drawn around the shovel icon CG2 indicates that the distance from the shovel is the predetermined third distance (for example, 2.5 meters).

According to this embodiment, the surroundings monitoring image is an image obtained by projecting respective captured images of the back-side camera 40B, the left-side camera 40L, and the right-side camera 40R onto a space model and re-projecting the projection image projected onto the space model onto a different two-dimensional plane. The "space model" is an object onto which a captured image is projected in a virtual space, and is composed of one or more plane surfaces or curved surfaces that include a plane surface or a curved surface different from a plane surface in which the surroundings monitoring image is positioned.

The control part 35 outputs a control command to a display apparatus serving as the output apparatus 50 to relatively enlarge and display part of the surroundings monitoring image displayed on the screen of the display apparatus. According to this embodiment, the control part 35 locally enlarges and displays a particular image part of the surroundings monitoring image displayed on the screen of the display apparatus. For example, the control part 35 locally enlarges and displays a particular image part of the surroundings monitoring image by generating and displaying an image in the case of viewing the surroundings monitoring image from a different virtual viewpoint in a virtual space. A particular image part is, for example, a highly important image part such as an image part which the operator should observe, and is hereinafter also referred to as "observation image part." According to this embodiment, the direction of the observation image part viewed from the shovel is one, and no image parts that are in two or more directions are simultaneously adopted as the observation image part. The present invention, however, does not exclude simultaneously adopting image parts that are in two or more directions as observation image parts. Furthermore, the direction of the observation image part viewed from the shovel may be limited to the directions of the six regions A1 through A6 or the directions of the three regions B1 through B3 illustrated in FIG. 21A. The size and shape of the observation image part may be either fixed or dynamically determined.

To "locally enlarge and display" means, for example, locally enlarging and displaying the observation image part of the surroundings monitoring image while keeping the observation image part smoothly connected to other image parts.

Specifically, while perspectively displaying substantially the entirety of the surroundings monitoring image, the control part 35 locally enlarges and displays the observation image part of the surroundings monitoring image by loupe processing, projective transformation, scale conversion or the like. The observation image part is, for example, an image part corresponding to a position at which it is determined that a person is present in a real space, an image part corresponding to a space existing in the travel direction of the traveling undercarriage 1, an image part corresponding to a space existing at the back of the upper rotating structure 3, or the like. In the following, a process of locally enlarging the observation image part while displaying substantially the entirety of the surroundings monitoring image is referred to as "local enlargement process." "Substantially the entirety of the surroundings monitoring image" means that a peripheral part of the surroundings monitoring image may be outside the screen. Furthermore, in the case of determining an image part corresponding to a position at which it is determined that a person is present in a real space as the observation image part, the image of a person included in the locally enlarged and displayed observation image part is displayed larger than a predetermined size. For example, the image of a person at or within a predetermined distance (for example, 12 m) from the shovel is displayed larger than a predetermined size (for example, 7 mm×7 mm) on the screen of the display apparatus. The distance from the shovel is, for example, the shortest distance between the person and the shovel (for example, a side surface or a back surface of the upper rotating structure 3), a distance from the central position of the cabin 10 to the person, a distance from the swing axis of the shovel to the person, or the like.

Figure 25A:
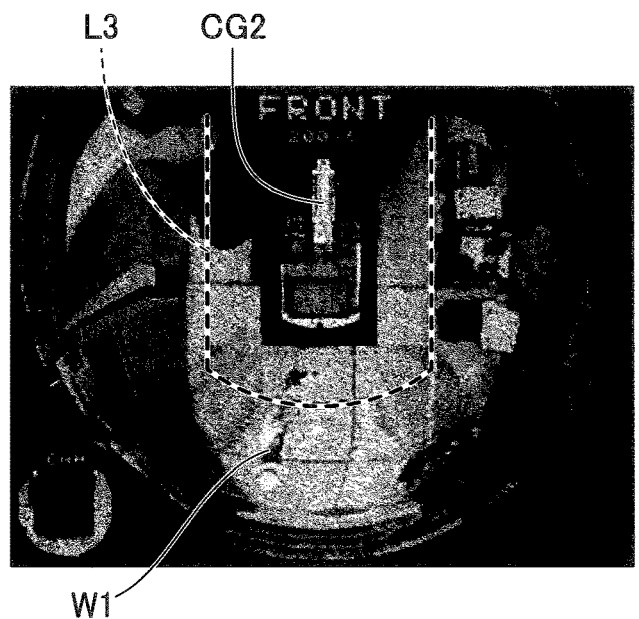
FIG. 25A illustrates an output image including a view transformed image.

FIG. 25A illustrates an output image including the surroundings monitoring image before execution of the local enlargement process. The output image of FIG. 25A illustrates a situation where a worker W1 is present at or within the third distance at the back of the shovel.

Figure 25B:
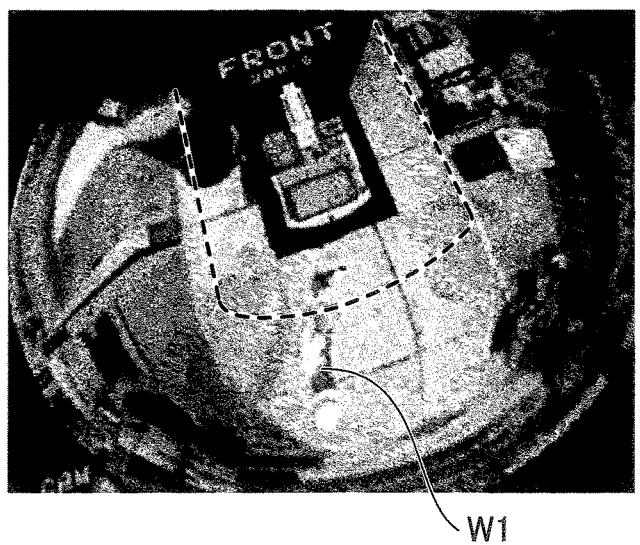
FIG. 25B illustrates an output image including a view transformed image.

FIG. 25B illustrates an output image including the surroundings monitoring image after execution of the local enlargement process. The output image of FIG. 25B illustrates a situation where the worker W1 is present at or within the third distance at the back of the shovel, the same as in the case of FIG. 25A. In this illustration, the control part 35 executes the local enlargement process when the person detecting part 34 detects a person. Specifically, the control part 35 adopts, as the observation image part, an image part corresponding to the position of a person detected by the person detecting part 34 in a real space. Then, the control part 35 rotates the surroundings monitoring image within the screen so that the observation image part is positioned at the lower center of the screen, and locally enlarges the observation image part. For example, the surroundings monitoring image is rotated with the center of the surroundings monitoring image corresponding to the swing center of the shovel serving as an axis of rotation. The rotation of the surroundings monitoring image and the enlargement of the observation image part may be performed in random order. Furthermore, the rotation of the surroundings monitoring image may be omitted. Furthermore, image parts other than the observation image part may be reduced. For example, reduction may be performed so that an image part more distant from the observation image part is displayed smaller.

In response to detecting multiple persons around the shovel, the control part 35 adopts an image part corresponding to the position of a person positioned nearest to the shovel as the observation image part. Alternatively, the control part 35 may calculate the degree of risk in each direction from the shovel based on the distance between a detected person and the shovel, the orientation of the traveling undercarriage 1, the orientation of the upper rotating structure 3, etc., and adopt, as the observation image part, an image part corresponding to a space existing in a direction in which the degree of risk is highest.

The control part 35 may execute the local enlargement process when the first person detected state (on-alert state) is caused by the worker W1, or may execute the local enlargement process when the second person detected state (alarming state) is caused by the worker W1.

Figure 25C:
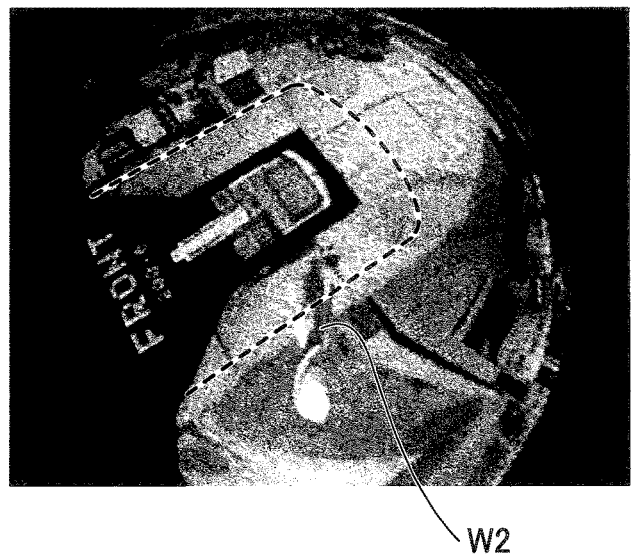
FIG. 25C illustrates an output image including a view transformed image.

FIG. 25C illustrates another output image including the surroundings monitoring image after execution of the local enlargement process. The output image of FIG. 25C illustrates a situation where a worker W2 is present at or within the third distance on the left side of the shovel. In this illustration, the same as in the case of FIG. 25B, the control part 35 adopts, as the observation image part, an image part corresponding to the position of a person detected by the person detecting part 34 in a real space. Then, the control part 35 rotates the surroundings monitoring image within the screen so that the observation image part is positioned at the lower center of the screen, and locally enlarges the observation image part.

Furthermore, the control part 35 may rotate the surroundings monitoring image within the screen in accordance with the movement of the worker W2 so that the image of the moving worker W2 is always positioned at the lower center of the screen. That is, the control part 35 may rotate the surroundings monitoring image within the screen in accordance with a change in the display position of the observation image part, in order to offset the change in the display position of the observation image part.

Figure 25D:
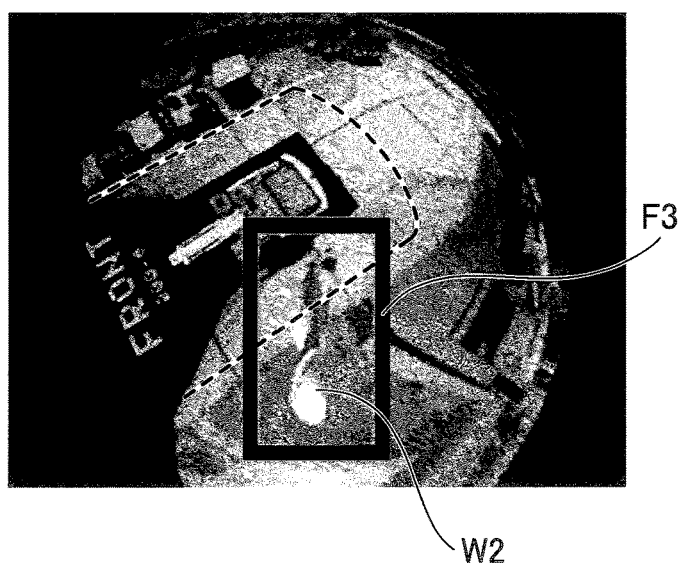
FIG. 25D illustrates an output image including a view transformed image.

FIG. 25D illustrates yet another output image including the surroundings monitoring image after execution of the local enlargement process. The output image of FIG. 25D illustrates a situation where the worker W2 is present at or within the third distance on the left side of the shovel, the same as in the case of FIG. 25C.

The output image of FIG. 25D is different in that a frame F3 is displayed around the image of the worker W2 from, but otherwise is equal to, the output image of FIG. 25C. Thus, the control part 35 may display an image for highlighting the actual location of the worker W2, such as the frame F3, in order that the operator who looks at the output image can more clearly recognize information related to the worker W2 (the presence or absence of the worker, a direction in which the worker is present when viewed from the shovel, etc.).

The control part 35 rotates the surroundings monitoring image within the screen in accordance with the movement of the worker W2 so that the image of the moving worker W2 is always positioned within the frame F3. In this case, the position of the frame F3 is fixed. Alternatively, the control part 35 may move the frame F3 in accordance with the movement of the image of the worker W2 within the screen without rotating the surroundings monitoring image within the screen.

Figure 25E:
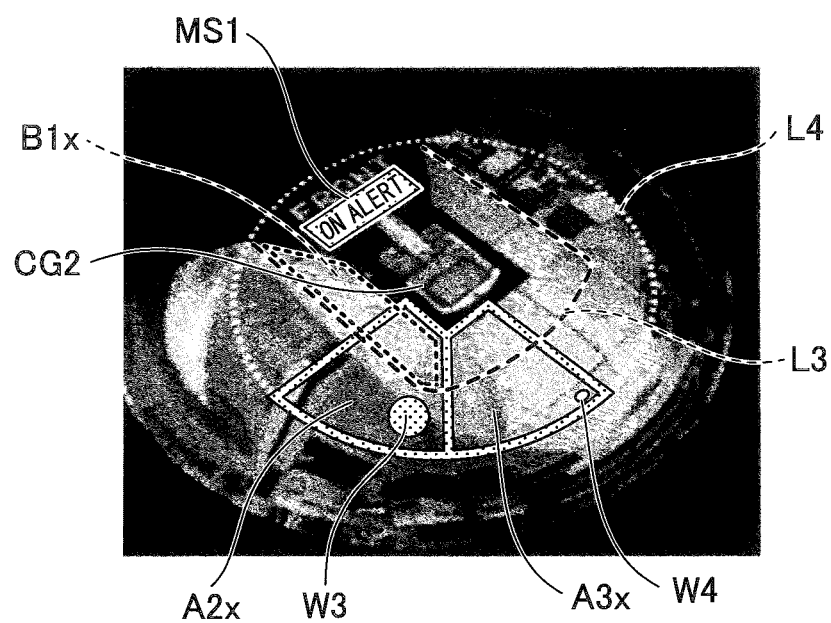
FIG. 25E illustrates an output image including a view transformed image.

FIG. 25E illustrates still another output image including the surroundings monitoring image after execution of the local enlargement process. A line segment L4 drawn around the shovel icon CG2 indicates that the distance from the shovel is a predetermined fourth distance (for example, 5.0 meters). The output image of FIG. 25E illustrates a situation where a worker W3 is present at or within the fourth distance on the left side of the shovel and a worker W4 is present at or within the fourth distance at the back of the shovel.

In this illustration, the control part 35 displays the boundaries of a region A2$x$ and a region A3$x$, corresponding to the region A2 and the region A3 of the indicator part G2 illustrated in FIGS. 21A through 21C, with a solid line. The color of the solid line (yellow) indicates that each of the worker W3 and the worker W4 is the cause of the first person detected state (on-alert state). Furthermore, the control part 35 displays a message image MS1 that reports a current person detected state. The message image MS1 indicates that the current person detected state is the first person detected state (on-alert state).

Furthermore, the control part 35 adopts an image part corresponding to the position of the worker W3 nearest to the shovel as the observation image part. Therefore, the control part 35 locally enlarges the observation image part including the image of the worker W3, and rotates the surroundings monitoring image within the screen so that the observation image part is positioned at the lower center of the screen.

Furthermore, for example, when the worker W3 enters a region B1x corresponding to the region B1 of the indicator part G2 illustrated in FIGS. 21A through 21C, the control part 35 displays the outline of the region B1 with a solid line. In this case, the color of the solid line (red) indicates that the worker W3 is the cause of the second person detected state (alarming state). In FIG. 25E, for the convenience of description of the position of the region B1x, the boundary of the region B1x is indicated by a dashed line, which is not actually displayed.

As described above, the control part 35 adopts an image part corresponding to the position of a person detected by the person detecting part 34 in a real space as the observation image part. Then, by locally enlarging and displaying the observation image part, it is possible to highlight the observation image part. Therefore, the operator who looks at an output image including the surroundings monitoring image after execution of the local enlargement process can instantly recognize information related to the worker W1 (the presence or absence of the worker, a direction in which the worker is present when viewed from the shovel, etc.). Furthermore, it is possible to rotate the surroundings monitoring image within the screen so that the observation image part is always positioned in a particular part (for example, at the lower center) of the screen. Therefore, when an alarm or the like is output, the operator can instantly recognize information related to the worker W1 by just looking at the particular part of the screen.

Thus, the controller 30 displays an output image including a surroundings monitoring image part and the shovel icon CG2 on the in-vehicle display, and emphasizes an image part on the side corresponding to a direction in which a person detected by the person detecting part 34 is present (for example, an image part at the back of the shovel icon CG2 in FIG. 25B) among image parts around the shovel icon CG2. Therefore, the controller 30 can display an image part on the output image corresponding to the person detected by the person detecting part 34 so that the operator can distinguish the image part from other image parts. Specifically, the controller 30 can perform display so that the operator can determine whether a person is present, whether a person is close or distant, in which direction a person is present when viewed from the shovel, etc.

Next, further output images displayed on an in-vehicle display during execution of the surroundings monitoring process are described with reference to FIGS. 26A and 26B. Each of FIGS. 26A and 26B is an output image including the surroundings monitoring image generated based on three captured images the same as each of FIGS. 25A through 25E.

Figure 26A:
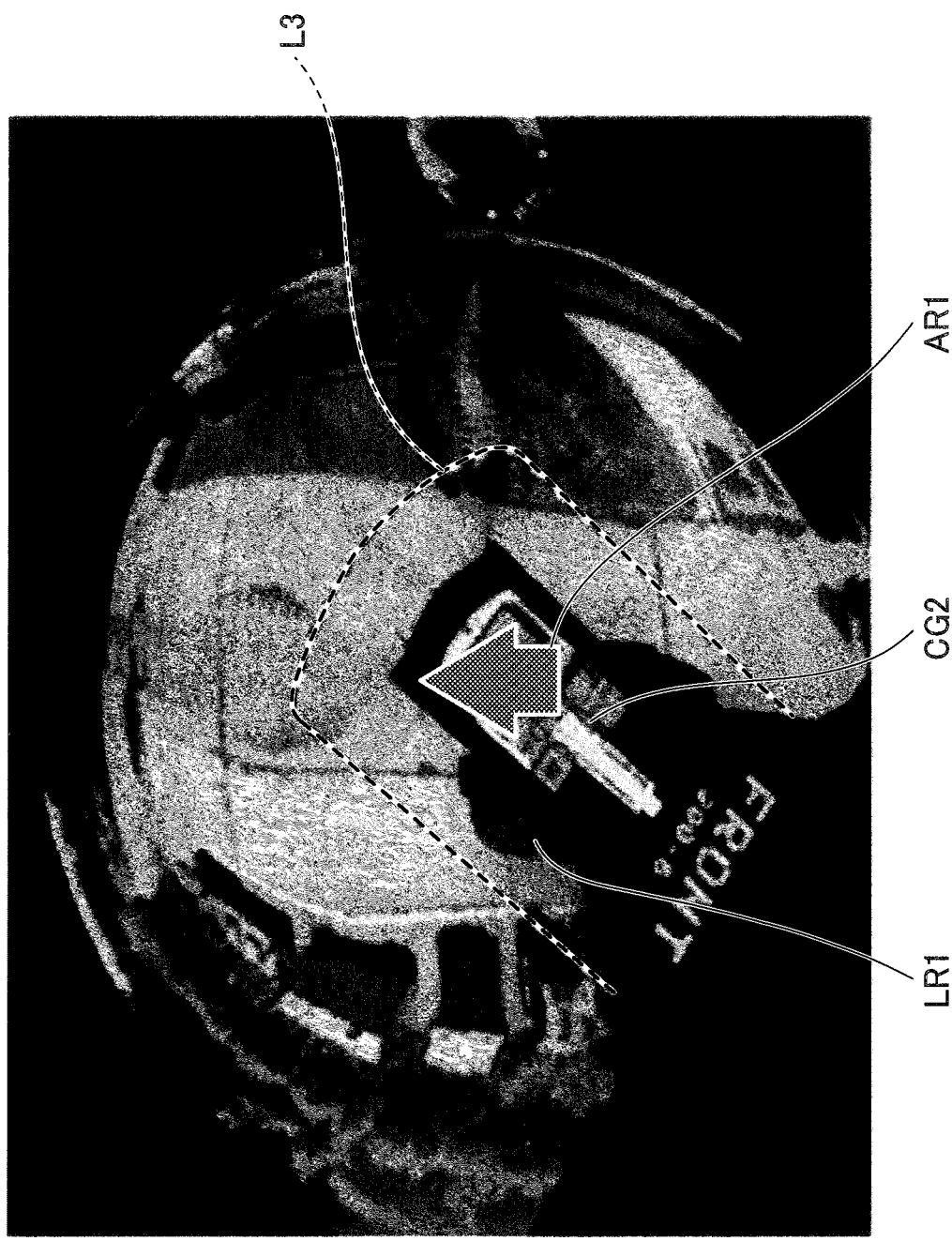
FIG. 26A illustrates an output image including a view transformed image.
Figure 26B:
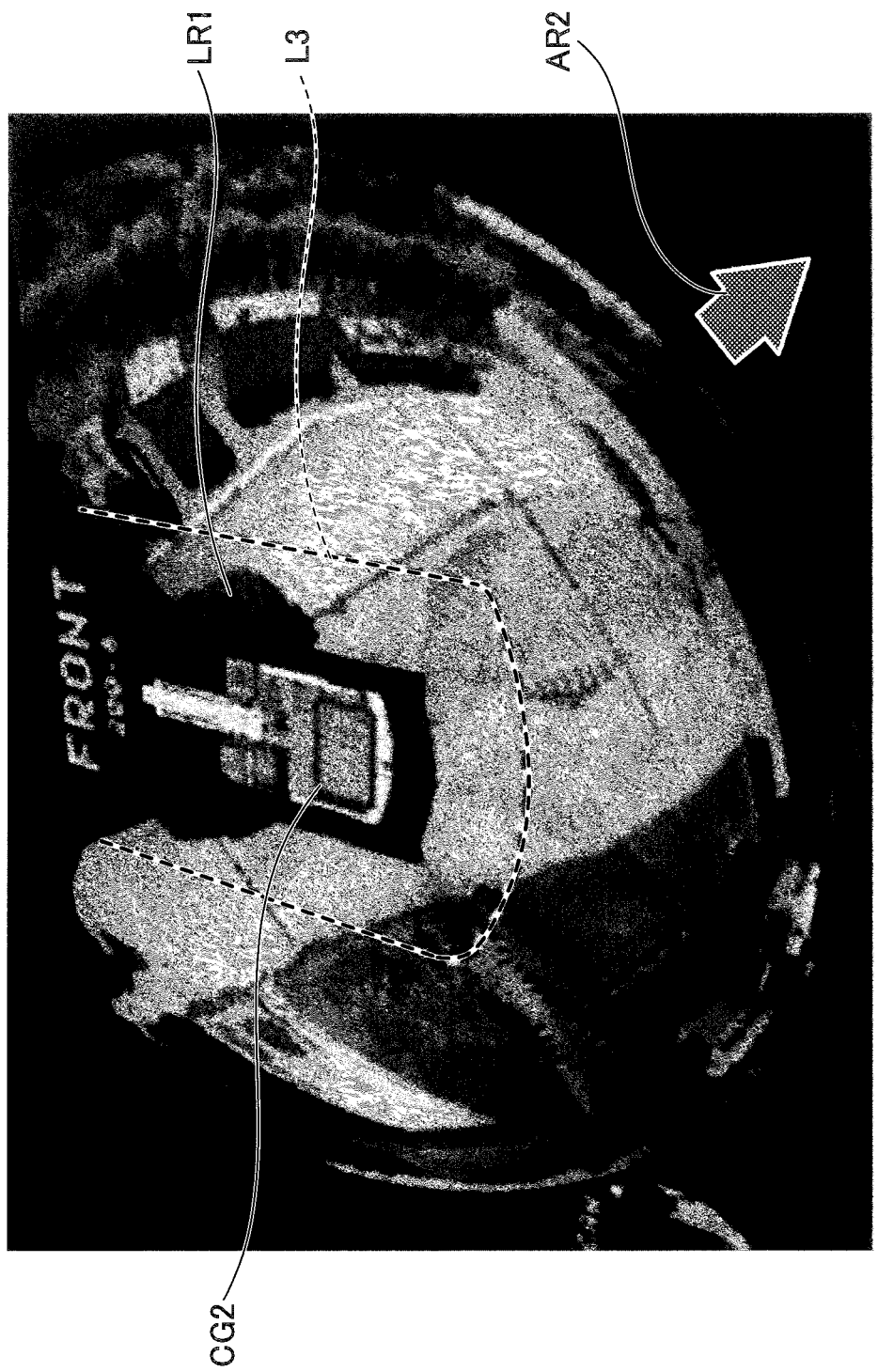
FIG. 26B illustrates an output image including a view transformed image.

Each of FIGS. 26A and 26B illustrates an output image including the surroundings monitoring image after execution of the local enlargement process. The output images of FIGS. 26A and 26B, however, are different from the output images of FIGS. 25A through 25E, in which the local enlargement process is performed in response to detection of a person by the person detecting part 34, in that the local enlargement process is performed in response to an operation of a travel lever as an operation apparatus. Furthermore, the output images of FIGS. 26A and 26B are different from the output images of FIGS. 25A through 25E, in which an image part corresponding to the position of a person detected by the person detecting part 34 in a real space is adopted as the observation image part, in that an image part corresponding to a space existing in the travel direction of the traveling undercarriage 1 is adopted as the observation image part.

According to this embodiment, the control part 35 executes the local enlargement process when no person is detected around the shovel and a travel lever is operated. Furthermore, when a person is detected after the local enlargement process is executed in response to an operation of a travel lever, the control part 35 newly adopts an image part corresponding to the position of the detected person in a real space as the observation image part, and then executes the local enlargement process. The control part 35, however, may continue the local enlargement process that is being executed when a person is detected after the local enlargement process is executed in response to an operation of a travel lever. Conversely, when a travel lever is operated after executing the local enlargement process in response to detection of a person around the shovel, the control part 35 may newly adopt an image part corresponding to a space existing in the travel direction of the traveling undercarriage 1 as the observation image part, and then execute the local enlargement process. The control part 35 may continue the local enlargement process that is being executed when a travel lever is operated after executing the local enlargement process in response to detection of a person around the shovel.

Furthermore, when no person is detected around the shovel and no travel lever is operated, the control part 35 may execute the local enlargement process. In this case, the control part 35 may adopt, for example, an image part corresponding to a space at the back of the upper rotating structure 3 as the observation image part. Alternatively, the control part 35 may adopt an image part corresponding to a space in front of the traveling undercarriage 1 as the observation image part.

FIG. 26A illustrates an output image including the surroundings monitoring image after the local enlargement process is executed in response to an operation of a travel lever. The output image of FIG. 26A illustrates a situation where the traveling undercarriage 1 travels diagonally backward right relative to the upper rotating structure 3. In this illustration, the control part 35 adopts an image part corresponding to a space existing in the travel direction of the traveling undercarriage 1 as the observation image part. The travel direction of the traveling undercarriage 1 is derived from, for example, the swing angle of the upper rotating structure 3 relative to the traveling undercarriage 1. This is because the travel direction of the traveling undercarriage 1 can be uniquely determined with reference to the longitudinal direction of the upper rotating structure 3. Specifically, the travel direction of the traveling undercarriage 1 is derived based on the outputs of a pair of orientation sensors attached to each of the traveling undercarriage 1 and the upper rotating structure 3, an angular velocity sensor such as a gyroscope attached to the upper rotating structure 3, a rotation angle sensor such as a resolver or a rotary encoder attached to the swing mechanism 2, etc.

The control part 35 rotates the surroundings monitoring image within the screen so that the observation image part is positioned at the upper center of the screen, and locally enlarges the observation image part. For example, the surroundings monitoring image is rotated with the center of the surroundings monitoring image corresponding to the swing center of the shovel serving as an axis of rotation. The rotation of the surroundings monitoring image and the enlargement of the observation image part may be performed in random order. Furthermore, the rotation of the surroundings monitoring image may be omitted. Furthermore, image parts other than the observation image part may be reduced. For example, reduction may be performed so that an image part more distant from the observation image part is displayed smaller. An arrow AR1 displayed over the surroundings monitoring image indicates the travel direction of the traveling undercarriage 1. A crawler image LR1 is an image of the traveling undercarriage 1 captured by the image capturing apparatus 40.

FIG. 26B illustrates an output image including the surroundings monitoring image after the local enlargement process is executed in response to an operation of a travel lever. The output image of FIG. 26B illustrates a situation where the traveling undercarriage 1 travels diagonally backward right relative to the upper rotating structure 3. In this illustration, the control part 35 adopts an image part corresponding to a space existing in the travel direction of the traveling undercarriage 1 as the observation image part. Then, the control part 35 locally enlarges the observation image part with the excavation attachment of the shovel icon CG2 oriented upward on the screen. Image parts other than the observation image part may be reduced. For example, reduction may be performed so that an image part more distant from the observation image part is displayed smaller. An arrow AR2 displayed over the surroundings monitoring image indicates the travel direction of the traveling undercarriage 1. The crawler image LR1 is an image of the traveling undercarriage 1 captured by the image capturing apparatus 40.

As described above, the control part 35 adopts an image part corresponding to a space existing in the travel direction of the traveling undercarriage 1 as the observation image part. Then, the control part 35 can highlight the observation image part by locally enlarging and displaying the observation image part. Therefore, the operator who looks at an output image including the surroundings monitoring image after execution of the local enlargement process can instantly recognize information related to the travel direction of the shovel (such as the presence or absence of an obstacle). Furthermore, the control part 35 can rotate the surroundings monitoring image within the screen so that the observation image part is always positioned in a particular part (for example, at the lower center) of the screen. Therefore, when an alarm or the like is output, the operator can instantly recognize information related to the travel direction of the shovel by just looking at the particular part of the screen.

Furthermore, the control part 35 may execute the local enlargement process in response to vehicle information other than the presence or absence of an operation of a travel lever. For example, the control part 35 may execute the local enlargement process in response to an operation of a swing operation lever. In this case, the control part 35 may adopt an image part corresponding to a space existing in the swing direction of the excavation attachment as the observation image part.

Furthermore, when the position of a detected person is at the back of the upper rotating structure 3, the control part 35 may move the surroundings monitoring image so that the observation image part corresponding to the position of the person is positioned in the center of the screen, and locally enlarge the observation image part. When the position of a detected person is in the travel direction of the traveling undercarriage 1, the control part 35 may move the surroundings monitoring image so that the observation image part corresponding to the position of the person is positioned in the center of the screen, and locally enlarge the observation image part.

A preferred embodiment of the present invention is described in detail above. The present invention, however, is not limited to the above-described embodiment, and variations and replacements may be added to the above-described embodiment without departing from the scope of the present invention.

For example, according to the above-described embodiment, the surroundings monitoring system 100 includes both the luminance filter part 32a and the pattern filter part 32e as an supplementary identification part to supplement identification based on an image feature value. The present invention, however, is not limited to this configuration. For example, the surroundings monitoring system 100 may include only the luminance filter part 32a as a supplementary identification part or may include only the pattern filter part 32e as a supplementary identification part. Even when including only one of them as a supplementary identification part, the surroundings monitoring system 100 can improve a person identifying capability compared with a configuration without a supplementary identification part.

Furthermore, according to the above-described embodiment, it is assumed that a person is detected using a captured image of the image capturing apparatus 40 attached on top of the upper rotating structure 3 of the shovel. The present invention, however, is not limited to this configuration, and is also applicable to a configuration using a captured image of an image capturing apparatus attached to the body of other work machines such as mobile cranes, fixed cranes, lifting magnet machines, and forklifts.

Furthermore, according to the above-described embodiment, an image of a blind spot area of the shovel is captured using three cameras, while one, two, or four or more cameras may alternatively be used to capture an image of a blind spot area of the shovel.

Furthermore, according to the above-described embodiment, a person is detected using a captured image of the image capturing apparatus 40, while a person may alternatively be detected using the output of an ultrasonic sensor, a laser radar, a pyroelectric sensor, a millimeter-wave radar, or the like.

Furthermore, the person detecting process, which is independently applied to each of multiple captured images according to the above-described embodiment, may alternatively be applied to a single composite image generated from multiple captured images.

What is claimed is:

1. A surroundings monitoring system for a work machine, comprising:
    a memory; and
    a processor coupled to the memory, and configured to detect an object present around the work machine,
    wherein the processor is configured to simultaneously display an image in a first display area and a figure in a second display area different from the first display area on a display apparatus, the image being generated using a captured image of an image capturing apparatus attached to the work machine, the figure including a first figure representing the work machine and a second figure drawn along a periphery of the first figure, the second figure including a first line extending in a first direction away from the first figure, a second line extending in a second direction away from the first figure, and a line extending from an end of the first line to an end of the second line, the second figure being divided into a plurality of regions in a direction away from the first figure, wherein the processor is configured to highlight a region among the plurality of regions into which the second figure is divided in the direction away from the first figure, without displaying an image of the detected object or a mark indicating the detected object in the region, the region corresponding to a direction of the detected object, wherein the second figure includes a partial circle and a partial rectangle concentrically inside of the partial circle, wherein the processor is further configured to display a first distance image and a second distance image over the image in the first display area, the first distance image and the second distance image indicating a first distance and a second distance, respectively, from the work machine, the first distance being different from the second distance, wherein a circumferential line of the partial circle and a circumferential line of the partial rectangle correspond to the first distance image and the second distance image and indicate the first distance and the second distance, respectively, in the second display area, wherein the circumferential line of the partial circle includes the line extending from the end of the first line to the end of the second line, and wherein the circumferential line of the partial rectangle corresponds to a plurality of lines connecting the first line to the second line.

2. The surroundings monitoring system as claimed in claim 1, wherein the processor is further configured to display the second display area such that the second display area includes a back side of the first figure representing the work machine.

3. The surroundings monitoring system as claimed in claim 1, wherein
the processor is further configured to determine an undetected state and a two-stage detected state that is based on a distance from the work machine,
the two-stage detected state includes a first detected state and a second detected state, and
the distance from the work machine to the object is greater when the object is a cause of the first detected state than when the object is a cause of the second detected state.

4. The surroundings monitoring system as claimed in claim 3, wherein the processor is configured to distinguishably display a region corresponding to the first detected state, a region corresponding to the second detected state, and a region corresponding to the undetected state in different colors among the plurality of regions in the second display area.

5. The surroundings monitoring system as claimed in claim 3, wherein the processor is configured not to display a message reporting the first detected state in the first detected state, and is configured to display a message reporting the second detected state in the second detected state.

6. The surroundings monitoring system as claimed in claim 1, wherein the partial circle has a cut at a position corresponding to a front side of the first figure representing the work machine.

7. The surroundings monitoring system as claimed in claim 1, wherein the partial circle is divided into a plurality of sectorial figures by a plurality of lines extending away from the first figure representing the work machine to the circumferential line of the partial circle such that the plurality of sectorial figures correspond to azimuth directions.

8. The surroundings monitoring system as claimed in claim 1, wherein the first display area is greater than the second display area.

9. A work machine including the surroundings monitoring system as set forth in claim 1.

10. The work machine as claimed in claim 1, wherein the figure is an indicator of object detection.

11. The work machine as claimed in claim 10, wherein
the first figure is an icon of the work machine, and
the processor is configured to highlight an entirety of a region corresponding to the direction of the detected object among the plurality of regions.

12. The work machine as claimed in claim 1, wherein
an outline of the second figure includes the first line extending in the first direction away from the first figure, the second line extending in the second direction away from the first figure, and the line extending from the end of the first line to the end of the second line, and
the line extending from the end of the first line to the end of the second line is a curved line, and an entirety of the curved line is a part of a circumference of a circle.

13. The work machine as claimed in claim 12, wherein the entirety of the curved line is out of contact with an outline of the second display area.

14. The work machine as claimed in claim 12, wherein, the curved line includes a plurality of line segments corresponding to two or more of the plurality of regions.

15. The work machine as claimed in claim 1, wherein
the processor is configured to display an entirety of the figure over a still background image in the second display area, and
the entirety of the figure is surrounded by a solid-color image.

16. The work machine as claimed in claim 15, wherein a color of the solid-color image remains unchanged regardless of whether the object is detected.

17. The work machine as claimed in claim 15, wherein a color of the solid-color image remains unchanged before and after detection of the object.

18. The work machine as claimed in claim 1, wherein the plurality of regions are partially formed by the first line, the second line, the circumferential line of the partial circle, and the circumferential line of the partial rectangle.

19. The work machine as claimed in claim 1, wherein
each of the partial circle and the partial rectangle is divided into a plurality of regions, and
an area of each of the plurality of regions of the partial rectangle is larger than an area of each of the plurality of regions of the partial circle.

20. The work machine as claimed in claim 1, wherein
each of the partial circle and the partial rectangle is divided into a plurality of regions, and
the plurality of regions of the partial rectangle are provided one on each of three sides of the first figure and the plurality of regions of the partial circle are provided two on each of the three sides of the first figure, the three sides of the first figure corresponding to a left, a right, and a back of the work machine.

* * * * *